(12) United States Patent
Furusu et al.

(10) Patent No.: US 7,353,151 B2
(45) Date of Patent: Apr. 1, 2008

(54) METHOD AND SYSTEM FOR ANALYZING BEHAVIOR OF WHOLE HUMAN BODY BY SIMULATION USING WHOLE HUMAN BODY

(75) Inventors: Katsuya Furusu, Aichi-gun (JP); Isao Watanabe, Aichi-gun (JP); Kazuo Miki, Aichi-gun (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 764 days.

(21) Appl. No.: 09/968,547

(22) Filed: Oct. 2, 2001

(65) Prior Publication Data
US 2002/0042703 A1   Apr. 11, 2002

Related U.S. Application Data

(63) Continuation-in-part of application No. 09/860,710, filed on May 21, 2001, now abandoned.

(30) Foreign Application Priority Data

| May 22, 2000 | (JP) | ............................. 2000-150579 |
| Sep. 4, 2000 | (JP) | ............................. 2000-267037 |
| May 14, 2001 | (JP) | ............................. 2001-143198 |

(51) Int. Cl.
*G06G 7/60* (2006.01)
*G09B 23/30* (2006.01)

(52) U.S. Cl. ..................... 703/11; 703/2; 703/6; 703/7; 434/267; 434/274

(58) Field of Classification Search ..................... 703/8, 703/11, 2, 6, 7; 434/267, 274–275; 345/952, 345/957; 73/865.1, 866.4
See application file for complete search history.

(56) References Cited

U.S. PATENT DOCUMENTS

| 5,623,428 | A | * | 4/1997 | Kunii et al. .................... 703/6 |
| 6,096,087 | A | * | 8/2000 | Weber et al. .................... 703/8 |
| 6,132,108 | A | * | 10/2000 | Kashiwamura et al. ........ 703/2 |

(Continued)

OTHER PUBLICATIONS

Ferdi Scheepers, Richard E. Parent; Wayne E. Carlson, Stephen F. May; "Anatomy-Based Modeling of the Human Musculature"; (c)1997; pp. 1-10.*

(Continued)

*Primary Examiner*—Paul Rodriguez
*Assistant Examiner*—Jason Proctor
(74) *Attorney, Agent, or Firm*—Oblon, Spivak, McClelland, Maier & Neustadt, P.C.

(57) ABSTRACT

A method of effecting an analysis of behaviors of substantially all of a plurality of real segments together constituting a whole human body, by conducting a simulation of the behaviors using a computer under a predetermined simulation analysis condition, on the basis of a numerical whole human body model provided by modeling on the computer the whole human body in relation to a skeleton structure thereof including a plurality of bones, and in relation to a joining structure of the whole human body which joins at least two real segments of the whole human body and which is constructed to have at least one real segment of the whole human body, the at least one real segment being selected from at least one ligament, at least one tendon, and at least one muscle, of the whole human body.

8 Claims, 37 Drawing Sheets

U.S. PATENT DOCUMENTS 6,151,404 A * 11/2000 Pieper .................... 382/128
6,161,080 A * 12/2000 Aouni-Ateshian et al. .... 703/11
6,310,619 B1 * 10/2001 Rice ...................... 345/420

OTHER PUBLICATIONS

J.A. Pellettiere, "Material Model For Bone Under Impact Loading", 1998, pp. 1-5.*

David T. Chen, Steven D. Pieper, Sunil K. Singh, Joseph M. Rosen, David L. Zeltzer; "The Virtual Sailor: An Implementation of Interactive Human Body Modeling"; 1993; pp. 429-435.*

K.H. Höhne, Bernhard Pflesser, Andreas Pommert, Martin Riemer, Thomas Schiemann, Rainer Schubert, Ulf Tiede; "A 'Virtual Body' Model for Surgical Education and Rehearsal"; 1996; pp. 25-31.*

Anton J. van den Bogert, "Analysis and Simulation of Mechanical Loads on the Human Musculoskeletal System: A Methodological Overview", 1994, University of Calgary, pp. 1-45.*

Dale A. Schauer and Scott A. Perfect, "Lower Extremity Finite Element Model for Crash Simulation", 1996, Lawrence Livermore National Laboratory, pp. 1-5.*

K.D. Willmert, "Graphic Display of Human Motion", 1978, ACM, pp. 715-719.*

Scott L. Delp, J. Peter Loan; "A Graphics-based Software System to Develop and Analyze Models of Musculoskeletal Structures", 1995, Elsevier Science Ltd, pp. 21-34.*

S. Uchiyama, J.H. Coert, L. Berglund, P.C. Amadio, K.-N. An; "Method for the Measurment of Friction Between Tendon and Pulley"; 1995; Journal of Orthapaedic Research; pp. 83-89.*

E. Haug, et al., "Recent Trends in Biomechanical Simulation and Applications at ESI Group", PUCA '99, pp. 401-414.

E. Haug, et al., "Current Status of Articulated and Deformable Human Models for Impact and Occupant Safety Simulation at ESI Group", PAM '98 User's Conference—Tours (France), Oct. 8-9, 1998, 26 pages.

W. Maurel, Ecole polytechnique Federale de Lausanne, These No. 1906 (1998), pp. 1-19, 21-38, 39-57, 59-86, 87-106, 107-124, 125-144, 145-152, 153-169, 170-182, and p. 185, XP-002269859, "3D Modeling of the Human Upper Limb Including the Biomechanics of Joints, Muscles and Soft Tissues",1999.

Shinichi Ishiyama et al., "Simulation analysis of passenger injuries in automotive crashes" (Published by the Japanese Council of Traffic Science; The materials for the technical meeting of Traffic Science, May 20, 2000, Japan, vol. 41, pp. 5-6).

Atsutake Tamura et al., "Development and validation of the Finite Element Model of the Human Lower Extremity" (Published by the Japan Society of Mechanical Engineers; The materials for 12th JSME Conference on Bioengineering, Jan. 5, 2000, Japan, Serial No. 99-37, pp. 249-250).

Katsuya Furusu et al., "A Finite Element Model of the Human Hip: Part 1 Development and Validation of the Pelvis" (Published by the Japan Society of Mechanical Engineers; vol. 2 of the materials for 1999 JSME annual meeting, Jul. 26, 1999, Japan, Serial No. 99-1, pp. 345-346).

Isao Watanabe et al., A Finite Element model of the Human Hip: Part 2 Development and Validation of the Human Hip Soft Tissue (Published by the Japan Society of Mechanical Engineers; vol. 2 of the materials for 1999 JSME annual meeting, Jul. 26, 1999, Japan, Serial No. 99-1, pp. 347-348).

Katsuya Furusu et al., "Application of the Finite Element Model of the Human Thorax to the Whiplash Injury Analysis" (Published by Japan Society of Automotive Engineers; Preprints of the materials for the techincal meeting of Automotive Engineers, 1999 JSAE Annual Congress (Fall), Oct. 13, 1999, No. 75-99, pp. 5-8).

Katsuya Furusu et al., "Development of the Finite Element Model of the Human Lower Extremity" (Published by the Japan Society of Mechanical Engineers; The materials for the 11th JSME Conference on Bioengineering, Mar. 24, 1999, Serial No. 99-3, pp. 158-159).

Hideo Yasuho et al., "Transformation from model to android" (Published by Nikkei BP Corp. of Japan; Nikkei Computer Graphics, published on Mar. 8, 2000, vol. 162, pp. 118-123).

Katsuya Furusu et al., "Development and Validation of the Finite Element Model of the Human Lower Extremity for Accidental Injury". JSAE Spring Convention Proceedings No. 60-99, pp. 5-8, 1999.

* cited by examiner

| REPRESENTATIVE SEGMENT | YOUNG'S MODULUS [GPa] | DENSITY [kg/m³] | MINIMUM VALUE [mm] |
|---|---|---|---|
| CORTICAL BONE | 17 | 2000 | 3.50 |
| SPONGY BONE | 0.07 | 1000 | 0.32 |

FIG.4

METHOD AND SYSTEM FOR ANALYZING BEHAVIOR OF WHOLE HUMAN BODY BY SIMULATION USING WHOLE HUMAN BODY

CROSS REFERENCE TO RELATED APPLICATIONS

This is a continuation-part application of application Ser. No. 09/860,710 filed May 21, 2001.

This application is based on Japanese Patent Applications No. 2000-150579 filed May 22, 2000, No. 2000-267037 filed Sep. 4, 2000, and No. 2001-143198 filed May 14, 2001, the contents of which are incorporated hereinto by reference.

BACKGROUND OF THE INVENTION

1. Field of the Invention

The present invention relates to a technology of analyzing a behavior of the human body by simulation using a computer, by the use of a human body model defined on the computer.

2. Discussion of the Related Art

There has existed a field where an accurate analysis of a behavior of the human body is desired One example is a field where a vehicle structure is designed so as to mitigate as much as possible the degree of deformation of a vehicle occupant due to the application of an external impact to the vehicle, from the view of the improvement in safety of the vehicle under impact.

In such a field, the analysis of a behavior of the human body was conventionally effected, using the whole or a part of a mechanical dummy substituting a real human body, or using a model provided by modeling not the whole but a part of the human body on a computer, in general.

For example, in the aforementioned field of designing the vehicle structure, historically, a whole human body dummy instead of a real human body was seated on a seat of a real vehicle, and subsequently a real vehicle test was conducted using the real vehicle, such that the real vehicle was held in the same state as mentioned above, and such that the real vehicle was made to really come into contact with a real obstacle or barrier, for thereby validating safety of the real vehicle under impact.

However, in the above conventional technologies, in some cases, a human body dummy failed to represent or reproduce a behavior of a real human body at a sufficient degree of fidelity. In addition, as is evident from the above explanation, in the above conventional technologies, although there existed a case where a human body model was used on a computer, neither modeling the whole human body on a computer, nor analyzing by simulation a behavior of the human body using a model representing the whole human body on a computer, was conducted.

For the above reasons, none of the conventional analyzing approaches mentioned above was capable of analyzing a behavior of the human body at a sufficient high degree of the analyzing accuracy.

BRIEF SUMMARY OF THE INVENTION

It is therefore an object of the present invention to permit a behavior of the human body to be analyzed by simulation at a sufficient degree of the analyzing accuracy, by the use of a human body model defined on a computer The object may be achieved according to any one of the following modes of this invention. Each of these modes of the invention is numbered, and depends from the other mode or modes, where appropriate. This type of explanation about the present invention is for better understanding of some instances of a plurality of technological features and a plurality of combinations thereof disclosed in this specification, and does not mean that the plurality of technological features and the plurality of combinations in this specification are interpreted to encompass only the following modes of this invention:

(1) A method of effecting an analysis of behaviors of substantially all, of a plurality of real segments together constituting a whole human body, by conducting a simulation of the behaviors using a computer under a predetermined simulation analysis condition, on the basis of a numerical whole human body model provided by modeling on the computer the whole human body in relation to a skeleton structure thereof including a plurality of bones, and in relation to a joining structure of the whole human body which joins at least two real segments of the whole human body and which is constructed to have at least one real segment of the whole human body, the at least one real segment being selected from at least one ligament, at least one tendon, and at least one muscle, of the whole human body.

The method according to the above mode (1) would permit behaviors of the whole human body to be analyzed at a high degree of the analyzing accuracy, as a result of modeling the whole human body and conducting the simulation of the behaviors using the modeled whole human body.

Further, the method according to the above mode (1), allowing the whole human body to be modeled in relation to its skeleton and joining structure, would facilitate construction of a human body model representing real behaviors of the whole human body more faithfully than when the modeling of the whole human body is performed only in relation to its skeleton structure, for example.

The method according to the above mode (1) may have different applications.

A possible application of the present method is for rendering assistance in a medical field including rehabilitation, geriatric medicine, sports medicine), in particular, in diagnosing or treating the human in relation to sickness or deformation of bones, muscles, ligaments, tendons, etc., of the human.

A further possible application of the present method is for providing assistance in the field of taking pictures such as movie films and television programs, in taking pictures of scenes where a real human cannot perform, using computer graphics, with the aim of having a virtual character perform in pictures in a more real movement.

The "simulation analysis condition" in the above mode (1) may include a condition on an external force, displacement, velocity or acceleration to which a human body is subjected, for instance.

In addition, the "whole human body model" in the above mode (1) may be one obtained by modeling a whole human body by partitioning it into a plurality of elements, permitting the model to be used in analyzing behaviors of the whole human body under a finite element method. In this case, the "whole human body model" can be called a finite element model for a whole human body.

(2) The method according to the above mode (1), wherein the whole human body model is constructed without the use of a mechanistic model which is constructed by connecting a plurality of rigid segments using a plurality of mechanical joint elements for thereby representing the whole human body.

The method according to the above mode (2) would permit the anatomically faithful representation of the whole human body, resulting in the capability of accurately simulating a behavior of the whole human body.

The "mechanical joint element" in the above mode (2) may be defied to include that of pin-joint type using a pin for permitting rotation about at least one rotation axis fixed to the pin, and may be defined to include that of ball-joint type using a ball for permitting rotation about an axis movable relative to the ball.

(3) The method according to the above mode (1) or (2), wherein each of substantially all of a plurality of virtual segments together constituting the whole human body model is constructed using deformable elements representing a deformation of a corresponding one of the substantially all real segments of the whole human body, which deformation occurs in response to an application of an external force to the corresponding real segment.

The method according to the above mode (3) would permit the analysis of deformation of substantially all segments of the whole human body by means of simulation of the deformation.

In addition, in a case where deformations occur concurrently at a plurality of positions of the whole human body model, for example, the present method would permit an analysis of a degree of deformation of each one of substantially all segments of the whole human body, by depending on the same whole human body model.

The term "deformation" in the above mode (3) may be used as a term meaning at least one of an elastic deformation and a plastic deformation.

In the case where the term "deformation" is used as a term meaning at least a plastic deformation, the present method would permit validation of bone fracture, break, rupture, cut, avulsion, etc. in a human body through the whole human body model.

(4) The method according to any one of the above modes (1)-(3), wherein ones of a plurality of virtual segments together constituting the whole human body model representing ones of the plurality of bones are constructed using elastic-plastic elements each representing elastic-plastic material having a mechanical property defined such that a plastic region of the material property is followed by an elastic region of the material property.

The method according to the above mode (4) would permit validation of bone fractures of the whole human body through its simulation.

(5) The method according to any one of the above modes (1)-(4), wherein the method is effected, by the use of the whole human body model, not only for analyzing a behavior of the each real segment of the whole human body, but also for analyzing a load on the each real segment.

The method according to the above mode (5) would turn it unnecessary to use separate whole human body models for analyses of behavior and a load of each segment of the whole human body, permitting these two kinds of analyses to be conducted in a simplified manner and in a reduced time.

(6) The method according to any one of the above modes (1)-(5), wherein the whole human body model is constructed by modeling ones of a plurality of units together constituting the joining structure which make a large contribution to an analyzing accuracy to be achieved in the analysis, by not modeling ones of the plurality of units which make a small contribution to the analyzing accuracy.

The method according to the above mode (6) would permit the whole human body to be modeled efficiently with a good compliance with the analyzing accuracy achieved in effecting the analysis of behaviors of the whole human body, resulting in facilitation of the reduction in the time required for the modeling and for the computer calculation for the analysis, (7) The method according to any one of the above modes (1)-(6), wherein the whole human body model is constructed by modeling the whole human body so as to permit the whole human body model to represent strength of the plurality of bones and softness of a skin of the whole human body.

The method according to the above mode (7) would facilitate to produce the whole human body model as one representing mechanical properties of the whole human body to the extent of strength of bones and softness of a skin, of the whole human body.

(8) The method according to any one of the above modes (1)-(7), wherein the whole human body model is constructed by modeling the whole human body so as to permit the whole human body model to represent strength of the plurality of bones and softness of a soft tissue of the whole human body.

The method according to the above mode (8) would facilitate to produce the whole human body model as one representing mechanical properties of the whole human body to the extend of strength of bones and softness of a soft tissue meaning all parts of the whole human body except bones, more specifically, a skin, a fresh (including muscles), and a fat, of the human body.

(9) The method according to any one of the above modes (1)-(8), wherein the whole human body model is provided with at least one variable parameter defining at least one of a shape, a location, a mechanistic property, and a mechanical property, of at least one of a plurality of virtual segments together constituting the whole human body model, which at least one variable parameter is specified prior to the simulation by a user of the method, The method according to the above mode (9) would facilitate to adapt the whole human body model for the simulation analysis, for different purposes, responding to the user's specifying at least one variable parameter for defining a property of the whole human body model.

(10) The method according to any one of the above modes (1) (9), wherein the whole human body model is constructed by modeling at least one of a plurality of units together constituting the joining structure using at least one one-dimensional elastic bar element.

The method according to the above mode (10) would simplify the modeling of several factors and analysis properties, of the whole human body model, in association with its joining structure.

The term "a plurality of units constituting the joining structure" in the above mode (10) may be interpreted to mean a plurality of muscles independent of each other in the joining structure.

(11) The method according to any one of the above modes (11)-(10), wherein the simulation is conducted for at least behavior of a behavior exhibited by each real segment of the whole human body and a load occurring at the each real segment, and for a deformation occurring at the each real segment, on the basis of the whole human body model, by the use of (i) the predetermined simulation analysis condition, (ii) a predetermined property of an obstacle which is used in an environment where the whole human body is assumed to be brought into contact with the obstacle, and (iii) a predetermined deformation criterion associated with the each real segment of the whole human body, wherein the behavior, the load, and the deformation occur in response to an occurrence of the contact of the whole human body with the obstacle.

The method according to the above mode (11) would permit prediction of which one of a plurality of segments of the whole human body produces deformation due to the contact, and to what degree the one segment produces the deformation, eventually leading to the easy understanding of the mechanism in which deformation occurs due to the contact, and leading to the easy finding of countermeasures to be taken for mitigating deformation of the human body due to the contact.

The term "obstacle" in the above mode (11) may be interpreted to mean a moving object such as a vehicle (typically including an automobile), a stationary structure such as a wall, a utility pole, a guardrail, etc. This interpretation may be accepted in the following modes.

(12) The method according to any one of the above modes (1)-(11), wherein the analysis requires a series of simulations which are conducted so as to repeat an unit simulation entirely for the whole human body model using the computer at a time step defined as a unit time interval at which the unit simulation is repeated, the whole human body model is constructed by partitioning the whole human body into a plurality of elements such that a predetermined condition of a minimum length of each of the plurality of elements is satisfied, the predetermined condition being predetermined such that a resulting value of the time step is not be less than a predetermined minimum value of the time step.

In a simulation analysis with a computer using a human body model, it is general that a series of simulations are conducted by repeating a unit simulation for a whole of the human body model using the computer, at a time step defined as a unit time interval. On the other hand, in order for the human body model to be evaluated practical in terms of simulations, a computer calculation time for the series of simulations being not too long is required. The smaller a representative length of each segment of the human body model, the shorter the time step, and the shorter the time step, the longer the computer calculation time. In addition, a minimum value of the time step, as a rule of thumb, is desirably set to a value not less than about $1.0 \times 10^{-6}$ second.

In the light of the above findings, in the method according to the above mode (12), the series of simulations are conducted by repeating the unit simulation entirely for the whole body model using the computer, at the time step. The whole human body model is constructed by partitioning the whole human body into a plurality of elements such that the predetermined condition of the minimum length of each element is satisfied. The predetermined condition is predetermined such that a resulting value of the time step is not be less than the predetermined minimum value of the time step.

(13) The method according to any one of the above modes (1)-(12), wherein the whole human body model is constructed by modeling a real joint portion of the whole human body so as to permit the whole human body model to represent a mechanical property of the joining structure positioned at the real joint portion Conventionally, a human body model was constructed by modeling a joint portion of a human body using a mechanical joint element, without considering a joining structure located at the joint portion. One example of such conventional human body models is a mechanistic model obtained by partitioning a human body into a plurality of rigid elements each having a shape and a mass thereof, and by subsequently connecting the plurality of rigid elements using a joint element such that a motion axis around which the plurality of rigid elements are moved relative to each other is fixedly positioned.

However, the thus constructed human body model fails to represent a stress-deflection property, namely, a mechanical property of a real joint portion of the human body at a sufficient degree of the representing accuracy, for example.

Alternately, in the method according to the above mode (13), the whole human body model is constructed by modeling the joint portion of the whole human body so as to permit the whole human body model to represent the mechanical property of the joining structure positioned at the joint portion of the whole human body.

Consequently, the present method would enable the whole human body model to represent motion and deformation of the joint portion of the whole human body more accurately than the aforementioned conventional technology.

(14) The method according to any one of the above modes (1)-(13), wherein the whole human body includes a real motion-axis-variable joint portion thereof having at least one motion axis around which ones of the plurality of bones mutually connected at the real motion-axis-variable joint portion are movable relative to each other, the at least one motion axis being changeable in location depending on the relative movement of the ones bones, and wherein the whole human body model is constructed by modeling the real motion-axis-variable joint portion so as to permit the whole human body model to represent the change in location of the at least one motion axis by adopting to the whole human body model a structure anatomically equivalent to the real motion-axis-variable joint portion.

Historically, a human body model was constructed by modeling the aforementioned motion-axis-variable joint portion of a human body such that the aforementioned motion axis is fixedly positioned, using a mechanical joint element. One example of the thus constructed conventional human body models is the mechanistic model as described above.

However, the thus constructed human body model fails to represent a real motion, namely, a mechanistic property of the motion-axis-variable joint portion of the human body at a sufficient degree of the representing accuracy, for example.

In contrast, in the method according to the above mode (14), the whole human body model is constructed by modeling the real motion-axis-variable joint portion so as to permit the whole human body model to represent the change in location of the at least one motion axis by adopting to the whole human body model the structure anatomically equivalent to the real motion-axis-variable joint portion.

Hence, the present method would allow the whole human body model to represent motion, namely, displacement of the motion-axis-variable joint portion of the human body more accurately than the aforementioned conventional technology

(15) The method according to any one of the above modes (1)-(12), wherein the whole human body includes a real motion-axis-variable joint portion thereof having at least one motion axis around which ones of the plurality of bones mutually connected at the real motion-axis-variable joint portion are movable relative to each other, the at least one motion axis being changeable in location depending on the relative movement of the ones bones, wherein the whole human body model is constructed by modeling the real motion-axis-variable joint portion so as to permit the whole human body model to represent the change in location of the at least one motion as by adopting to the whole human body model a structure anatomically equivalent to the real motion-axis-variable joint portion, and the whole human body model is constructed by modeling the whole human body so as to permit the whole human body model to represent a mechanical property of the joining structure positioned at the real motion-axis-variable joint portion, and wherein the analysis is effected by the use of the whole human body model for behaviors of the whole human body and for deformations of the substantially all real segments of the whole human body including the real motion-axis-variable joint portion.

In the case of constructing a human body model by modeling the aforementioned motion-axis-variable joint portion of a human body so as to permit the human body model to represent the real mechanical and mechanistic properties of the motion-axis-variable joint portion, a joint portion model which is a portion of the human body model corresponding to the motion-axis-variable joint portion of the human body means a model permitting representation of a property of the motion-axis-variable joint portion, namely, deformation and motion thereof at an improved degree of the representing accuracy. This results in the fact that the joint portion model would permit analysis of behaviors of the whole human body reflecting a behavior of the motion-axis-variable joint portion, and analysis of deformation the motion-axis-variable joint portion.

Based on the above findings, in the method according to the above mode (15), by the use of the whole human body model representing real mechanical and mechanistic properties of the motion-axis-variable joint portion of the whole human body, behaviors of the whole human body and deformations of substantially all segments of the human body including the motion-axis-variable joint portion are analyzed.

Accordingly, the present method, allowing the same whole human body model to effect a plurality of kinds of analyses, would facilitate to reduce a computer calculation time required for analyses of behavior and deformation of the whole human body.

(16) The method according to any one of the above modes (1)-(15), wherein the whole human body model is constructed by modeling a real thorax and abdomen portion of the whole human body so as to permit the whole human body model to represent respective organs of the whole human body positioned at the real thorax and abdomen portion, in relation to deformations of the respective organs occurring in response to application of an external force to the respective organs.

There has been already existed an idea to simulate and analyze deformation of the thorax and abdomen portion of the human body by the use of a human body model.

The above conventional idea, which permits validation of the thorax and abdomen portion of the human body by effecting the simulation analysis thereof in a macroscopic manner in relation to the entire of the thorax and abdomen portion, would not permit the detailed analysis and validation of individual organs in the thorax and abdomen portion.

Alternately, in the method according to the above mode (16), the whole human body model is constructed by modeling the thorax and abdomen portion of the whole human body such that a plurality of organs positioned at the thorax and abdomen portion are individually represented in relation to deformation of each organ occurring in response to application of an external force to the each organ.

Therefore, the present method would, as a result of the technology of individually modeling a plurality of organs in the whole human body, permit deformation of the plurality of organs in the human body to be individually analyzed and validated.

(17) The method according to any one of the above modes (1)-(16), further including:

(a) a posture analysis step of analyzing, by the use of the whole human body model, a posture of the whole human body exhibited upon application of an impact to the whole human body, in an environment where a magnitude of an impact response stress of each real segment of the whole human body occurring in response to application of the impact to the whole human body, depends on the posture of the whole human body; and (b) a stress analysis step of analyzing the impact response stress, by the use of the analyzed posture in the posture analysis step, and the whole human body model.

The method according to the above mode (17) would permit the accurate analysis of the impact response stress of each segment of the whole human, by the use of the whole human body model, thing into account of a posture of the whole human body exhibited upon application of an impact to the whole human body, in an environment where a magnitude of each impact response stress occurring in response to the application of the impact to the whole human body, depends on the posture of the whole human body.

(18) The method according to the above mode (17), wherein the environment includes an environment where a human in motion collides with a structure, the impact response stress includes a stress of at least one of a plurality of real segments of a whole body of the human which collides with the structure.

(19) The method according to the above mode (17), wherein the environment includes an environment where a human falls down and collides with a ground or a floor, the impact response stress includes a stress of at least one of a plurality of real segments of a whole body of the human which collides with the ground or the floor.

(20) The method according to the above mode (17), wherein the environment includes an environment where a foot of a human in walking or running contact a ground or a floor at a sole of the foot, the impact response stress includes a stress of the foot.

(21) The method according to the above mode (20), wherein the human wears a shoe at the foot, the impact response stress includes a stress of the shoe.

(22) The method according to any one of the above modes (17)-(21), wherein the posture analysis step includes:

(a) a first analysis step of analyzing a first posture exhibited by the whole human body at a time prior to the application of the impact to the whole human body, on the basis of a mechanistic model provided by modeling the whole human body in a manner that the whole human body is partitioned into a plurality of rigid elements each having a shape and a mass thereof and that the plurality of rigid elements are mutually joined using joint elements to permit the plurality of rigid elements to be movable relative to each other around a fixedly positioned motion axis for the relative movement between the plurality of rigid elements; and (b) a second analysis step of providing the whole human body model with the analyzed first posture, and subsequently analyzing a second posture exhibited by the whole human body at a time that the application of the impact to the whole human body is occurred.

Comparison between the whole human body defined in the above mode (17) and the mechanistic model defined in the above mode (22). The mechanistic model would not permit the accurate analysis of a behavior and a stress of each segment of the whole human body, but permit the analysis of a behavior of the whole human body in a reduced time. In contrast, the whole human body model would permit the accurate analysis of a behavior and a stress of each segment of the whole human body, but would require a longer time than the mechanistic model for analyzing a behavior of the whole human body, in general.

In view of the above findings, in the method according to the above mode (22), in a phase where the analysis of posture does not require a higher degree of the analyzing accuracy, i.e., where precedes at the moment that an external imp act is applied to the whole human body, not immediately, the use of the mechanistic model enables the analysis of a posture of the whole human body to be completed in a reduced time. In addition, in a phase where the analysis of a posture of the whole human body requires a higher degree of the analyzing accuracy, i.e., where immediately precedes the moment of the application of the external impact, the use of the whole human body model permits the accurate analysis of the posture of the whole human body.

(23) A computer program to be executed by a computer to implement the method according to any one of the above modes (1)-(22).

When a computer program according to the above mode (23) is executed by a computer, the same advantageous effects as any one of the above modes (1)-(22) would provide would be provided, according to basically the same principle as one accepted in the method set forth in any one of the above modes (1) to (22).

The term "program" defined in the above mode (23) may be interpreted to include, not only a set of instructions to be executed by a computer so that the program may function, but also any files and data to be processed by the computer according to the set of instructions.

The term "program" defined in the above mode (23) may be interpreted as one achieving the intended purpose by being solely executed by a computer, or one achieving the intended purpose by being executed by a computer with another program. In the latter case, the program defined in the above mode (23) may be constructed mainly by data.

(24) A computer-readable storage medium having stored therein the computer program according to the above mode (23).

When the program having been stored in the computer-readable storage medium according to the above mode (24) is executed by a computer, the same advantageous effects as any one of the above modes (1)-(22) would provide would be provided, according to basically the same principle as one accepted in the method set forth in any one of the above modes (1) to (22).

The "storage medium" defined in the above mode (24) may be realized in different types, including a magnetic recording medium such as a floppy-disc, an optical recording medium such as a CD and a CD-ROM, an optical-magnetic recording medium such as an MO, an unremovable storage such as a ROM, for example.

(25) A system for effecting an analysis of at least one behavior of at least one of a plurality of real segments together constituting a whole human body, by conducting a simulation of the at least one behavior by executing a predetermined simulation program on a computer under a predetermined simulation analysis condition, on the' basis of a numerical whole human body model provided by modeling on the computer the whole human body in relation to at least a skeleton structure thereof including a plurality of bones, the system for subsequently executing an application program identified by a user of the system on the computer or another computer, on the basis of the analyzed at least one behavior In the system according to the above mode (25), the application program (directed to a specific purpose) identified by the user is executed on the basis of the results from the simulation analysis using the whole human body model.

(26) The system according to the above mode (25), wherein the whole human body model is constructed by modeling the whole human body in relation to the skeleton structure and a joining structure of the whole human body which joins at least two real segments of the whole human body and which is constructed to have at least one real segment of the whole human body, the at least one real segment being selected from at least one ligament, at least one tendon, and at least one muscle, of the whole human body.

The system according to the above mode (26), allowing the whole human body to be modeled in relation to its skeleton joining structure, would facilitate construction of the whole human body model representing real behaviors of the whole human body more faithfully than when the modeling of the whole human body is performed only in relation to its skeleton structure, for example.

(27) The system according to any one of the above mode (26), wherein the simulation program is configured so as to simulate (a) at least behavior of a behavior exhibited by each of substantially all real segments of the whole human body and a load occurring at the each real segment, and (b) a deformation occurring at the each real segment, on the basis of the whole human body model, under the predetermined simulation analysis condition.

The system according to the above mode (27) would permit the computer to simulate and analyze at least behavior of behavior and deformation of each segment of the whole human body.

It is to be added that the system according to any one of the above modes (25)-(27) may be practiced together with the characteristic technology defined in any one of the above modes (2)-(22).

(28) A system comprising at least one of a server computer and a client computer which are connected to each other, wherein, the server computer is adapted to effect an analysis of at least one behavior of at least one of a plurality of real segments constituting a whole human body, by conducting a simulation of the at least one behavior by executing a predetermined simulation program under a predetermined simulation analysis condition on the basis of a numerical whole human body model provided by modeling the whole human body in relation to at least a skeleton structure thereof including a plurality of bones, the server computer being adapted to transmit the analyzed at least one behavior to the client computer, and the client computer is adapted to execute an application program identified by a user of the client computer, on the basis of a received at least one behavior from the server computer.

In the system according to the above mode (28), the application program (directed to a specific purpose) identified by the user is executed on the basis of the results from the simulation analysis using the whole human body model.

Therefore, the present system would enable the user to execute the application program by the computer to achieve the intended purpose at a sufficiently high degree.

It is to be added that the system according to the above mode (28) may be practiced together with the characteristic technology defined in any one of the above modes (2)-(22) and (25)-(27).

(29) A process of producing a human body model by modeling an object defined as a whole or a part of a human body by partitioning the object into a plurality of elements, the plurality of elements which are categorized in type into a plurality of one-dimensional elements each not having a thickness but having a length thereof, a plurality of two-dimensional elements each not having a thickness but having an area and a shape thereof, and a plurality of three-dimensional elements each having a volume and a shape thereof, the plurality of two-dimensional elements are categorized into a plurality of shell elements each permitting a tensile response and a compressive response in a direction along each shell element to be caused, and a plurality of membrane elements each permitting a tensile response but a compressive response in a direction along each membrane element to be caused, the object being constructed using a plurality of segments thereof including a ligament, a tendon, or a muscle, the process comprising;

a first modeling step of modeling each of first ones of the plurality segments which is moved relative to another segment of the object forming an area of contact with the another segment, by partitioning the each first segment into the plurality of membrane elements, while modeling each of second ones of the plurality of segments not forming a substantial area of contact with another segment of the object or a substantial movement relative to another segment of the object, by partitioning the each second segment into the plurality of one-dimensional elements.

There could be inferred an idea of modeling a ligament, a tendon, or a muscle, which is one of a plurality of segments of the human body, respectively, using a plurality of membrane elements, each of which elements constitutes one type of the two-dimensional element, by focusing on the fact that these three segments are thin compared with a bone of the human body. However, each of a plurality of first ones of a plurality of segments of the human body which is moved relative to anther segment of the human body in contact with the another segment forming a contact area between them requires to be modeled by partitioning the each first segment using a plurality of membrane elements, for assuring the analyzing accuracy. In addition, even though each of a plurality of second ones of a plurality of segments of the human body which does not substantially produce such a contact or a relative movement is modeled by partitioning the each second segment into a plurality of one-dimensional elements, the analyzing accuracy would be assured to some extent. Such a modeling technology would facilitate to reduce an effort and a time required for the modeling.

In the light of the above findings, in the method according to the above mode (29), each first segment of the object which is moved relative to anther segment of the human body in contact with the another segment forming a contact area between them is modeled by partitioning the each first segment using a plurality of membrane elements, while each second segment of the human body which does not substantially produce such a contact or a relative movement is modeled by partitioning the each second segment into a plurality of one-dimensional elements.

As a result, the present method would achieve the intended analyzing accuracy, permitting reduction in effort and time required for the modeling.

The potential contribution of the present method to reduction in effort and time required for the modeling shows that one of the desirable applications of the present method is an environment where the reduction in effort and time required for the modeling is in particular strongly needed for modeling the whole human body in relation to its bone and joining structure. However, the concept underlying the present method may be adopted in the technology of modeling a part of the human body, as well.

(30) The process according to the above mode (29), wherein the plurality of segments include a bone having a hard and thin outer layer and a soft inner portion thereof, the process further comprises a second modeling step of modeling the outer layer by partitioning the outer layer into the plurality of shell elements, while modeling the inner portion by partitioning the inner portion into the plurality of three-dimensional elements.

There could be inferred an idea of modeling a bone of the human body in its whole region using a plurality of three-dimensional elements. However, when the bone is constructed to have a hard and thin outer layer and a soft inner portion thereof, it follows that the outer layer is partitioned into a plurality of three-dimensional elements with their representative lengths being small. The representative length of the each three-dimensional element being small means, as described above, the computational calculation time required for the analysis being long. On the other hand, focusing on the thickness of the outer layer being thin would lead to an idea of modeling the outer layer by partitioning it into a plurality of two-dimensional elements, resulting in the easy solution of the problem that the representative length of the each two-dimensional element is too large.

In view of the above findings, in the method according to the above mode (30), a bone of the human body which has a hard and thin outer layer and a soft inner portion thereof, is modeled by partitioning the outer layer into a plurality of shell elements, and by partitioning the inner portion into a plurality of three-dimensional elements.

Therefore, the present method would facilitate to assure the analyzing accuracy with an attempt to reduce the computational calculation time.

(31) The process according to the above mode (29) or (30), wherein the first modeling step comprises a step of partitioning the each first segment into the plurality of membrane elements each of which forms a quadrangle approximating a square.

(32) The process according to any one of the above modes (29)-(31), wherein the second modeling step comprises a step of partitioning the outer layer into the plurality of shell elements each of which forms a quadrangle approximating a square.

(33) The process according to any one of the above mode (29)-(32), wherein the second modeling step comprises a step of partitioning the inner portion into the plurality of three-dimensional elements each of which forms a hexahedron approximating a cube.

(34) A process of producing a human body model by modeling an object defined as a whole or a part of a human body, the object being constructed to include a plurality of original segments physically independent of each other, the process comprising:

a first partitioning step of partitioning each of the plurality of original segments, by at least one partition plane, into a plurality of sub-segments each of which has flatness a degree of which is higher than that throughout one of the plurality of original segments to which the each sub-segment belongs; and a second partitioning step of partitioning the each sub-segment into a plurality of elements, whereby the each sub-segment is modeled.

Conventionally, an object was modeled, focusing a plurality of original segments together constituting the object, which are physically independent of each other, by partitioning each original segment into a plurality of elements.

However, one of the plurality of original segments could be generally flat, and the other could be geometrically twisted. If the twisted original segment is partitioned into a plurality of elements, by treating the twisted original segment as a minimum unit for the modeling, there could possibly arise a case where the twisted original segment cannot be modeled such that its mechanical property is accurately represented.

In contrast, in the process according to the above mode (34), each original segment is partitioned into a plurality of sub-segment such that the flatness of each sub-segment is higher than that of an original segment to which the each sub-segment belongs. Subsequently, the each sub-segment is partitioned into a plurality of elements, by treating the each sub-segment as a minimum unit for the modeling, for thereby modeling the each sub-segment.

Consequently, the present process would facilitate to accurately model each original segment, irrespective of whether the each original segment is complex in its configuration or not.

The potential contribution of the present process to reduction in effort and time required for the modeling shows that one of the desirable applications of the present process is the environment where the reduction in effort and time required for the modeling is in particular strongly needed for modeling the whole human body in relation to its bone and joining structure. However, the concept underlying the present process may be adopted in the technology of modeling a part of the human body, as well.

(35) A method of effecting an analysis of at least one behavior of at least one of a plurality of segments together constituting a human body, by conducting a simulation of the at least one behavior under a predetermined simulation analysis condition on the basis of the human body model produced using the process according to the above mode (34), the improvement of the method comprising:

a condition determining step of determining the simulation analysis condition, in a case where adjacent ones of the plurality of elements of the human body model which are adjacent to each other with a corresponding one of the at least one partition plane located between the adjacent elements, do not coincide with each other in relation to coordinate values of nodes defined as vertexes of the adjacent elements, which nodes are positioned on the corresponding partition plane, and which the nodes originally coincide with each other, such that the nodes are not moved relative to each other during the simulation.

There could exist a case where, in the human body model provided according to the process defied in the above mode (34), adjacent ones of the plurality of elements of the human body model which are adjacent to each other with a corresponding one of the at least one partition plane located between the adjacent elements do not coincide with each other in relation to coordinate values of nodes defined as vertexes of the adjacent elements. These nodes are positioned on the corresponding partition plane, and originally coincide with each other. In this case, the simulation using the human body model by neglecting such an unintended disagreement between the adjacent elements could possibly result in decrease in the analyzing accuracy.

In the light of the above, in the method according to the above mode (35), in the case of the unintended disagreement between the nodes mentioned above, the simulation analysis condition is determined such that the nodes are not moved relative to each other during the simulation.

Therefore, the present method would treat the nodes really different from each other as if they are identical to each other, during the simulation.

Consequently, the present method would facilitate to avoid the technology of conducting the primary partition of each original segment prior to the secondary partition to a plurality of elements, from causing decrease in the simulation analyzing accuracy, on the contrary.

(36) A process of producing a human body model by modeling an object defined as a whole or a part of a human body, the object including a muscle extending over a real joint of the human body joining two bones thereof, the muscle being attached to the two bones at both ends of the muscle, the muscle being attached to one of the two bones at a middle of the muscle, the process comprising:

a modeling step of modeling the muscle using at least one one-dimensional element not having a thickness but having a length thereof, the at least one one-dimensional element permitting transmission of force therethrough, the modeling step having:

a first optimizing step of optimizing of a pass of the at least one one-dimensional element such that a state in which the at least one one-dimensional element extends along the two bones is maintained irrespective of a change in an angle forming between the two bones; and a second optimizing step of optimizing a connection between the at least one one-dimensional element and the two bones such that transmission of force between the at least one one-dimensional element and the two bones represents a real property of a corresponding portion of the human body.

The process according to the above mode (36) would facilitate to model the muscle extending over the real joint of the human body joining two bones thereof, such that the pass and force transmission characteristics of the muscle is accurately represented. The muscle is attached to the two bones at both ends of the muscle, and is attached to one of the two bones at a middle of the muscle.

(37) The process according to the above mode (36), wherein the first optimizing step includes a step of modeling the muscle such that the at least one one-dimensional element has two end attached points where the at least one one-dimensional element is attached to the two bones at both ends of the at least one one-dimensional element, and a middle attaching point where the at least one one-dimensional element is attached to the one of the two bones at the middle of the at least one one-dimensional element, the second optimizing step includes a step of modeling the connection between the at least one one-dimensional element and the one of the two bones at the middle attaching point such that the connection is represented using a conceptual combination of a pulley fixedly located on the one of the two bones, and a rope supported by the pulley.

The process according to the above mode (37) would make it easier to represent the pass and force transmission characteristics of the at least one one-dimensional element, by the use of the conceptual combination of the pulley and the rope.

(38) A process of producing a human body model by modeling an object defined as a whole or a part of a human body, the object including a complex of an Achilles tendon and a triceps surae extending from the Achilles tendon, the Achilles tendon being attached at one of both ends thereof opposite to an other end thereof at which the Achilles tendon is attached to the triceps surae, to a calcaneus of the human body, the triceps surae being attached at one of both ends thereof opposite to an other end thereof at which the triceps surae is attached to the Achilles tendon, to a femur of the human body, and the triceps surae being attached at a middle position thereof to a tibia of the human body, the process for modeling the complex by partitioning the complex by at least one one-dimensional element permitting transmission of force, comprising:

a first modeling step of modeling the complex such that each of the at least one one-dimensional element has two end attaching points which are located at both ends of the each one-dimensional element and at which the each one-dimensional element is attached to the calcaneus and the femur, and such that the each one-dimensional element has a middle attaching point which is located at a middle position of the each one-dimensional element and at which the each one-dimensional element is attached to the tibia; and a second modeling step of modeling a connection at the middle attaching point between the each one-dimensional element and the tibia, such that the connection is represented using a conceptual combination of a pulley fixedly located on the tibia, and a rope supported by the pulley.

The process according to the above mode (38) would facilitate to model the complex of the Achilles tendon and the triceps surae extending from the Achilles tendon, which complex extends over the real joint of the human body joining the tibia and the femur, such that the pass and force transmission characteristics of the complex is accurately represented.

Further, the process according to the above mode (38) would make it easier to represent the pass and force transmission characteristics of the at least one one-dimensional element, by the use of the conceptual combination of the pulley and the rope.

(39) A process of assisting a user of a computer with a screen in producing a human body model using the computer by means of modeling an object defined as a whole or a part of a human body, the process comprising:

a first display step of reading, out of a memory having stored therein at least one segment model each representing accurately a property of a corresponding one of a plurality of real segments together constituting the object, in association with each of the plurality of real segments, at least one of the at least one segment model corresponding to one of the plurality of real segments which the user attempts to model, and subsequently displaying on the screen the read at least one segment model; and a defining step of defining the displayed at least one segment model, depending on a command from the user, by providing the displayed at least one segment model with a shape and a size thereof reflected by the command.

In the method according to the above mode (39), at least one standard segment model representing a property of each one of a plurality of segments of an object to be modeled has been stored in a memory in association with each segment of the object. One of the at least one standard segment model corresponding to one of the plurality of segments which a user of the method attempts to model is read out from the memory, and then the read segment model is displayed on a screen of a computer.

Consequently, the present method would enable the user to model the human body by selecting an appropriate one from the at least one segment model, even though the user lacks the necessary experience and knowledge for modeling the human body.

As a result, the present method would turn it unessential for the user to define for each segment of the object, a segment model accurately representing a property of the each segment, from scratch.

(40) The process according to the above mode (39), wherein the at least one segment model having been stored in the memory includes a plurality of optional segment models different from each other in type, for each real segment of the human body, the process further comprises:

a selecting step of selecting one of the plurality of optional segment models as a final segment model, depending on a command from the user; and a second display step of displaying the selected final segment model on the screen.

In the method according to the above mode (40), for the same segment of the human body, not one segment model is displayed, but a plurality of segment models different from each other in type are displayed.

Therefore, the present method would increase the degree of freedom in selecting a segment model, resulting in the easy treatment of different needs of users of the method.

(41) The process according to the above mode (40), wherein at least one of the plurality of optional segment models for the same real segment of the human body is a segment model for modeling the same real segment using at least one one-dimensional element such that a connection between the same real segment and another real segment of the human body is represented using a conceptual combination of a pulley fixedly located on the another real segment, and a rope supported by the pulley.

The process according to the above mode (41) would make it easier to represent a pass and force transmission characteristics of the at least one one-dimensional element, by the use of the conceptual combination of the pulley and the rope.

(42) A computer program to be executed by a computer to implement the process according to any one of the above modes (39)-(41).

When a computer program according to the above mode (42) is executed by a computer, the same advantageous effects as any one of the above modes (39)-(41) provides would be provided, according to basically the same principle as one accepted in a method set forth in any one of the above modes (39)-(41).

The term "program" defined in the above mode (42) may be interpreted to include, not only a set of instructions to be executed by a computer so that the program may function, but also any files and data to be processed by the computer according to the set of instructions.

The term "program" defined in the above mode (42) may be interpreted as one achieving the intended purpose by being solely executed by a computer, or one achieving the intended purpose by being executed by a computer with another program. In the latter case, the program defined in the above mode (42) may be constructed mainly by data.

(43) A computer-readable storage medium having stored therein the computer program according to the above mode (42).

When the program having been stored in the computer-readable storage medium according to the above mode (43) is executed by a computer, the same advantageous effects as any one of the above modes (39)-(41) provides would be provided, according to basically the same principle as one accepted In the method set forth in any one of the above modes (39)-(41).

The "storage medium" defined in the above mode (43) may be realized in different types, including a magnetic recording medium such as a floppy-disc, an optical recording medium such as a CD and a CD-ROM, an optical-magnetic recording medium such as an MO, an unremovable storage such as a ROM, for example.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred It should be understood, however, that the invention is not limited to the precise arrangements and instrumentalities shown. In the drawings:

FIG. 4 illustrates by means of a table, minimum values of a representative length of each element of the whole human body model 30 illustrated in FIG. 3, for a cortical bone selected as a representative segment of the human body, and for a spongy bone selected as a representative segment of the human body;

DETAILED DESCRIPTION OF THE INVENTION

Several presently preferred embodiments of the invention will be described in detail by reference to the drawings'in which like numerals are used to indicate like elements throughout.

FIRST EMBODIMENT

Figure 1:
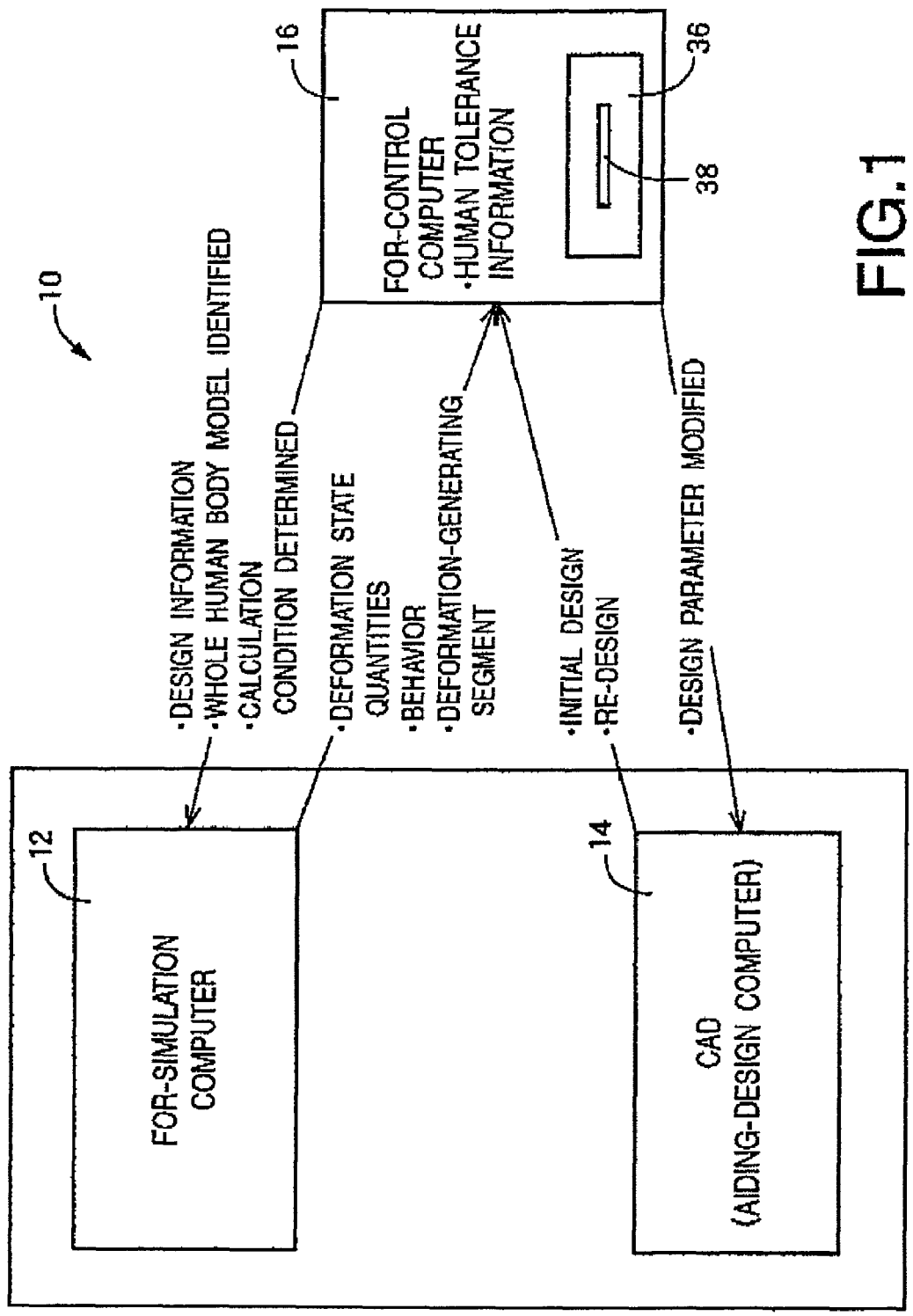
FIG. 1 schematically illustrates a human-body-behavior analyzing and applying system in which a human-body-behavior analyzing method according to a first embodiment of the present invention is used.

Referring first to FIG. 1, there is described a human-body-behavior analyzing and applying system 10 (hereinafter referred to simply as "analyzing and applying system 10"), in which a human-body-behavior analyzing method constructed according to a first embodiment of the present invention is effected.

The analyzing and applying system 10 is equipped with a computer system 12 for simulation, a computer system 14 for computer-aided design (CAD), and a computer system 16 for control. These computer systems 12, 14, 16 are shown in FIG. 1 by their abbreviated names, respectively, with the removal of the term "system."

The computer system 14 for computer-aided design, as well known to those skilled in the art, is for assisting a designer in designing the structure of a vehicle. This computer system 14 will be below referred to as "aiding-design computer 14," for the convenience of reference.

The computer system 12 for simulation is for analyzing by simulation, using of a whole human body model adapted to represent a behavior of an occupant of a vehicle, a behavior and a load (.e., a stress) of each segment of the occupant located in the vehicle. These behavior and load occur upon occurrence of contact of the vehicle with an obstacle or a barrier.

The computer system 12 for simulation is further designed to determine at least one of a plurality of segments together constituting the whole human body, at which an exceeding deformation having its magnitude not less than a predetermined reference is likely to be generated, as at least one deformation-generating segment, on the basis of the results from the simulation indicated above in relation to the loads of all segments of the whole human body.

More specifically, the above computer system 12 is adapted to determine one of the plurality of segments of the whole human body whose load is locally increased, as the above at least one deformation-generating segment, under the situation where the results from the simulation for the segments of the whole human body are respectively associated with positions at which the segments of the whole human body are disposed.

Thus, this computer system 12 functions to determine at least one of the all segments of the whole human body having the likelihood of generating the exceeding deformation as defined above, relatively in relation to other segments of the whole human body, on the basis of the results from the simulation of the loads.

Figure 2:
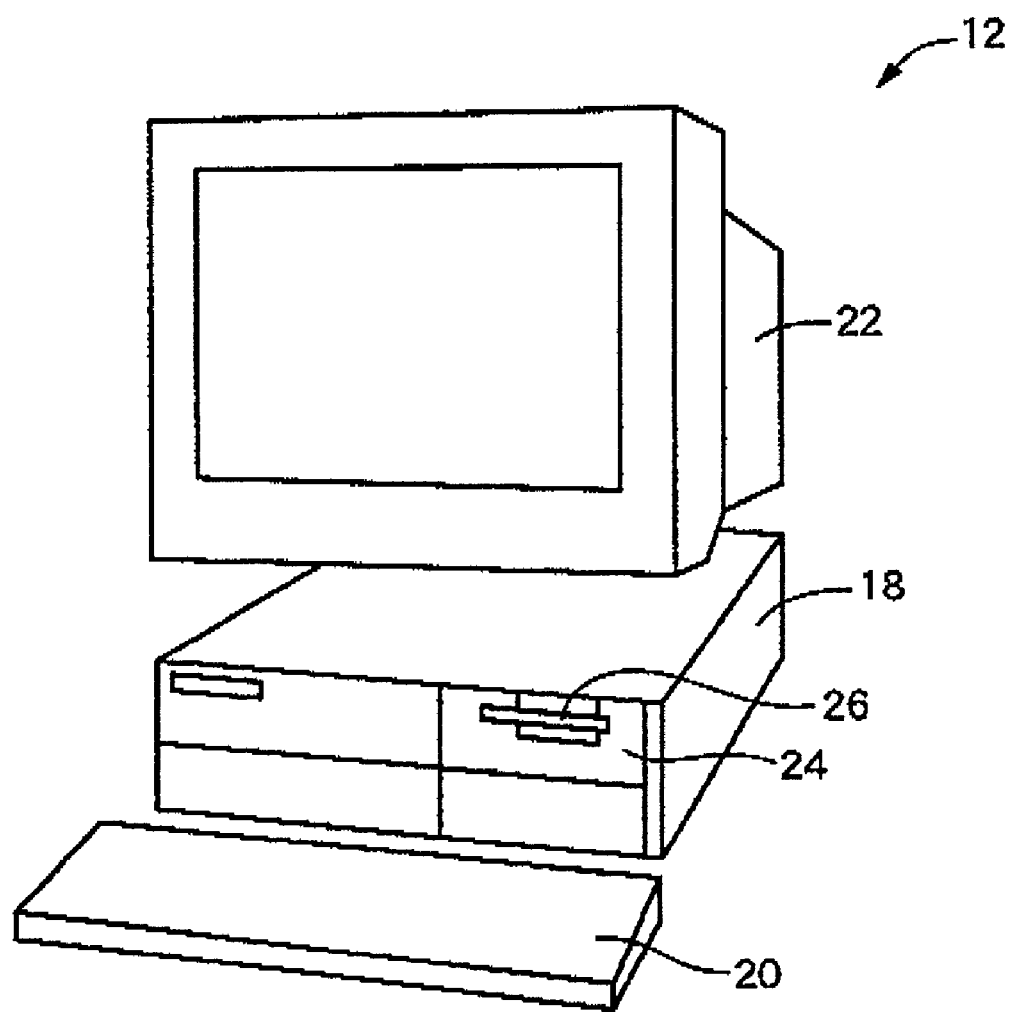
FIG. 2 is a perspective view of a computer system for simulation indicated in FIG. 1.

This computer system 12 for simulation is constructed, like the two other computer systems 14, 16 mentioned above, as shown in FIG. 2, so as to have a computer 18, a keyboard 20 and a mouse not shown, both of which function as an input devices for the computer 18, and a monitor 22 serving as an output device for the computer 18. The computer system 18 is configured, as well known to those skilled in the art, such that a CPU (central processing unit), a ROM (read only memory), and a RAN (random access memory) are connected with each other with a bus. The computer 18 is farther equipped with a storage device 24. The storage device 24 is adapted to alternately read out programs and data from a storage medium 26, such as, a hard-disc, a CD-ROM, etc., and write date to the storage medium 26. This computer system 12 will be below referred to as "for-simulation computer 12," for the convenience of reference.

The storage medium 26 as indicated above has already stored therein data for defining the whole human body model mentioned before, a simulation program for analyzing by simulation the behavior and degree of deformation of the occupant in the vehicle under impact, by the use of the whole human body model. The simulation program is for simulating, with the finite element method, the behavior and degree of deformation of the occupant in the vehicle under impact.

The finite element method is, as well known, as one of the numerical calculating approaches using a computer, an approach of partitioning a continuum into a plurality of elements each having a finite size, and numerically calculating the whole of a given system by incorporating a physical quantity of each one of the plurality of elements into a given simultaneous characteristic equations of material. Each of the characteristic equations is formulated to have its characteristic factors as ones for controlling the analyzing characteristic of the finite element method.

Figure 3:
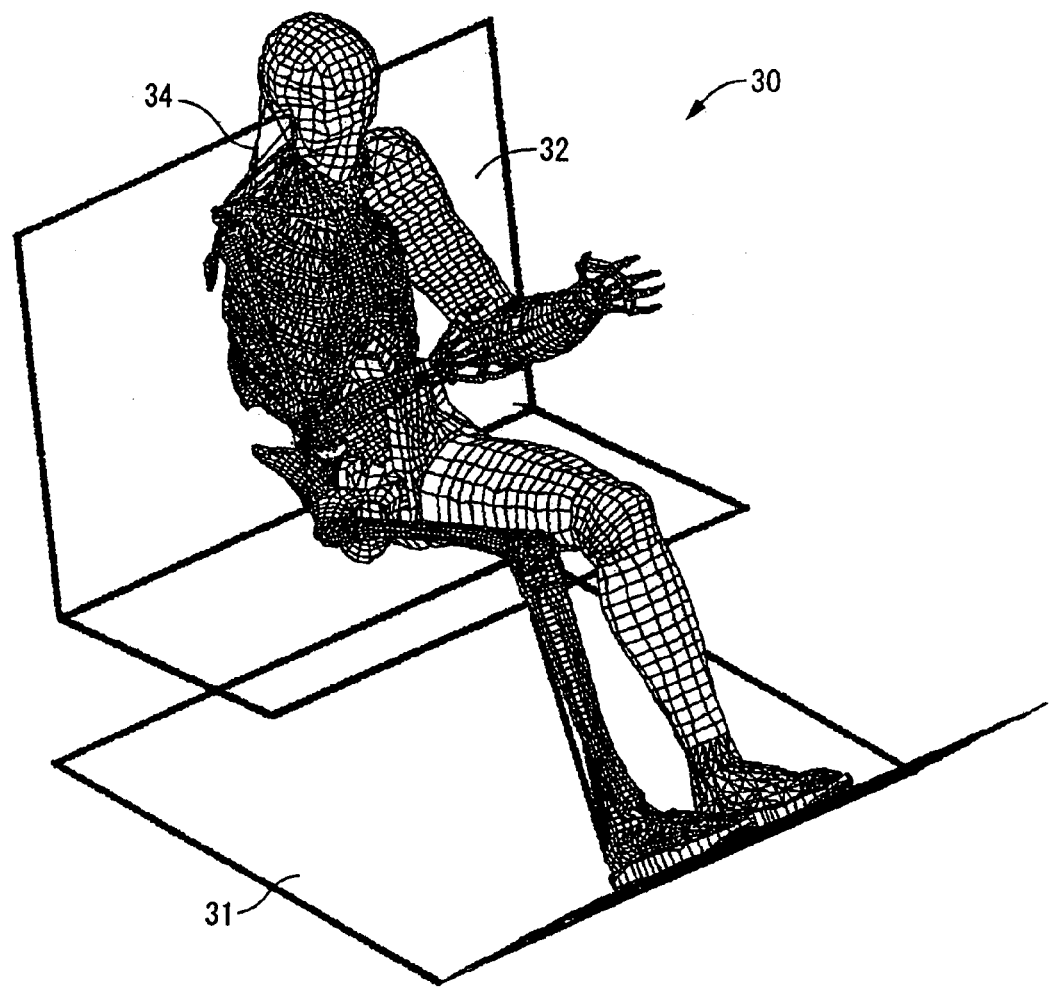
FIG. 3 is a perspective view illustrating together with a seat and a floor panel installed in a vehicle, a whole human body model 30 used by the computer system for simulation indicated in FIG. 1.

Referring now to FIG. 3, there is illustrated visually in three-dimensional, the whole human body model 30 having been stored in the storage medium 26 described above. In FIG. 3, the whole human body model 30 is shown in a posture permitting the whole human body model 30 to be seated on a simplified seat 32 in a vehicle with both feet of the whole human body model 30 placed on an inclined floor panel 31 facing toward the center of the vehicle. The whole human body model 30 is for numerically analyzing, with the above finite element method, a behavior and degree of deformation of an occupant in the vehicle under impact.

The whole human body model 30 is constructed so as to faithfully represent the whole human body with respect to a shape, mechanical properties including up to strength of bones and softness of a skin, of the whole human body, which skin constitutes a part of soft tissues of the whole humanbody.

More specifically, the whole human body model 30 is for representing in detail the whole human body with respect to the bones, the skin, and ligaments and tendons of the whole human body. The whole human body model 30 is further for representing muscles of the whole human body, and still further for representing a fresh and a fat of the whole human body, which fresh and fat constitute a part of the soft tissues mentioned above.

It is to be noted that, in FIG. 3, for the convenience of explanation, the right side of the whole human body model 30 is shown such that the bones, tendons, etc. are visible by removing a corresponding portion of the skin, the fresh, and the fat, while the left side of the whole human body model 30 is shown such that a corresponding portion of the skin is visible.

The whole human body model 30 is constructed without the use of a mechanistic model which is constructed by connecting a plurality of rigid segments using a plurality of mechanical joint elements for thereby representing the whole human body. As a result, the present embodiment would permit the anatomically faithful representation of the whole human body, resulting in the capability of accurately simulating a behavior of the whole human body.

The whole human body model 30 is provided by modeling all segments of the whole human body using a plurality of deformable elements each representing a deformation of each segment of the whole human body due to application of an external force to the whole human body. Therefore, the whole human body model 30 would permit a deformation of each of all segments of the whole human body to be accurately analyzed.

The whole human body model 30 is provided by further modeling au bones of the whole human body using a plurality of elastic-plastic elements each representing elastic-plastic material having a mechanical property defined such that a plastic region of the material property is followed by an elastic region of the material property. An increase in an external force applied to a bone of the whole human body in the plastic region indicated above leads to a fracture of the bone. As a result, the whole human body model 30 would permit a bone fracture of the whole human body to be analyzed and validated.

It will be understood from the above explanation that, in the whole human body model 30, the whole human body is represented with respect to its anatomic shape, structure and characteristic of the whole human body, at a high degree of fidelity, resulting in a precise representation of a physical response of each segment of the whole human body to application of an external force to the whole human body.

In the present embodiment, while the whole human body is thus modeled in relation not only to a bone structure of the whole human body but also a joining structure thereof, including ligaments, tendons, muscles, it does not mean that not all segments of the whole human body are modeled. That is, with regard to both a plurality of units together constituting the above-mentioned bone structure of the whole human body (here, one unit means an independent one bone, for example), and a plurality of units together constituting the above-mentioned joining structure of the whole human body (here, one unit means an independent one muscle, for example), at least one of the plurality of units which makes a large contribution to the analyzing accuracy of a behavior of the whole human body is modeled, while at least one of the plurality of units which makes a small contribution to the above analyzing accuracy is not modeled.

Figure 43:
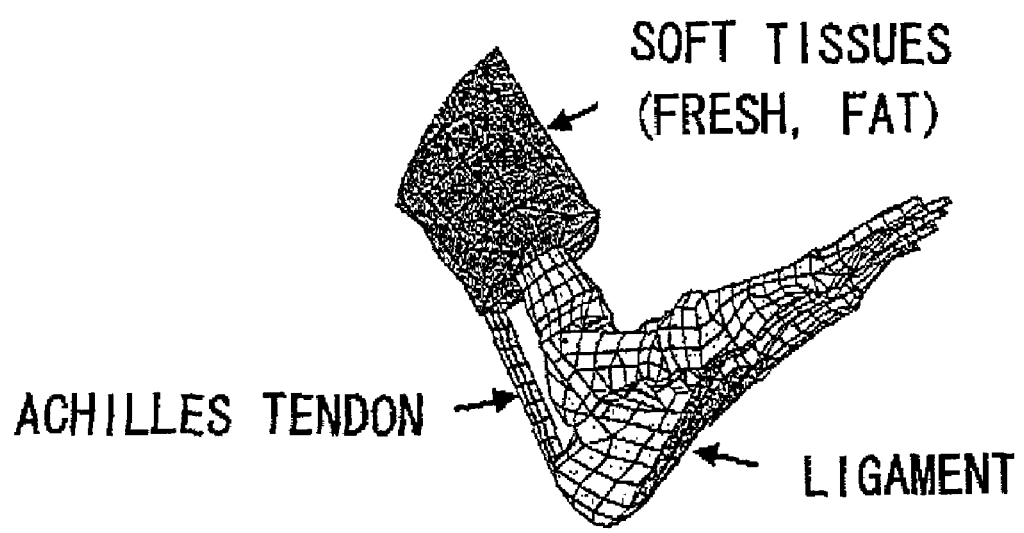
FIG. 43 is a perspective view illustrating a complex of a foot and an ankle of the whole human body model 30 illustrated in FIG. 3.

Described specifically, as shown in FIG. 43, in order to accurately analyze a deformation of a foot joint of the whole human body responding to input to the sole of the foot of the occupant indicated above, the Achilles tendon and ligaments disposed at the sole of the foot are modeled, for example. Additionally, as shown in FIG. 3, in order to accurately analyze a deformation of a head portion of the occupant, a muscle 34 of the occupant supporting the head portion in relation to the upper extremity of the occupant. In contrast, a portion of the aforementioned joining structure which tends not to be deformed upon application of an external impact to the vehicle is not modeled.

Thus, in the present embodiment, the selection of segments of the whole human body to be modeled is optimized for achievement of the purpose of simulation, meaning that the modeling is conducted such that the aforementioned simulation program requires a length of time considered practical in developing and designing vehicles.

In addition, in the present embodiment, as described above, the muscle 34 for supporting the head portion of the whole human body is modeled by means of at least one one-dimensional elastic bar, namely, at least one elastic bar element.

Further, in the present embodiment, the whole human body model 30 is provided with at least one variable parameter defining at least one of a shape, a location, a mechanistic property, and a mechanical property, of at least one of a plurality of segments of the whole human body model 30. The at least one variable parameter is supposed to be specified prior to the execution of the above simulation program, by a user of the analyzing and applying system indicated above.

There will be described below the whole human body model 30 more specifically.

1. Length of Each Element of the Whole Human Body Model 30

In the present embodiment, a series of simulations are conducted by repeating an unit simulation for the entire region of the whole human body model 30 by the for-simulation computer 12 identified above at a time step $\Delta t$ defined as a unit time interval.

In addition, for each element of the whole human body model 30, the above time step At is calculated as follows:

$$\Delta t = \{L_\sqrt{}(\rho/E)\}$$

Where,
- L: representative length of each element (practically, the length of the shortest side of each element, for example)
- E: Young's modulus for each element
- ρ: mass density for each element Then, it follows that the smallest one of a plurality of time steps Δt respectively corresponding to all elements of the whole human body model 30 is used as the time step Δt available for analyzing the entire region of the whole human body model 30.

As a rule of thumb, a suitable value of the minimum time step Δt is $1.0 \times 10^{-6}$. In the present embodiment, for adding an allowance to the above suitable value, the available minimum value of the time step Δt is predetermined as $1.2 \times 10^{-6}$, and the whole human body model 30 is constructed by modeling the whole human body into a plurality of elements so as to prevent the resulting value of the time step Δt, from being less than the predetermined available minimum value.

It is here noted that the Young's modulus E and mass density ρ both indicated above have respective values almost depending on a kind of each material of the whole human body to be modeled, which is to say, the location of each segment of the whole human body to be modeled. Consequently, meeting the available minimum value of the time step Δt requires to impose a given limitation on the size of elements into which the whole human body is to be partitioned. The given limitation is formulated as follows:

$$L > \{\sqrt{(\rho/E)}\} \times 1.2 \times 10^{-6}$$

For example, as illustrated in FIG. 4 in the form of table, in the event where a representative segment of the whole human body is selected as a cortical bone thereof, provided that the Young's modulus E is taken as 17 [GPa], and the mass density ρ is taken as 2,000 [kg/m$^3$], the minimum value of the representative length L of each element of the whole human body model 30 becomes 3.5 [mm].

On the other hand, as illustrated in FIG. 4, in the event where a representative segment of the whole human body is selected as a spongy bone thereof, provided that the Young's modulus B is taken as 0.07 [GPa], and the mass density ρ is taken as 1,000 [kg/m$^3$], the minimum value of the representative length L of each element of the whole human body model 30 becomes 0.32 [mm].

2. Total Number of Elements of the Whole Human Body Model 30

In order for the whole human body model 30 to be practical, the calculation time T of the for-simulation computer 12 for analyzing by simulation using the whole human body model 30 is required not to be too long. For thus improving the efficiency in the calculation, it is important to maximize the aforementioned minimum value of the time step Δt, and to minimize the element number N defined as the total number of elements constituting the whole human body model 30. Therefore, there can be recognized between these calculation time T, the element number N, and the time step Δt, the relationship according to which the calculation time T is proportional to the element number N divided by the time step Δt.

Focusing on the relationship between the element number N and the calculation time T, the length of the calculation time T is increased linearly with an increase in the element number N. The element number N being doubled results in the calculation time T being doubled.

In the present embodiment, the element number N of the whole human body model 30 is on the order of 100,000. Although it will be understood that, in the present embodiment, the analysis by simulation for a behavior and generated loads of the whole human body is conducted using the whole human body model 30 together with the relatively simplified model of the vehicle (see FIG. 3), the present invention can be practiced for analyzing by simulation a behavior and generated loads of the whole human body together with a behavior and deformation of the vehicle, by the use of the whole human body model 30 together with a model representing a real vehicle more faithfully. In the latter case, in general, the total number of elements constituting the vehicle model is larger than the element number N of the whole human body model 30, and is on the order of 200,000 to 300,000.

There will be discussed below which one of a change in the element number N of the whole human body model 30 and a change in the time step Δt has a larger influence on the calculation time T for the total of these two models, in using a combination of these two models.

First, discuss a level of influence of the element number N of the whole human body model 30. Even if the element number N of the whole human body model 30 is doubled, the number of elements of the total of these two models is increased to a value of the order of as small as 1.3 times, and accordingly, the overall calculation time T is increased to a value of the order of 1.3 times as well. Thus, the influence of a change in the element number N of the whole human body model 30 on the overall calculation time T is relatively small.

Next, discuss a level of influence of the time step Δt of the whole human body model 30. If the time step Δt of the whole human body model 30 is reduced to the half of the above-mentioned minimum value, provided that the time step Δt of the vehicle model meets the minimum value, the overall calculation time T is doubled. Thus, the influence of a change in the time step Δt of the whole human body model 30 on the overall calculation time T is relatively large.

In the light of the above, in the event of using the combination of the whole human body model 30 and the vehicle model, for improving the efficiency of the calculation, it is more important to focus on an attempt to adapt the time step Δt of the whole human body model 30 to the above-mentioned minimum value, than to focus on an attempt to reduce the element number N of the whole human body model 30, when partitioning the whole human body into a plurality of elements for constituting the whole human body model 30

In the present embodiment, there are taken countermeasures for preventing the time step Δt from being less than the aforementioned minimum value, in partitioning the whole human body into a plurality of elements.

The distal, middle and proximal phalanxes of the hands and the feet of the human body (hereinafter generally referred to as "phalanxes") are really very fine, for example. Therefore, if the phalanxes are modeled such that a corresponding portion of the resulting whole human body model 30 (hereinafter referred to as "phalanxes model") represents a mechanical property of the phalanxes sufficiently faithfully, the above-indicated time step Δt of the phalanxes model becomes less than the above-indicated minimum value. Described specifically, if the phalanxes are partitioned into a plurality of elements such that the aforementioned representative length of the each element is taken as 2 [mm], with the aforementioned Young's modulus and mass density being 17 [GPa] and 2,000 [kg/m$^3$], respectively, the time step Δt will become 0.69×10⁻⁶ [second] less than the minimum value, i.e., 1.2×10⁻⁶ [second].

In view of the above, in the present embodiment, the whole human body model 30 is constructed by partitioning the above phalanxes into a plurality of elements, such that the time step Δt of any one of the plurality of elements is avoided to be less than the above minimum value.

It is to be added that Wayne State University is known to have developed a detailed numerical model representative of a head portion of the human body (hereinafter referred to as "head model"). The time step as described above of the head model is 1.0×10⁻⁷ [second], leading to the prediction that the head model lacks its practicability required in particular for conducting the analysis by simulation using the combination of the head model and such a vehicle model as described above.

3. Structure of a Joint Portion of the Whole Human Body Model 30

In the present embodiment, the whole human body model 30 is constructed by modeling a joint portion of the human body such that a joining structure such as ligaments, tendons, etc. really positioned at the joint portion of the human body is faithfully represented in relation to at least a mechanical property of the joining structure.

Figure 5:
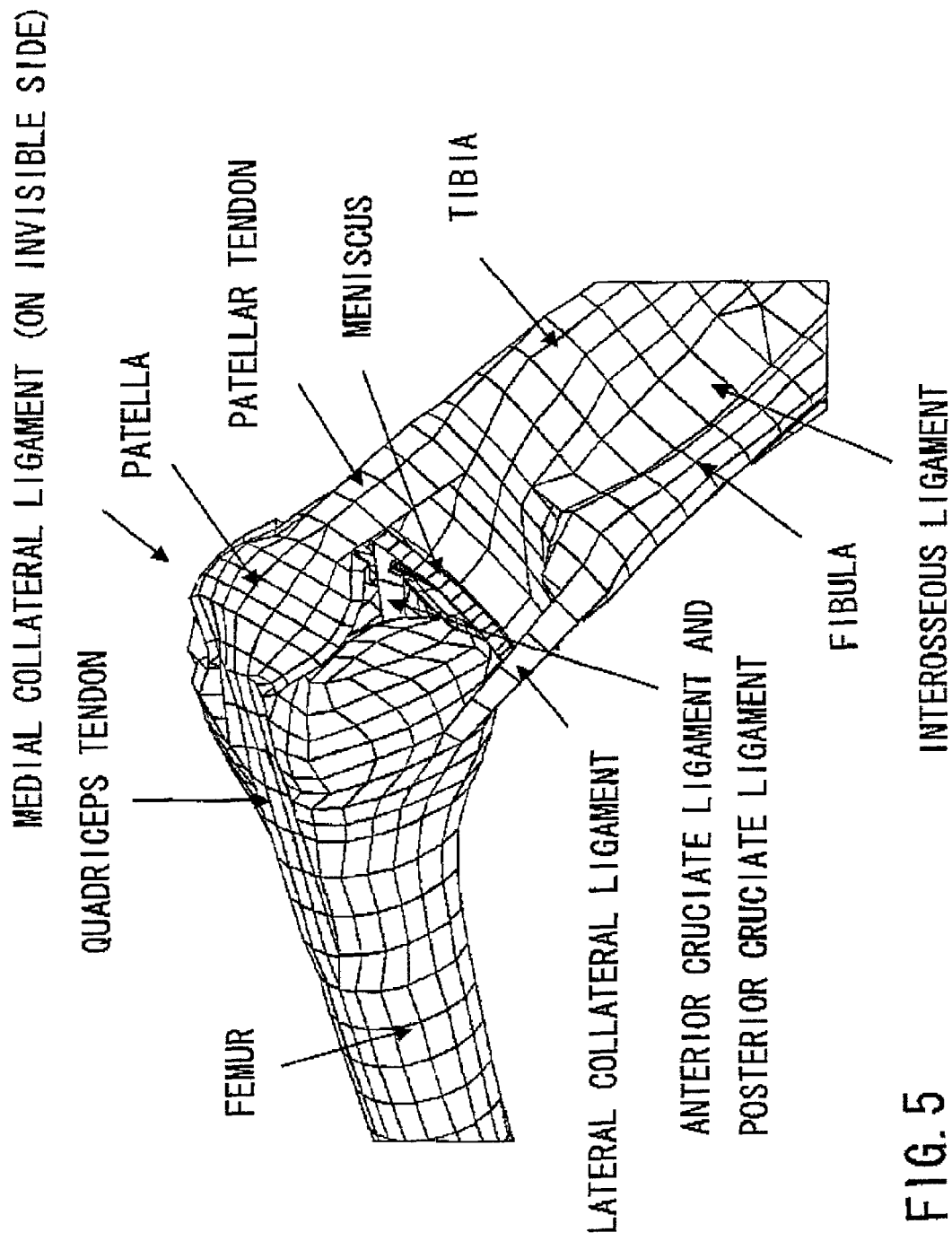
FIG. 5 is a perspective view illustrating a knee joint portion of the whole human body model 30 illustrated in FIG. 3.

Referring next to FIG. 5, there is illustrated in perspective view by enlargement by way of example, a portion of the whole human body model 30 corresponding to a knee joint portion of one of the left and right legs of the human body (hereinafter referred to as "knee joint portion model"). The knee joint portion model is formulated so as to represent a plurality of bones constituting the knee joint portion of the human body, and a joining structure of the human body, such as ligaments, tendons, etc. In FIG. 5, the knee joint portion model is illustrated such that bones, ligaments, tendons of the joint portion of the human body are visible, by removing the skin and fat of the human body, for the convenience of explanation.

For the above reason, the present embodiment represents a real stress-strain state of all joint portions of the human body more precisely than when the all real joint portions of the human body are modeled by means of a mechanical joint element. Consequently, the present embodiment would make it possible to represent a deformation state of all joint portions of the human body more accurately than the aforementioned conventional technology.

The human body includes a motion-axis-variable joint portion thereof having at least one motion axis around which ones of a plurality of bones of the human body mutually connected at the motion-axis-variable joint portion are movable relative to each other. The at least one motion axis is changeable in location depending on the relative movement of the ones bones. On example of such a motion-s-variable joint portion is the knee joint portion described above.

In the present embodiment, the whole human body model 30 is constructed by modeling the each motion-axis-variable joint portion, such that the above-mentioned change in location of a corresponding motion is represented by adopting to the whole human body model 30 a structure anatomically equivalent to the each motion-axis-variable joint portion.

For the above reason, the present embodiment would permit each motion-axis-variable joint portion to be modeled so as to faithfully represent both its mechanical and mechanistic properties, eventually allowing the analysis of deformation and movement of each motion-axis-variable joint portion, to be conducted more accurately than when it is conducted by the aforementioned conventional technology.

Further, in the present embodiment, the whole human body model 30 permits an analysis of behavior of the whole human body and an analysis of deformations of all segments of the whole human body including joint portions thereof For the above reasons, the present embodiment, permitting a plurality kinds of analyses to be conducted using the same whole human body model 30, would permit an easy reduction in the calculation time of the above-indicated for-simulation computer 12 required for the analysis of the whole human body behavior and the analysis of the whole human body deformation state.

4. A Portion of the Whole Human Body Model 30 Corresponding to a Thorax and Abdomen Portion of the Human Body In a conventional numerical model representative of the human body, an overall deformation of organs in the human body is represented or reproduced for its assessment using macroscopic physical quantities such as a maximum amount of deflection, a maximum velocity of deflection, a viscosity reference (namely, a product of an amount of deflection and a velocity of deflection). For this reason, this conventional human body model would arise difficulty in reproducing for evaluation of individual deformations for individual organs in the human body.

Figure 6A:
FIGS. 6A and 6B are a front view and a plan view both illustrating a spleen model forming a portion of the whole human body model 30 illustrated in FIG. 3, respectively.
Figure 6B:
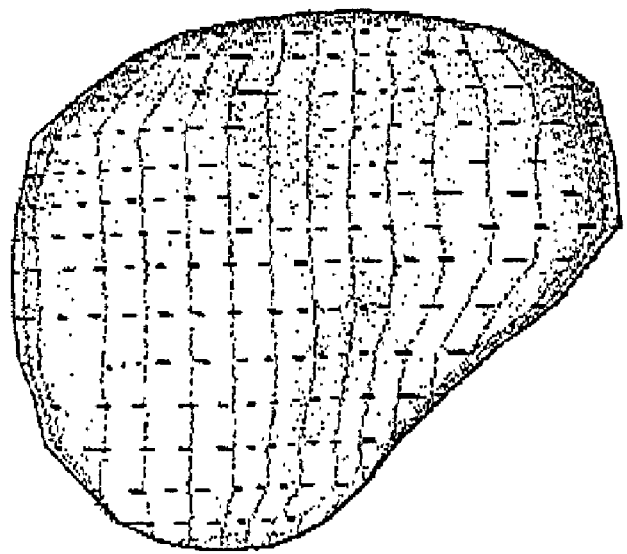
Figure 7A:
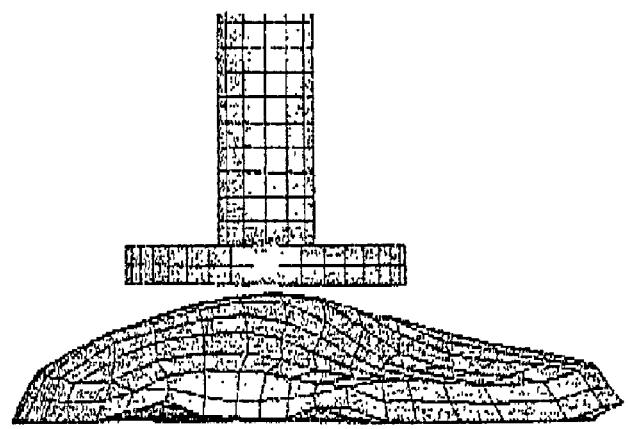
FIGS. 7A and 7B are a front view and a perspective view both for explaining a dynamic test for deformation for validation of the spleen model illustrated in FIG. 6.
Figure 7B:
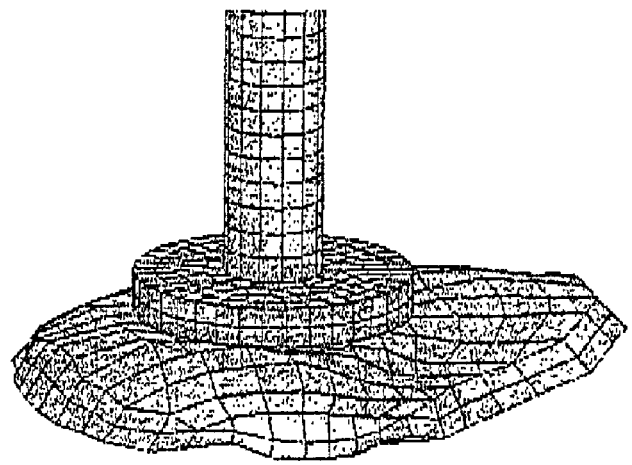
Figure 8A:
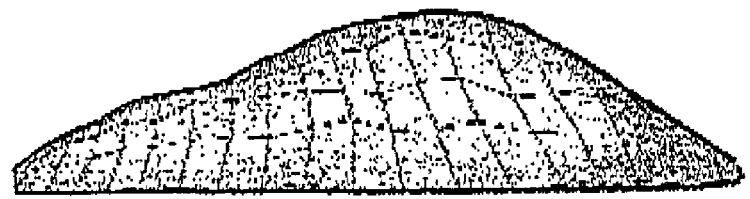
FIGS. 8A and 8B are, a front view and a plan view both illustrating a liver model forming a portion of the whole human body model 30 illustrated in FIG. 3, respectively.
Figure 8B:
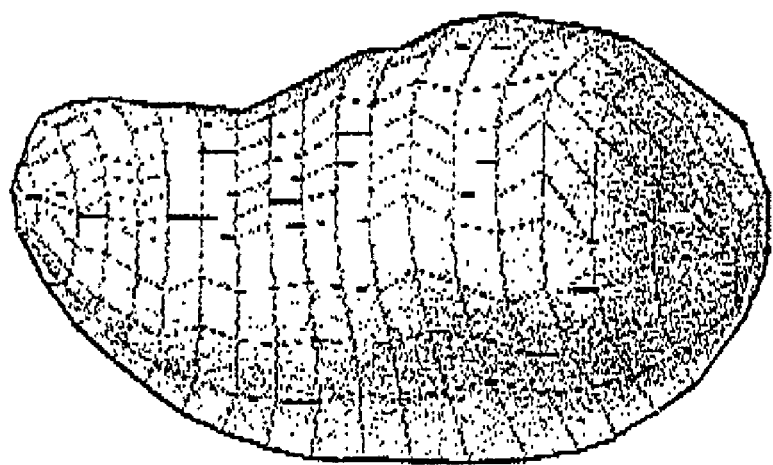
Figure 9:
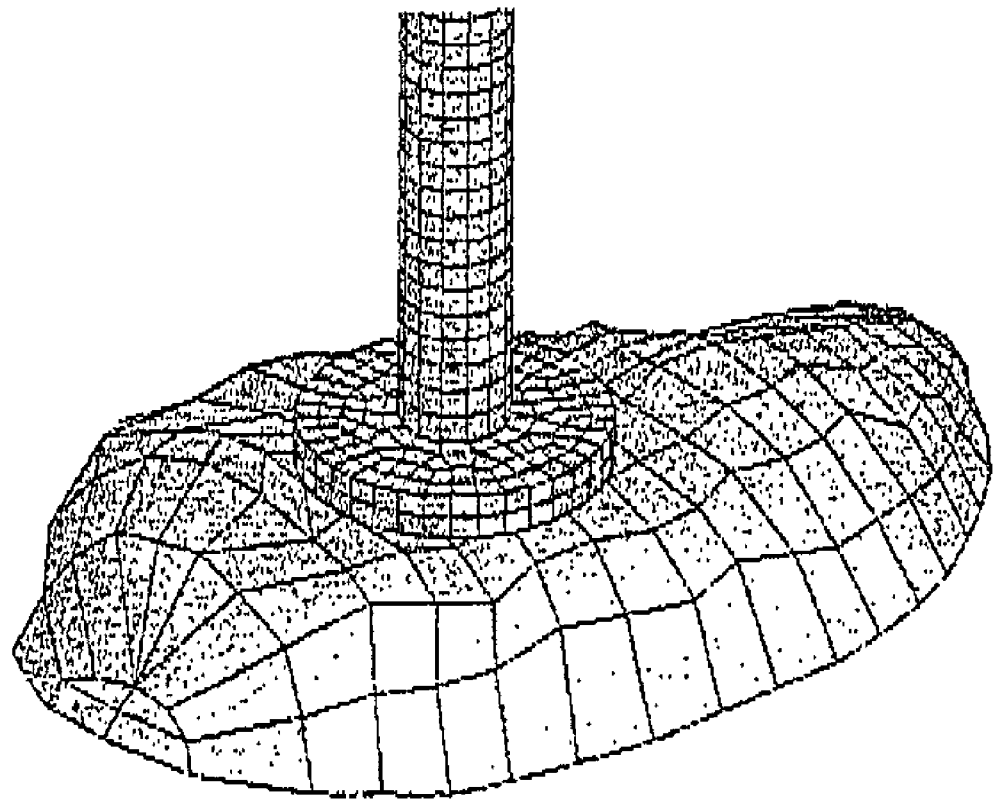
FIG. 9 is a perspective view for explaining a dynamic test for deformation for validation of the liver model illustrated in FIG. 8.

In contrast, in the present embodiment, the whole human body model 30 is constructed by modeling a real thorax and abdomen portion of the human body so as to permit a plurality of organs really disposed within the real thorax and abdomen portion to be individually represented with respect to at least a characteristic of deformation thereof Ones of a plurality of organs in the human body the assessment of which are particularly important for evaluating a state of deformation of the thorax and abdomen of the human body in the analysis of the human body under impact, are a spleen and a liver of the human body. Therefore, in the present embodiment, the whole human body model 30 is constructed by modeling the human body faithfully in relation to least the spleen and liver. In FIGS. 6A and 6B, a spleen model 35a is illustrated in frontal and plan views, respectively, while in FIGS. 7A and 7B, a dynamic test for deformation of the spleen wherein a given tool is forced onto the spleen model 35a for verifying the validity thereof, is illustrated in frontal and perspective views, repectively; In addition, in FIG. 8, a dynamic test for deformation of the liver wherein a given tool is forced onto a liver model 35b for verifying the validity thereof, is illustrated in perspective view.

It will be understood from the above that, since the present embodiment permits organs (to be exact, ones of a plurality of organs in the human body the individual assessments of which are important in evaluating a state of deformation of the thorax and abdomen portion of the human body) to be individually modeled, the present embodiment would permit analysis and validation of a state of deformation for each organ in the human body.

Described specifically, in the present embodiment, the analysis by simulation under a given condition using the whole human body model 30 permits the prediction of a quantity indicative of a state of deformation such as a load, an amount of deflection, etc., of each organ in the human body, further permits the prediction of a local stress as another type of such a quantity indicative of a state of deformation. That is, the present embodiment permits under a given condition the prediction of data indicative of quantities of a state of deformation for each organ in the human body.

Furthermore, in the present embodiment, on the basis of the data predicted under the given condition, an occurrence of the above-defined exceeding deformation is predicted. More specifically, the predicted data and a predetermined deformation tolerance (i.e., a value which a given quantity indicative of a state of deformation is exceed to exceed when the exceeding deformation is generated at each organ) are compared with each other. When the predicted data exceeds the predetermined deformation tolerance, it is predicted that a corresponding organ generates the exceeding deformation.

The fact that the occurrence of the exceeding deformation in a certain organ has been predicted can be informed the user of the above-indicated analyzing and applying system via the monitor 22 described above using a means for conveying information. The means may be constructed in the form of characters, symbols, etc. The above fact also can be informed the user depending on a change in the color of a corresponding organ on the monitor 22.

In the present embodiment, the above-mentioned deformation tolerance of each organ was determined by reference to relevant values reported in previous literatures, and/or was determined as a result of substituting each real organ of the human body with a corresponding organ of a given edible animal. Described specifically, in the case of the use of the given edible animal, each substitute organ for the each real organ of the human body was subjected to a tensile-compressive test with a slice of the substitute organ used as a subject to be tested, and a state of deformation of the slice was evaluated. Further, the whole of the each substitute organ was subjected to a dynamic test for deformation of the each substitute organ, and a state of deformation of the each substitute organ was evaluated Subsequently, results from the evaluation based on the tensile-compressive test and the evaluation based on the dynamic test cooperated to define the deformation tolerance indicated above, 5. Types of Each Element of the Whole Human Body Model 30

Types of each element constituting the whole human body model.30 are categorized in shape into a one-dimensional element, a two-dimensional element, and a three-dimensional element.

The one-dimensional element is a bar element having a length but not having a thickness, and causing a reaction force in a longitudinal direction of the one-dimensional element either in an extended state or in a contracted state. That is, the one-dimensional element is defined as an element longitudinally causing a tensile force and a compressive force.

The above-mentioned two-dimensional element, being an element having an area but not having a thickness, is categorized into a shell element and a membrane element. The shell element is a two-dimensional element causing a tensile force and a compressive force in a direction along the shell element. On the other hand, the membrane element is a two-dimensional element causing a tensile force but not causing a compressive force in a direction along the membrane element.

The above-mentioned three-dimensional element is a solid element causing a tensile force and a compressive force in any direction.

In an attempt to model each segment of the human body by partitioning the each segment in to a plurality of elements, the problem as to which one of the above types of each element should be selected is important in relation to the calculation time and analyzing accuracy of the simulation using the whole human body model 30.

Each ligament in the human body is categorized into at least two kinds, from the aspect of its structure, namely, a non-contact type of ligament and a contact type of ligament. The non-contact type ligament does not contact, at a portion of the ligament other than a connecting portion connecting a plurality of bones of the human body, with these bones and other parts of the human body, such as other bones, other ligaments, etc. This type of ligament can be said a ligament purely connecting bones. On the other hand, the contact type of ligament contacts, at a portion of the ligament other than the above connecting portion, with these bones or other parts of the human body. This type of ligament can be said a ligament having a contact area at the portion other than the connecting portion.

Compare a first approach of modeling a ligament using a bar element and a second approach of modeling a ligament using a two-dimensional element. The first approach has such an advantage as to permit the efficient modeling of the ligament, and, on the other hand, the first approach has such a disadvantage as to fail to represent a state of the contact of the above-mentioned contact type of ligament. The reason is that, although the state of contact is really established with the ligament being in contact with other part of the human body forming a contact area between them, modeling the ligament using bar elements would follow that the bar element locally contacts with other part of the whole human body model 30 forming a contact line between them, resulting in the other part being subjected to a force larger than a real one, due to the unintended local contact.

While the above second approach is inferior to the first approach in relation to improvement in the modeling efficiency, the second approach permits a state of the contact of the above contact type of ligament to be accurately represented, because a two-dimensional element representative of the ligament contacts with other part of the human body model 30 forming a contact area between them.

A ligament of the human body longitudinally produces a reaction force in a extended state, while the ligament is subjected to bucking and produces no reaction force in a contracted state. Accordingly, not a shell element but a membrane element is a preferable two-dimensional element for modeling a ligament, from the aspect of accurately reproducing a ligament.

In the light of the above, in the present embodiment, the aforementioned non-contact type of ligament is modeled using bar elements, while the aforementioned contact type of ligament is modeled using membrane elements. This holds true in modeling a tendon of the human body.

Described specifically, as shown in FIG. 5, in a ligament of a knee of the human body, each of a medial and a lateral collateral ligament connects a plurality of bones with each other, and contacts with a femur, etc. of the human body. Representing the state of contact between them is important in simulating a behavior of the human body. Therefore, the medial and the lateral collateral ligament are modeled using a membrane element not a bar element.

Additionally, as shown in FIG. 5, an anterior and a posterior cruciate ligament of the human body contact with each other, and accordingly, they are modeled using a membrane element not a bar element, like the medial and the lateral collateral ligament explained above.

A joint of head of rib of the human body disposed between a thoracic vertebra and a rib does not contact with other part of the human body, for example. Therefore, in the present embodiment, a ligament extending over the joint of head of rib is modeled using a bar element, for giving priority to improvement in the modeling efficiency. The above ligament is different from a bar element longitudinally causing a tensile and compressive force, in that the ligament is capable of longitudinally causing only a tensile force. However, the joint of head of rib is almost stationary, meaning the analysis of behavior thereof does not require a high degree of the analyzing accuracy. For the reason, in the present embodiment, the ligament over the joint of head of rib is modeled using a bar element. The joint of head of rib is called "castocentral joint."

The whole bone of the human body is constructed to have at its outer layer a hard cortical bone. The cortical bone can be modeled using either a shell element or a solid element. On the other hand, a thickness of the cortical bone is not larger than 4 [mm]. If the cortical bone, although it has a portion thereof whose thickness is less than 3.5 [mm], is modeled using a solid element, a solid element having a real value of the above-mentioned representative length L less than the aforementioned minimum value of the representative length L, i.e., 3.5 [mm] will be provided. It means that a solid element failing to meet the minimum value of the representative length L which meets the minimum value of the time step $\Delta t$ will be provided In view of the above, in the present embodiment, the cortical bone is modeled using not a solid element but a shell element, for thereby meeting the minimum value of the time step $\Delta t$. The reason why the cortical bone is modeled using a shell element not a membrane element is that the cortical bone is capable of longitudinally generating a reaction force, either in an extended state or in a contracted state.

In addition, in the present embodiment, a spongy bone constituting the inner portion of the whole bone is modeled using a solid element.

6. Number of Faces of Each Solid Element of the Whole Human Body Model 30

A solid element in the whole human body model 30 is categorized in the number of faces forming a surface of the solid element. The number of faces, like the above-mentioned element type, affects the calculation accuracy and time of simulation using the whole human body model 30.

A shape of a solid element can take as a tetrahedron, a pentahedron, or a hexahedron. In the case of a tetrahedral solid element, there exists the tendency that a stress distribution, etc. calculated by the simulation is insufficient in the calculating accuracy is known, In this case, for solving the insufficient accuracy, a tetrahedral solid element is downsized to increase in the number of resulting elements of the whole human body model 30. However, this will cause the likelihood that the aforementioned minimum value of the time step $\Delta t$ is not be met.

On the other hand, in the case of a hexahedral solid element, it is easy to assure the calculating accuracy during the simulation, and is unnecessary to positively downsize the hexahedral solid element. This results in being capable of easily meeting the aforementioned minimum value of the time step $\Delta t$, also being capable of easily limiting an increase in the calculation time for the simulation.

With the above in mind, in the present embodiment, the whole human is basically modeled such that resulting solid elements are all hexahedral. In particular, bones of the whole human body use no tetrahedral solid element for the modeling. A pentahedral solid element is used for the modeling.

7. Forms of Each Element of the Whole Human Body Model 30

Each element of the whole human body model 30 which is a two-dimensional or solid one has a two-dimensional or three-dimensional form, respectively. This form of each element, like the number of faces and types, as described above, affects the calculating accuracy and the calculation time for the simulation using the whole human body model 30.

As for a hexahedxal solid element, for example, as its tree-dimensional form is getting closer to a cube, the calculating accuracy and the calculation time for the simulation using the whole human body model 30 are improved. As for a quadrangular two-dimensional element, as its two-dimensional form is getting closer to a square, the calculating accuracy and the calculation time for the simulation using the whole human body model 30 are improved.

In the light of the above, in the present embodiment, the whole human body is partitioned such that a resulting hexahedral solid element is approximated in its three-dimensional form to a cube as much as possible, and such that a resulting quadrangular two-dimensional element is approximated in its two-dimensional form to a square as much as possible, for thereby producing the whole human body model 30.

8. Approach of Element-Partitioning for the Whole Human Body Model 30

According to a general partitioning approach, for producing the whole human body model 30, each of separate segments of the whole human body physically separate from other segments is focused on, and then, the whole of each separate segment is partitioned into a plurality of elements. However, this general partitioning approach possibly arises a case where an element improper from the aspect of the calculating accuracy of the simulation and the aspect of a real value of the time step $\Delta t$ is produced. This case is arisen when each separate segment is so complex in its shape that a local configuration thereof largely varies depending on its position in the same separate segment.

An ilium forming a part of a hipbone extending outwardly at a pelvis of the human body, for example, is twisted as large as about 90 [degree] at an upper portion and a lower portion thereof. The hipbone, which is physically constituted by one part so as to have a complex shape thereof, is anatomically divided into the ilium, and an ischium and a pubis. These ilium, ischium and pubis are twisted in relation to each other. For this reason, if the whole hipbone is partitioned into a plurality of elements for modeling the hipbone, an improved calculating accuracy and calculation time of the simulation are not achieved for the hipbone.

In view of the above, in the present embodiment, in a case where a physically separate segment of the human body is largely changed in shape depending on its local positions, the segment is first partitioned by some partitioning planes into a plurality of sub-segments, such that each sub-segment is avoided as much as possible from being changed in shape depending on its local positions. Each sub-segment is then partitioned into a plurality of elements, not depending on other sub-segments Eventually, a plurality of elements groups for a plurality of sub-segments into which the same segment has been partitioned are mutually joined at the corresponding partitioning planes.

As a result of individually partitioning a plurality of sub-segments of the same segment by some partitioning planes into a plurality of elements, independent of each other, it is possible that two nodes which originally coincides with each other do not coincide. These two nodes belong to one of the plurality of sub-segments adjacent to each other at the partitioning planes.

Figure 10:
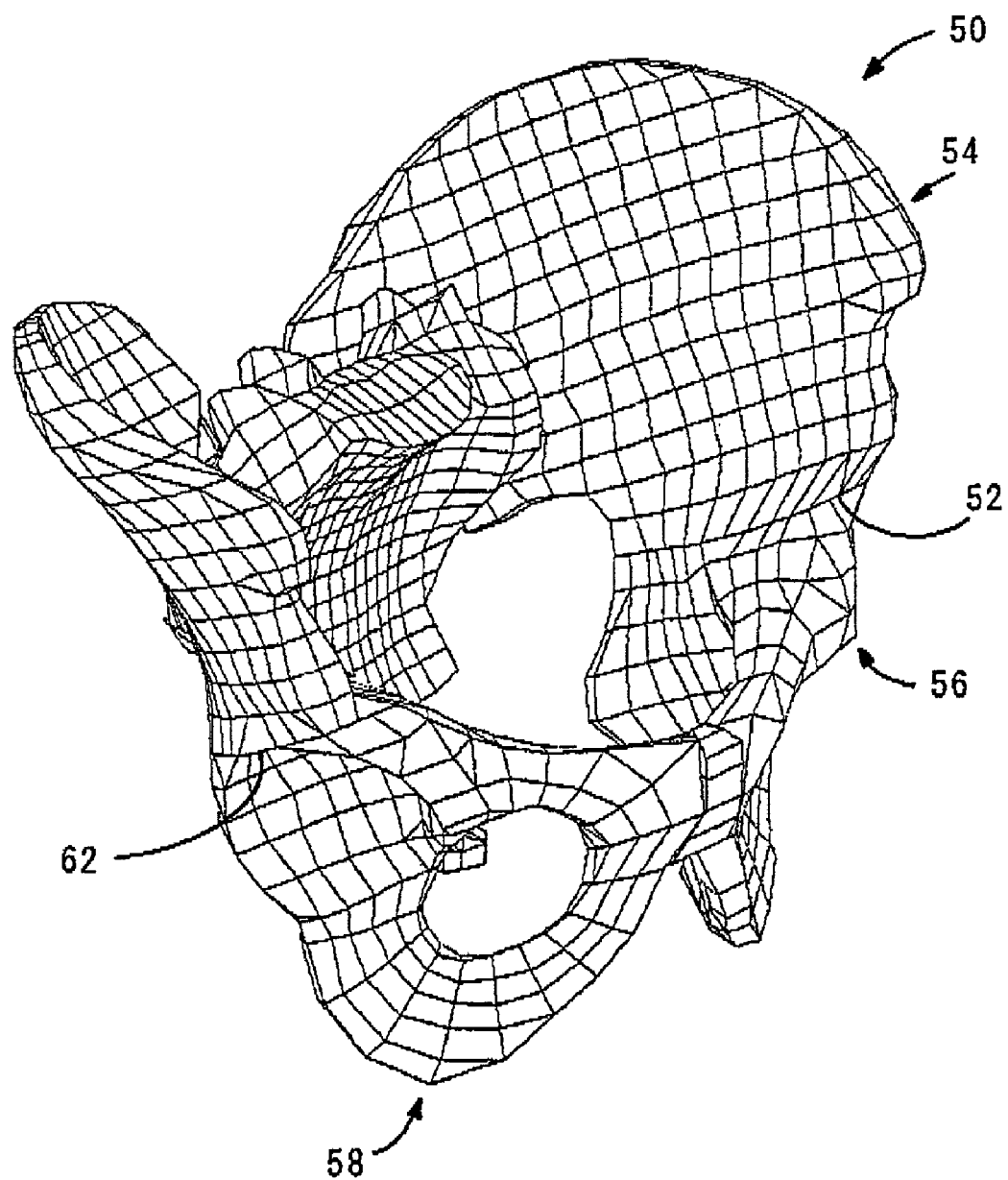
FIG. 10 is a perspective view illustrating a hipbone model forming a portion of the whole human body model 30 illustrated in FIG. 3.

As shown in FIG. 10, an ilium 50, for example, was partitioned by a partitioning plane 52 into an upper sub-segment 54 and a lower sub-segment 56, followed by an into-element-partitioning being individually conducted for each sub-segment 54, 56. The into-element-partitioning was conducted for each sub-segment 54, 56 on the basis of their individual characteristics in shape. Therefore, a plurality of elements adjacent to each other at the partitioning plane 52 do not share all nodes on the partitioning plane 52.

In addition, as shown in FIG. 10, the ilium 50 (or the sub-segment 56) and an ischium 58 were partitioned by a partitioning plane 62, and subsequently, the into-element-partitioning was conducted for the ilium 50 (or the sub-segment 56) and the ischium 58 independent of each other. Consequently, there exist nodes on the partitioning plane 62 not being shared by the ilium 50 (or the sub-segment 56) and the ischium 58.

The above partitioning planes 52, 62, which do not really exist, are ones introduced for optimization of the into-element-partitioning. For the reason, nodes not being shared by a plurality of elements adjacent at each partitioning plane 52, 62 were produced, although the aforementioned general partitioning approach would not produce such nodes Despite of that, if stresses of each segment of the human body are analyzed by simulation using the thus provided whole human body model 30, its analyzing accuracy would be lowered due to the discontinuity of elements arising from the introduction of those partitioning planes.

In view of the above, in the present embodiment, in order for the problem of the above discontinuity of elements to have a limited degree of the effect on the simulation analysis, the initial condition of the simulation analysis is predetermined to prevent a relative positional relationship between a plurality of nodes which are originally shared by a plurality of elements, from being changed dung the simulation, even if a force or a compulsory displacement is imposed to each of the plurality of elements.

As a result, the present embodiment would facilitate the optimization of shape of each element of the whole human body model 30, limiting a decrease in the analyzing accuracy due to the above-mentioned discontinuity of elements.

It is added that there exist other segments of the human body which vary in shape depending on its local positions, and, one example is a soft tissue (the skin and the fresh) surrounding the lower extremity of the human body. In the present embodiment, the soft tissue was partitioned into a sub-segment corresponding to the femur, and a sub-segment corresponding to the knee. Subsequently, each of these two sub-segments was subjected to the above-mentioned into-element-partitioning, and then, the initial condition of the simulation analysis was determined to limit a decrease in the analyzing accuracy due to the above-mentioned discontinuity of elements.

9. Approach of Mutually Attaching Elements in the Whole Human Body Model 30

As for a joining structure of the human body defied as the muscle, the tendon, or the ligament, there exists the type which extends over a joint of the human body, which is attached to two bones bendable in relation to each other, at both ends of the joining structure, to thereby connect these two bones with each other, and which is attached to one of these two bones at a portion of the joining structure other than the both ends.

One example of the type of the joining structure is a complex of the Achilles tendon extending from a calcaneus at the lower extremity of the human body, and a triceps surae (i.e., a calf muscle) extending from the Achilles tendon. The triceps surae is attached to the vicinity of a proximal end (on the side of the knee) of a tibia and the vicinity of a distal end (on the side of the knee) of a femur, at one end of the triceps surae opposite to the other end at which the triceps surae is connected with the Achilles tendon.

It can be proposed that, for modeling the type of the joining structure using one bar element, the one bar element is constructed by considering two primary attaching points of the joining structure at which it is attached to two bones connected by the joining structure, by not considering the remainder attaching point. According to this proposal, it follows that the resulting bar element is constructed so as to extend between those two primary attaching points, forming a straight pass.

Figure 11:
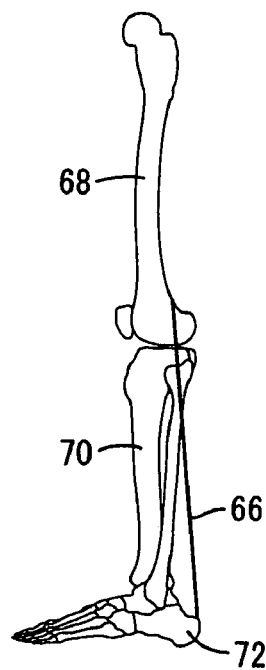
FIG. 11 is a side view illustrating a lower extremity of the whole human body model 30 illustrated in FIG. 3, with a knee joint portion of the lower extremity being extended.
Figure 12:
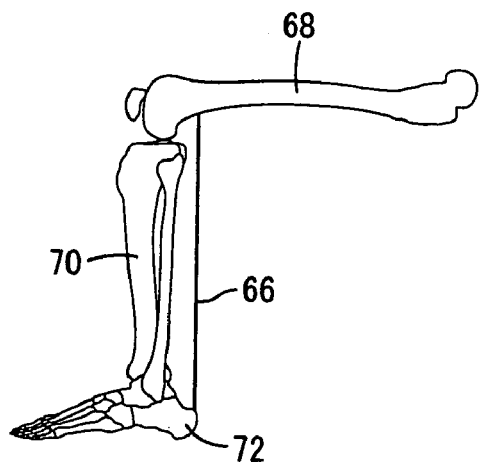
FIG. 12 is a side view illustrating the lower extremity of the whole human body model 30 illustrated in FIG. 3, with the knee joint portion of the lower extremity being bended.

In a case where the human body is assumed to be subjected to such a movement as to permit two bones connected by such a joining structure to be largely changed in the angle between these two bones, a pass formed by a bar element modeling the joining structure passes is largely changed, between before and after a change in the angle between those two bones In a case where the type of the joining structure is, for example, the aforementioned complex of the Achilles tendon and the triceps surae, and where the complex is modeled by using a bar element 66, in a stretching state of the knee, as shown in FIG. 11, the bar element 66 extends almost straight along the femur 68 and the tibia 70, while, in a bending state of the knee, the bar element 66 extends through a pass extending apart from those femur 68 and the tibia 70. Thus, the length of the bar element 66 is largely different in the stretching state from in the bending state.

The difference in length would place an obstacle in the way of an attempt for the bar element 66, to accurately represent the real motion characteristic of the above-mentioned complex. Described specifically, if the bar element 66 is set so as not to reach the elastic limit thereof in the stretching state of the knee, in the light of the presence of the elastic limit of the bar element 66, for example, the bar element 66 will produce a slack not really existing, in the bending state of the knee. Alternatively, if the bar element 66 is set so as not to reach the elastic limit thereof in the bending state of the knee, the bar element 66 will produce such a strong expansion not really existing, in the stretching state of the knee.

Figure 13:
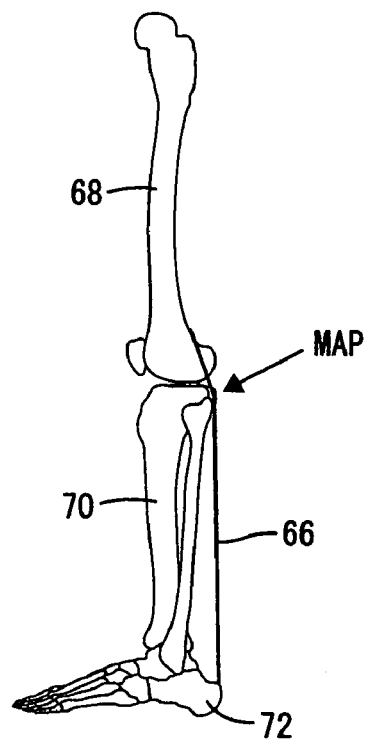
FIG. 13 is another side view illustrating the lower extremity of the whole human body model 30 illustrated in FIG. 3, with the knee joint portion of the lower extremity being extended.
Figure 14:
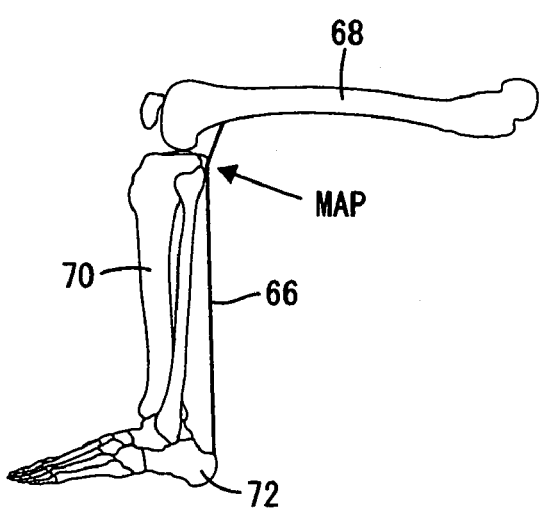
FIG. 14 is another side view illustrating the lower extremity of the whole human body model 30 illustrated in FIG. 3, with the knee joint portion of the lower extremity being bended.

It will be understood from the above, the pass of the bar element 66 is desirably caused to extend along the femur 68 and the tibia 70, as shown in FIGS. 13 and 14, irrespective of whether the knee is placed in the stretching state or in the bending state, from the perspective of accurately representing the motion characteristics of the complex.

However, only such an optimization of the pass would not be enough. The optimization can be realized by fixedly attaching the above-mentioned complex to the corresponding bones, at the attaching point to the calcaneus 72 (i.e., a lower attaching point LAP), at the attaching point to the femur 68 (i.e., an upper attaching point UAP), and at the attaching point to the tibia 70 (i.e., a middle attaching point MAP), for example, However, the approach of fixedly attaching the complex to the calcaneus 72, the femur 68 and the tibia 70 in the above manner would make the characteristic of transmission of a force between the complex, and calcaneus 72, the femur 68 and the tibia 70 different from the real one. The reason is that the real attachment between the complex and the tibia 70 is performed so as to permit a longitudinal relative displacement between them under suitable resistance to the relative displacement, and so as to restrict a relative displacement between them in a direction permitting the complex to be separated from the tibia 70.

With this in mind, in the present embodiment, the bar element 66 is designed to be fixedly attached to the calcaneus 72 and the femur 68 at the above-identified lower and upper attaching point LAP, UAP, respectively, while the bar element 66 is designed so as to inhibit separation from the tibia 70, and to permit a relative displacement along the tibia 70.

Figure 15:
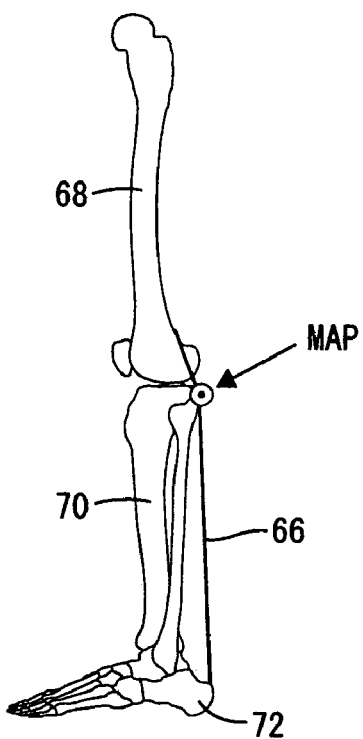
FIG. 15 is still another side view illustrating the lower extremity of the whole human body model 30 illustrated in FIG. 3, with the knee joint portion of the lower extremity being extended.
Figure 16:
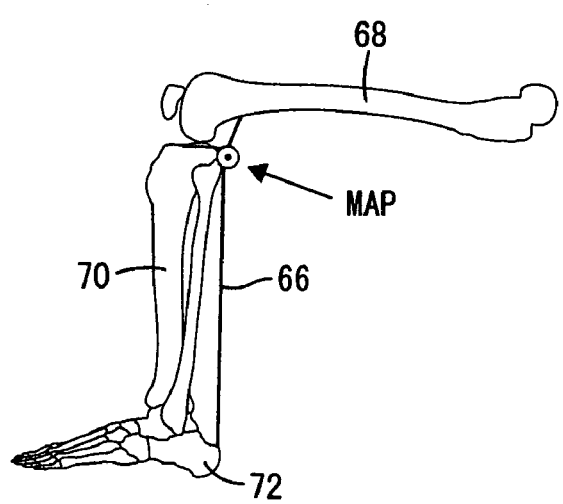
FIG. 16 is still another side view illustrating the lower extremity of the whole human body model 30 illustrated in FIG. 3, with the knee joint portion of the lower extremity being bended.

In FIGS. 15 and 16, there is illustrated the attachment of the bar element 66 to the tibia 70 at the aforementioned middle attaching point MAP, by figuratively using a combination of a pulley and a rope, for easy understanding. The bar element 66 and its attachment to the tibia 70 are figuratively expressed in the form of the rope and the pulley with resistance to its rotation, respectively.

It will be understood that, in the present embodiment, the pass of the bar element 66 is defined so as to extend along the femur 68 and the tibia 70 even in the bending state of the knee, and also, the force transmission between the bar element 66 and the tibia 70 is achieved via the model of the pulley, such that the bar element 66 is inhibited from separating from the tibia 70 in a direction along the tibia. Consequently, the pass of the bar element 66 and the force transmission represent the real human body accurately.

Figure 17:
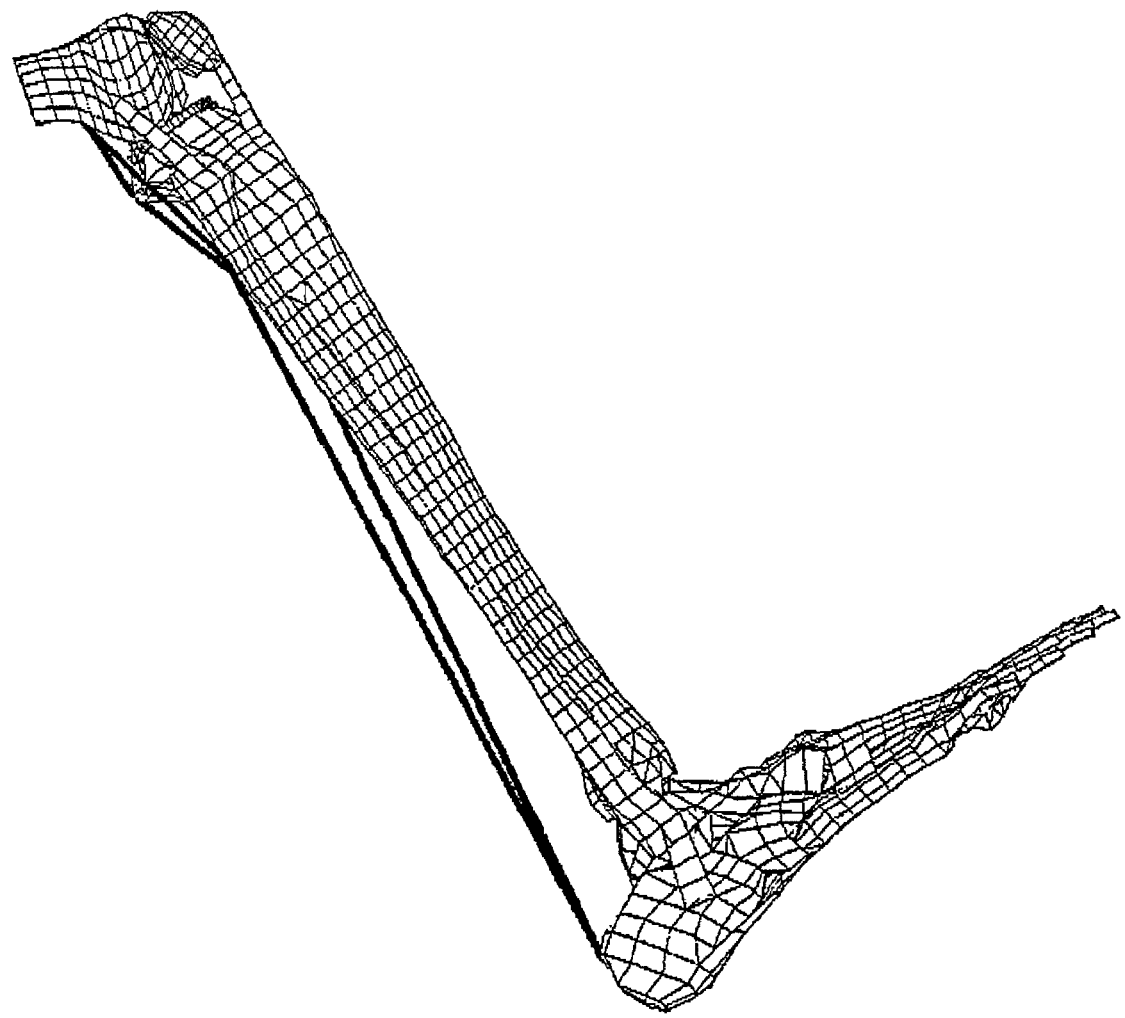
FIG. 17 is a side view illustrating a lower portion of the lower extremity of the whole human body model 30 illustrated in FIG. 3.
Figure 18:
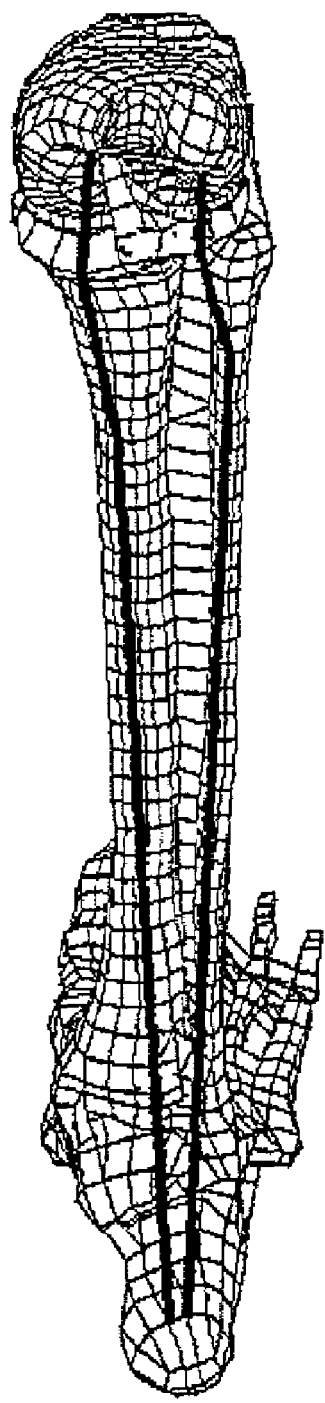
FIG. 18 is a back view illustrating a lower portion of the lower extremity of the whole human body model 30 illustrated in FIG. 3.
Figure 19:
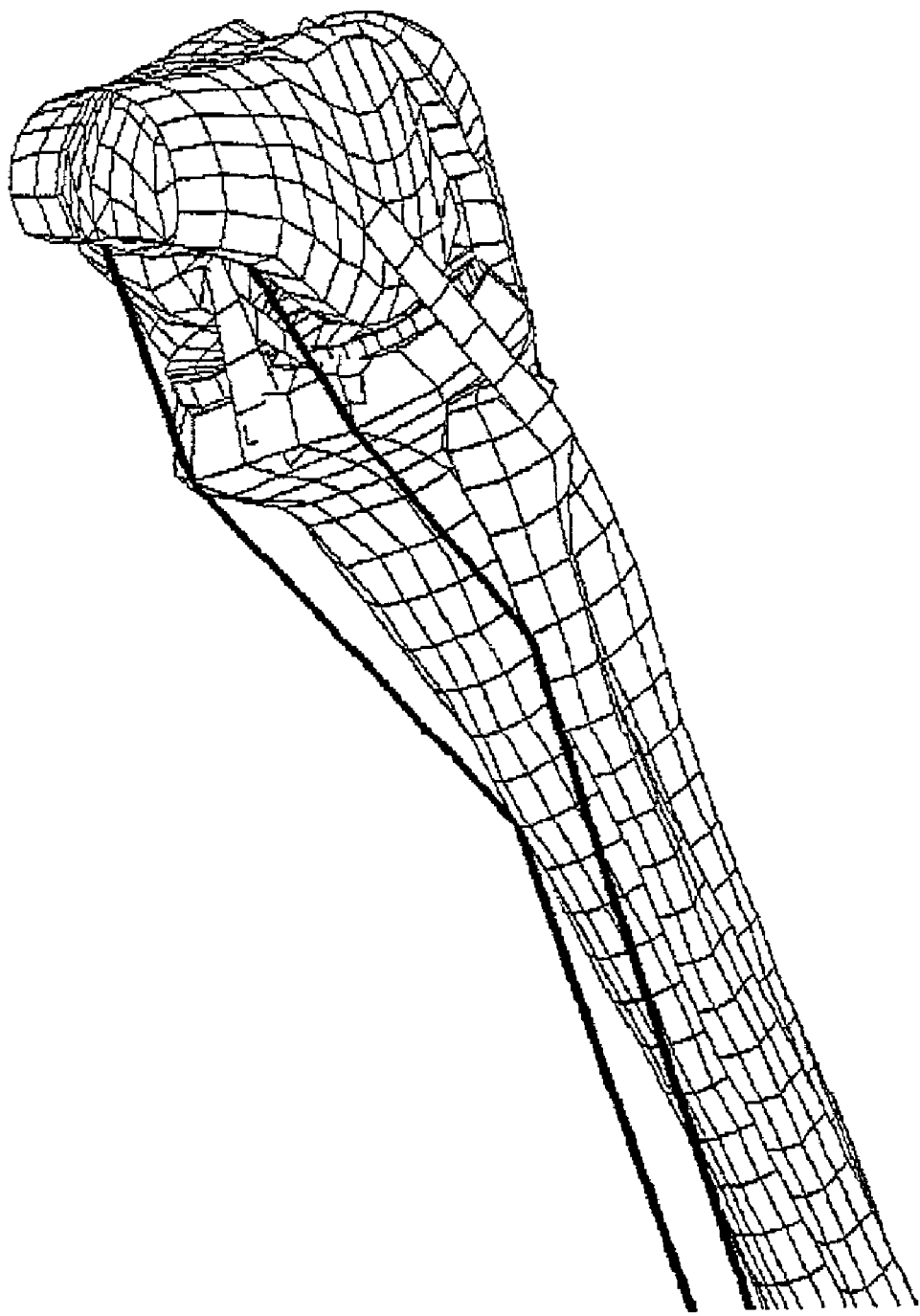
FIG. 19 is a perspective view illustrating the knee joint portion of the whole human body model 30 illustrated in FIG. 3.

In FIGS. 17, 18 and 19, there is illustrated a lower portion of the lower extremity of the whole human body model 30 without the skin and the muscles, in side view, in rear view, and in perspective and fragmentarily enlarged view, respectively.

The aforementioned computer system 16 for control (hereinafter referred to as "for-control computer" for the convenience of explanation) is connected with the aforementioned for simulation computer 12 and aiding-design computer 14, as shown in FIG. 1. The for-control computer 16 is also used by a designer. More specifically, the for-control computer 16 is used for the designer to design at least one of a plurality of constituents of a vehicle, the structure of which affects a degree of deformation occurring at each segment of an occupant in the vehicle. The deformation occurs upon application of an external impact to the vehicle. The use of the for-control computer 16 would help the designer to design a vehicle having a high degree of safety in relation to an external impact applied to the vehicle under a given condition, by considering a behavior and a degree of deformation of the occupant occurring under impact.

The for-control computer 16 has stored human-body-deformation-tolerance (e.g., to-deformation resistivity information) at a storage medium 38 from which a memory device 36 reads in data. The human-body-deformation-tolerance information is used for determining whether each segment of the human body has the likelihood thereof to generate the aforementioned exceeding deformation (hereinafter referred to simply as "deformation occurrence likelihood"). The storage medium 38, more specifically, has stored as the human-body-deformation-tolerance information, magnitudes of deformation-state-quantities such as a load, deflection, etc. to which each segment is expected to be subjected in the event of occurrence of the above exceeding deformation, in association with each segment. The storage medium 38 has stored the human-body-deformation-tolerance information in the form of a charted table or a database.

As described above, in the present embodiment, the for-simulation computer 12 is also adapted to determine whether each segment of the human body has the deformation occurrence likelihood defined above. However, the determination conducted by the for-control computer 16 is different, in that the determination is an absolute one obtained by the comparison between the analysis results of the deformation-state-quantities for each segment of the human body, and a predetermined threshold, from the determination conducted by the for-simulation computer 12 which is a relative one. In the present embodiment, only at least one of a plurality of segments of the human body which has been determined as having the deformation occurrence likelihood, by the relative determination, is followed by the absolute determination. This means that only at least one of a plurality of segments of the human body which has been determined as having the deformation occurrence likelihood, by both those two kinds of determinations, is finally determined as the aforementioned deformation-generating segment. In this sense, information outputed from the for-simulation computer 12 is provisional.

Figure 20:
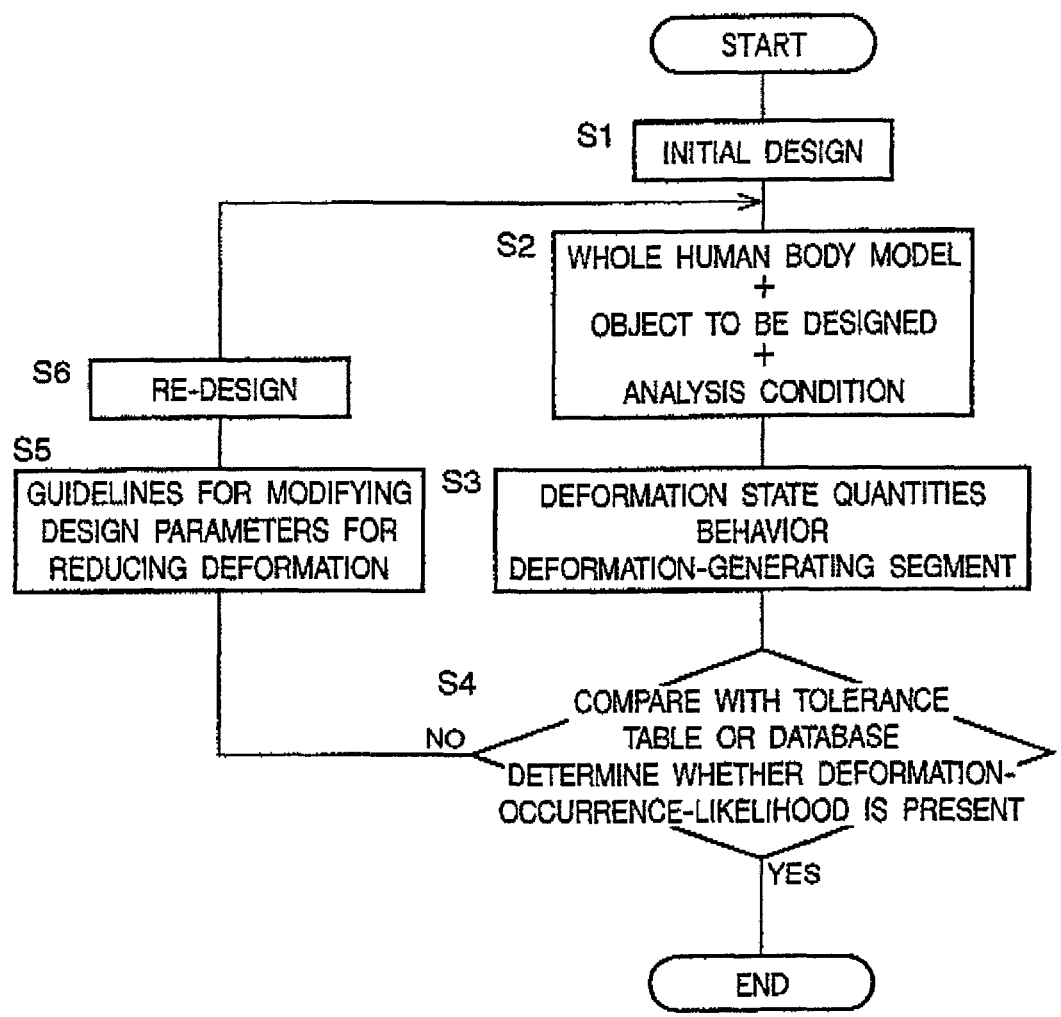
FIG. 20 is a flow chart illustrating a series of procedures to be carried out in the above human-body-behavior analyzing and applying system illustrated in FIG. 1.

In FIG. 20, there is illustrated by a flow chart a series of procedures to be carried out in the aforementioned analyzing and applying system 10.

The series of procedures is initiated with step S1 in which the designer conducts an initial design for a vehicle, by the use of the aforementioned aiding-design computer 14.

Step S1 is followed by step S2 in which the designer transmits via the for-control computer 16 to the for-simulation computer 12, a command for causing the for-simulation computer 12 to execute the aforementioned simulation program for evaluation of the above initial design.

At that time, in order for results of the simulation program to reflect the content of the initial design, the designer inputs to the for-control computer 16, information necessary for identifying the whole human body model 30 which the designer requires to use, and design information indicative of the result of the above initial design as an object to be designed. The designer further inputs an analysis condition, namely, a calculation condition, defining an occupant environment assumed for the analysis of the vehicle.

One example of the above analysis condition is a mechanical feature of an obstacle which is assumed to apply an external force to the vehicle. Another example is velocities of the vehicle and the occupant at the time that the vehicle comes into contact with the obstacle.

It will be understood from the above that, in the present embodiment, such an analysis condition is one example of the aforementioned "predetermined simulation analysis condition."

Next, in step S3, the for-simulation computer 12 receives the above calculation condition defined by the designer, and subsequently conducts the numerical analysis under the received calculation condition. The for-simulation computer 12, using the whole human body model 30 described above, calculates the aforementioned deformation-state-quantities and a behavior of each segment of the occupant by means of the finite element method described above. The for-simulation computer 12 further provisionally determines the aforementioned deformation-generating segment on the basis of the results of the calculation.

Following that, in step S4, the for-control computer 16 receives the results of the calculation achieved by the for-simulation computer 12 therefrom. The for-control computer 16 further compares the results of the calculation, and the aforementioned human-body-deformation-tolerance information stored in the form of the charted table or the database, as described above. The for-control computer 16 further determines whether the provisionally determined deformation-generating segment is trully likely to generate the aforementioned exceeding deformation.

When it has been determined that the provisionally determined deformation-generating segment does not truly have the deformation occurrence likelihood, the determination of step S4 becomes affirmative, and then, one cycle of the execution of this series of procedures is terminated.

Alternatively, when it has been determined that the provisionally determined deformation-generating segment truly has the deformation occurrence likelihood, the determination of step S4 becomes negative, the execution of this series of procedures goes to step S5.

In step S5, the for-control computer 16 presents to the designer, guidelines available for the designer to modify design parameters for the sake of reduction in the likelihood of occurrence of the exceeding deformation, for the deformation-generating segment determined to truly have the deformation occurrence likelihood, according to a predetermined relationship which has been stored in the storage medium 38. The predetermined relationship is defined as the relationship between each segment of the human body, at least one kind of the design parameter needing modification, and the direction and the amount of the modification of the design parameter. In addition, the design parameter has been prepared for each of at least one of a plurality of constituents of a vehicle which affects a degree of deformation of each segment of the occupant under impact, such that each constituent of the vehicle corresponds to at least one design parameter.

Subsequently, in step S6, the designer designs again, by considering the guidelines which the for-control computer 16 presented to the designer. The evaluation of the re-design will be conducted in the following execution of steps S2-S4.

After repetition of the execution of steps S2-S6, when it has come to the determination in step S4, that the deformation likely to be occurred at every segment of the occupant satisfies the aforementioned predetermined reference on the magnitude of the deformation, one series of designing procedures is terminated.

SECOND EMBODIMENT

There will be in detail described below by reference to drawings, a human-body-behavior analyzing method constructed according to a second embodiment of the present invention, Referring to FIG. 21, there is illustrated a human-body-behavior analyzing and applying system 100 (hereinafter referred to simply as "analyzing and applying system 100") in which the above human-body-behavior analyzing method is conducted. The analyzing and applying system 100 is constructed such that a computer 102 is connected with an input device 104 and an output device 106.

The computer 102 is, as well known, configured such that a processing unit 110 (indicated by "PU" in FIG. 21) and a storage 112 are connected with each other via a bus 114. The storage 112 is constructed to include a storage medium such as, a ROM, a RAM, a magnetic recording disc, an optical recording disc, etc. The storage 112 has already stored therein data for defining the whole human body model 30 as a finite element model for the whole human body, and an FEM analysis program for analyzing a behavior and a stress of each segment of the whole human body using the whole human body model 30.

The input device 104 is equipped with a mouse as a pointing device, and a keyboard. The output device 106 is adapted to display image on its screen. A user of the above system inputs required data to the computer 102 through the input device 104, In response to the input, the results obtained from data processing conducted by the computer 102 is visualized and presented to the user via the output device 106.

One example of an environment where the human is subjected to acceleration and deceleration is one where the human stays in a vehicle accelerated and decelerated. Another example is an environment where the human is intentionally subjected to acceleration and deceleration for getting a thrill by a play-machine installed at a recreational facility such as a recreational park. One example of such a recreational facility is a roller coaster running along a rail winding up and down, and right and left. The rail is installed at a recreational park.

In this kind of play-machine, the higher a level of acceleration and deceleration imposed to the human, the higher a level of a thrill which the human can get. On the other hand, a level of physical effect of the acceleration and deceleration on each segment of the human is increased accordingly. Hence, evaluating the physical effect of the acceleration and deceleration produced by the play-machine, on each segment of the human body is important. In particular, in the case of the play-machine being the above roller coaster, a head portion of the human in playing is accelerated and decelerated back and forth, or right and left. For this reason, evaluating the physical effect specially on a cervix portion of the human among a plurality of segments thereof is important.

Figure 21:
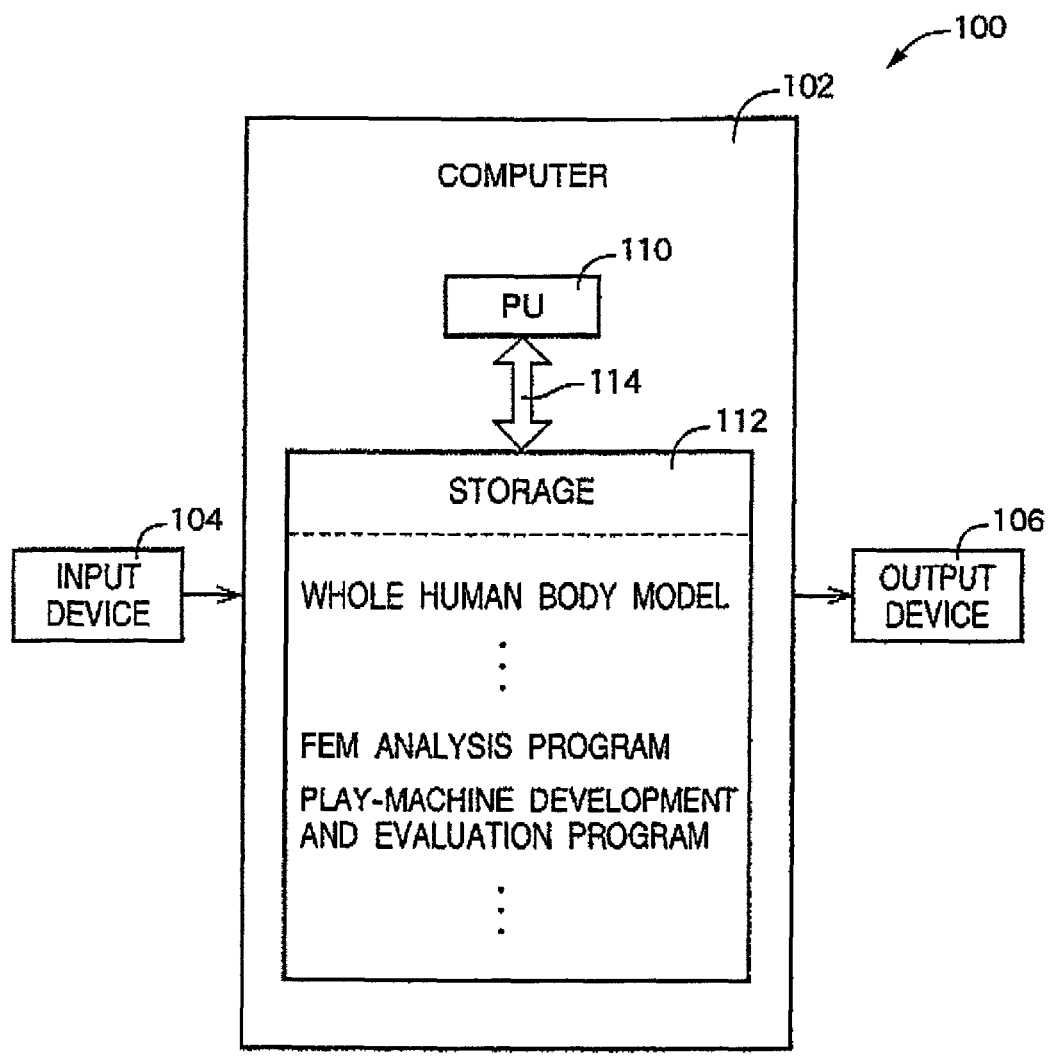
FIG. 21 schematically illustrates a human-body-behavior analyzing and applying system in which a human-body-behavior analyzing method according to a second embodiment of the present invention is used.

In the light of the above situation, in the present embodiment, the storage 112 has additionally stored therein, as shown in FIG. 21, a play-machine development and evaluation program already. The play-machine development and evaluation program is for assisting the user in developing a play-machine so as not to have an adverse physical effect on the human playing with the play-machine, by the use of the whole human body model 30 and the above-mentioned FEM analysis program. The play-machine development and evaluation program is optionally for assisting the user in analyzing and evaluation an adverse physical effect which a play-machine developed by the user or other people is expected to have on the human playing with the play-machine, by the use of the whole human body model 30 and the above-mentioned FEM analysis program.

Figure 22:
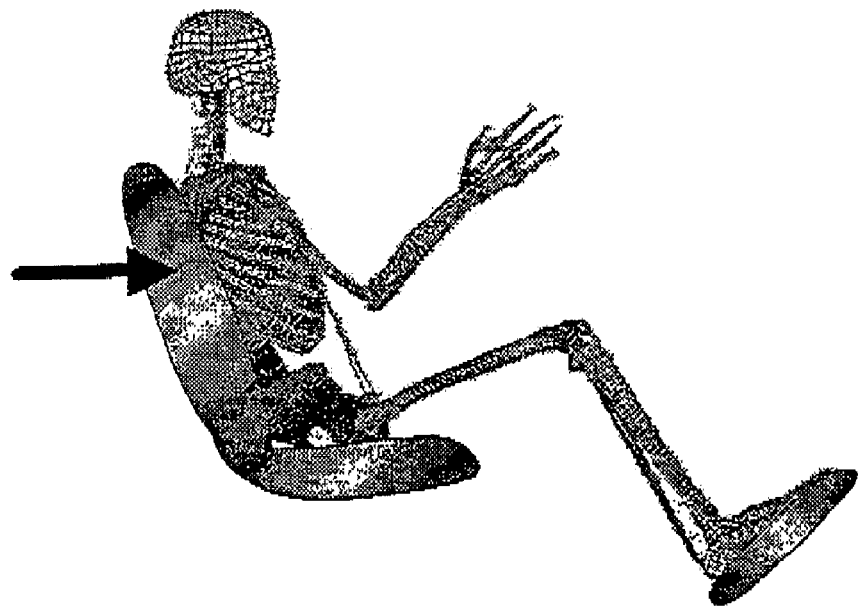
FIG. 22 is a side view illustrating the whole human body model 30 used in a play-machine development and evaluation program indicated in FIG. 21.
Figure 23:
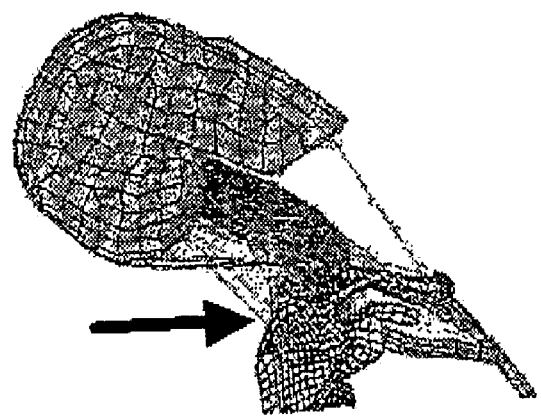
FIG. 23 is a side view illustrating a cervix portion of the whole human body model 30 for explaining results obtained by executing the play-machine development and evaluation program indicated in FIG. 21.
Figure 24:
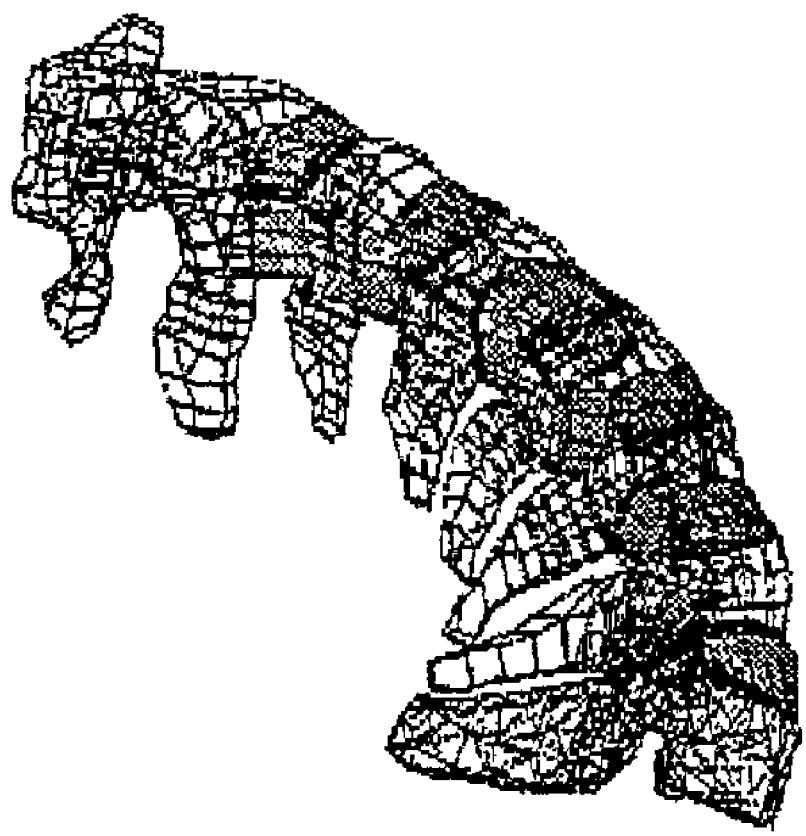
FIG. 24 is a side view illustrating intervertebral discs of the cervix portion of the whole human body model 30 for explaining results obtained by executing the play-machine development and evaluation program indicated in FIG. 21.

In FIG. 22, there is illustrated, for exemplifying a case where the roller coaster is to be analyzed and evaluated, the relationship between the whole human body model 30 and the roller coaster, such that the whole human body model 30 is seated on a seat of the roller coaster, and such that the whole human body model 30 is supported by a front portion of a floor of the roller coaster at both foot of the whole human body model 30. In FIG. 22, the arrow denotes the direction of acceleration occurring at the roller coaster. In FIG. 23, there is illustrated a deformation behavior of the cervix portion of the whole human body model 30 exhibited at the acceleration of the roller coaster, In FIG. 24, there is illustrated the deformed cervix portion by enlargement. In FIG. 24, there is also illustrated by hatch, intervertebral discs of the cervix portion exhibiting the deformation behavior which demonstrates a stress distribution of the intervertebral discs.

Figure 25:
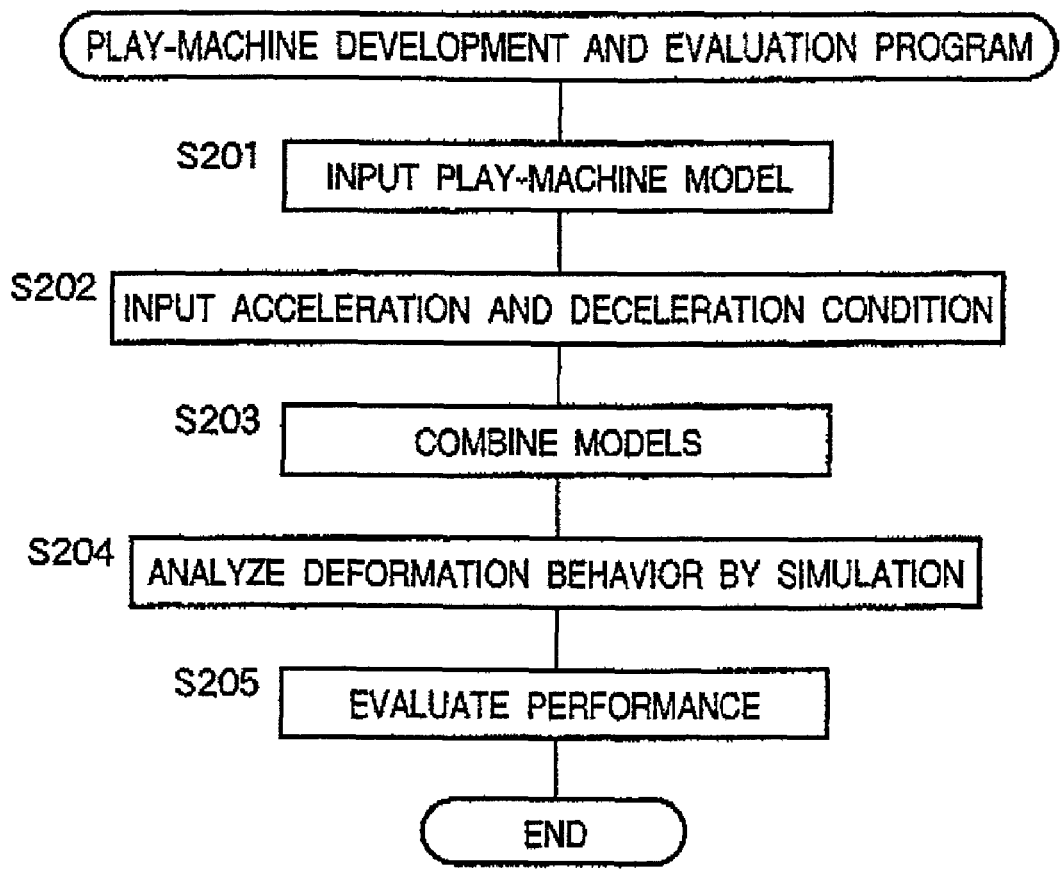
FIG. 25 is a flow chart schematically illustrating the play-machine development and evaluation program indicated in FIG. 21.

In FIG. 25, there is schematically illustrated the aforementioned play-machine development and evaluation program by a flow chart.

The play-machine development and evaluation program is initiated with step S201 in which play-machine data indicative of a play-machine to be analyzed and evaluated is inputted to the computer 102. The play-machine model includes a seat model indicative of a seat on which the human is seated, and a floor model indicative of a floor on which both feet of the human are placed, for example.

Next, in step S202, an acceleration and deceleration condition such as, a magnitude of a force, an acceleration or deceleration, etc. applied to the human at the acceleration and deceleration of the play-machine is inputted to the computer 102.

Following that, in step S203, the inputted play-machine model is combined with the whole human body model 30. The combination results in the. state in which the whole human body model 30 is seated in the play-machine model in a standard posture.

Next, in step S204, the above FEM analysis program is executed for the whole human body 30 under the inputted acceleration and deceleration condition, for thereby analyzing the deformation behavior of each segment of the human at the acceleration and deceleration of the play-machine by simulation.

Following that, in step S205, the performance of the present play-machine, namely the effect of the play-machine on the human in playing is evaluated, based on the results from the above analysis by simulation conducted in step S204. For example, it is determined whether none of a plurality of interbertebral discs of the cervix portion of the human at the acceleration and deceleration of the play-machine produces a stress thereon exceeding a predetermined allowable value, and, when the determination means that the exceeding stress is not produced, it is determined that the performance of the present play-machine is above a predetermined performance criterion.

When it has been determined that the performance of the present play-machine is not above the predetermined performance criterion, a developer of the present play-machine will rectify a limit level of acceleration and deceleration of the present play-machine, or modify the current design of the present play-machine for optimizing its structure, for example.

Then, one cycle of the execution of the play-machine development and evaluation program is terminated.

THIRD EMBODIMENT

There will be in detail described below by reference to drawings, a human-body-behavior analyzing method constructed according to a third embodiment of the present invention.

Figure 26:
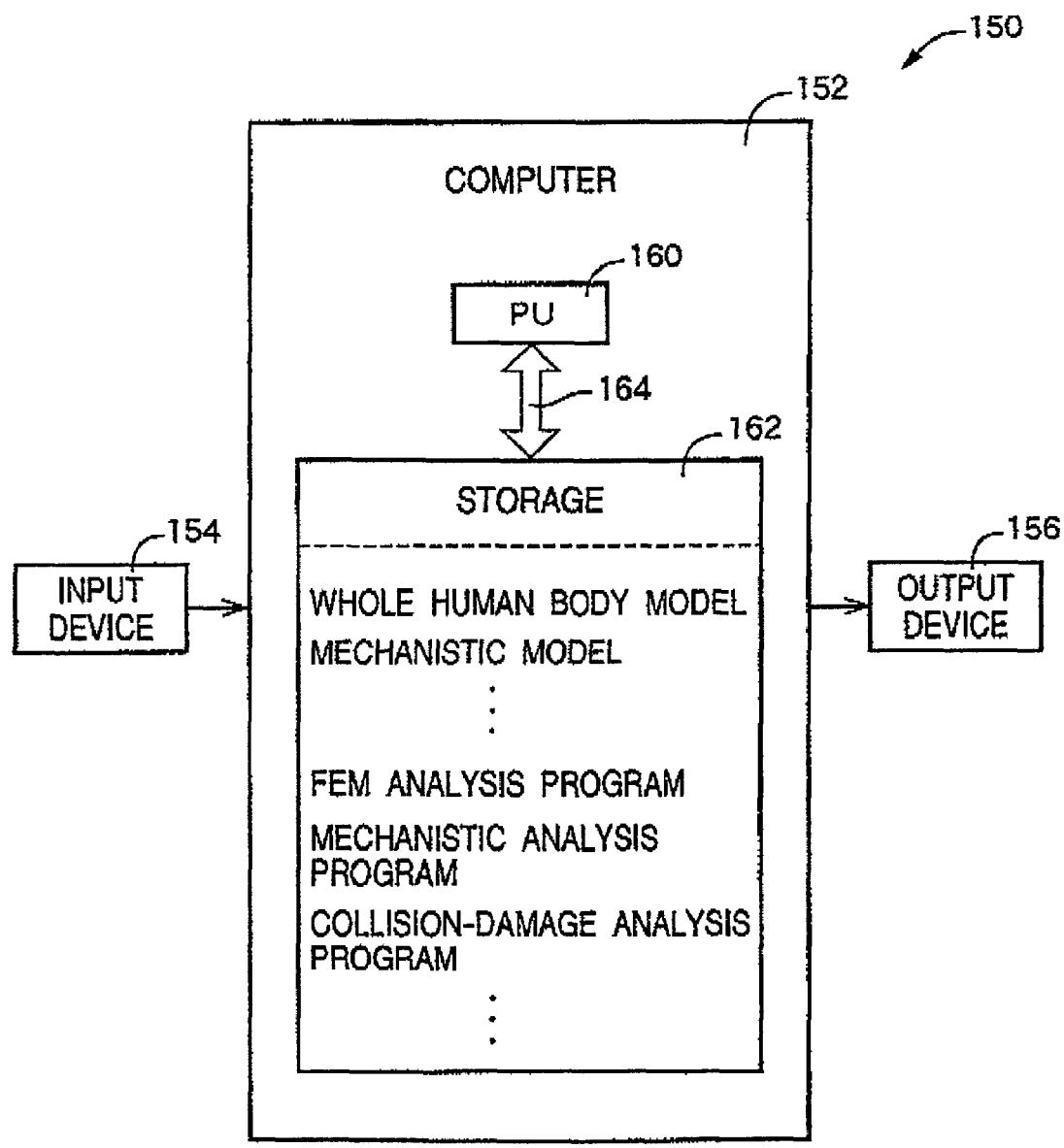
FIG. 26 schematically illustrates a human-body-behavior analyzing and applying system in which a human-body-behavior analyzing method according to a third embodiment of the present invention is used.

Referring to FIG. 26, there is illustrated a human-body-behavior analyzing and applying system 150 (hereinafter referred to simply as "analyzing and applying system 150") in which the above human-body-behavior analyzing method is conducted. The analyzing and applying system 150 is constructed, in the same manner as the analyzing and applying system 100 is constructed in the second embodiment, such that a computer 152 is connected with an input device 154 and an output device 156. The computer 152 is, like in the computer 102 in the second embodiment, configured such that a PU160 and a storage 162 are connected with each other via a bus 164.

The storage 162 has already stored therein, like in the second embodiment, data for defining the whole human body model 30, and an FEM analysis program for analyzing a behavior of the whole human body using the whole human body model 30.

Figure 27:
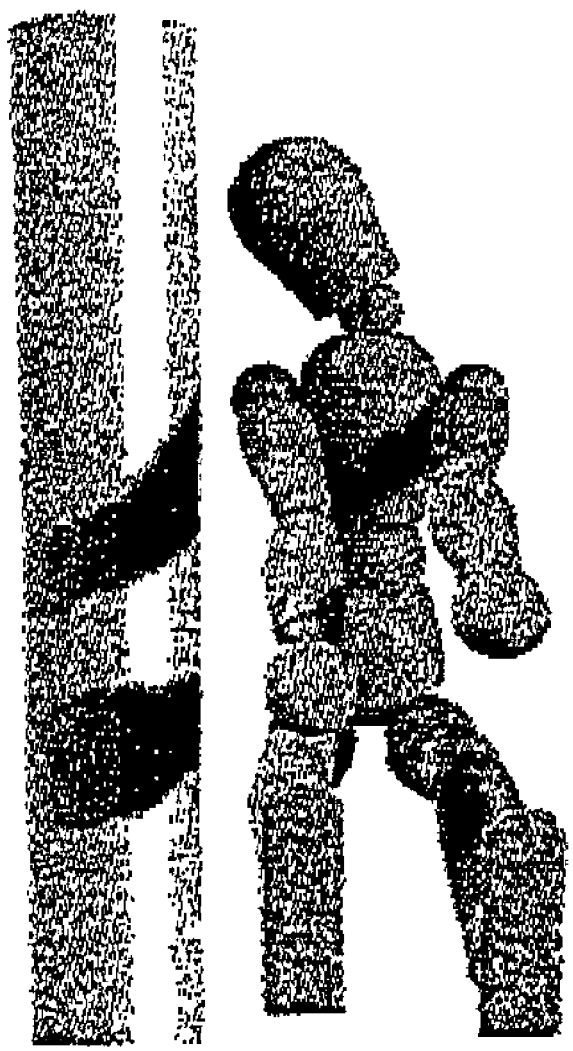
FIG. 27 is a front view illustrating a mechanistic model used in a mechanistic analysis program indicated in FIG. 26.

The storage 162 has farther stored therein data for defining a mechanistic model (.e., a joint model or an articulated rigid body model) which represents the whole human and which is constructed such that a plurality of simplified segments are connected with each other using a plurality of simplified joints. One example of the mechanistic model is illustrated in FIG. 27. The storage 162 has still further stored therein a mechanistic analysis program for analyzing a behavior of the whole human body using the mechanistic model, Compare the FEM analyzing approach based on the whole human body model 30 and the FEM analysis program, and the mechanistic analyzing approach based on the mechanistic model and the mechanistic analysis program with each other. The FEM analyzing approach, although it is advantageous in faithfully representing a behavior of the whole human body, and a physical response of each segment of the whole human body occurring upon application of an external force or a compulsory displacement to the whole human body, requires a longer time for the calculation by the computer 152. On the other hand, the mechanistic analyzing approach, although it is advantageously capable of analyzing a behavior of the whole human body in a reduced time, due to a reduced amount of data of the mechanistic model, is not capable of faithfully represent the above-mentioned physical response of each segment of the whole human body, Thus, these FEM analyzing approach and mechanistic analyzing approach are related to each other such that what one of them has as an advantage equals what the other has as a disadvantage, in other word, an advantage of one of them can make up for a disadvantage of the other.

In order to accurately analyze by simulation, a response and a load occurring at each segment of the human under the condition where the human is impacted as a result of the collision with an object, it is important to accurately analyze a behavior of each segment of the human immediately before the collision, in some cases.

The whole human body model 30, although it is capable of accurately analyzing a behavior of the whole human body by simulation, either before or after the collision with an object, requires a longer time for the analysis due to an enlarged load on the computer 152, as described above.

On the other hand, the mechanistic model, although it is not capable of faithfully representing a physical response of each segment of the human body, is capable of analyzing a behavior of the whole human body, at a increased level of accuracy and in a reduced time, under the condition in which the physical response of each segment of the human body is insignificant because of the condition being directed to a phenomenon before tile collision.

On the other hand, one example of an environment where each segment of the human produces a response and a load thereof under the condition where the human is impacted as a result of the collision of the human with an object, is one where the human in motion accidentally collides with an object. Described specifically, there is an environment where the human playing soccer as one kind of sport accidentally hits the goal post as an object. For this environment, it is required to analyze by simulation, a level of damage which the human suffers at the head thereof, which is one of a plurality of segments of the human, due to the collision with the goal post, to order to evaluate a damping ability of a damper attached to the goal post for mitigating the resulting damage of the human, to thereby improve the material and the structure of the damper resulting from the increase of the damping ability.

In view of the above, in the present embodiment, the storage 162 has further stored therein, as shown in FIG. 26, a collision-damage analysis program. The collision-damage analysis program is of a hybrid type employing both the aforementioned FEM analyzing approach based on the whole human body model 30 and the FEM analysis program, and the aforementioned mechanistic analyzing approach based on the mechanistic model and the mechanistic analysis program. The collision-damage analysis program is also for analyzing by simulation, a response and a load of each segment of the human under the condition where the human is impacted due to the collision.

Figure 28:
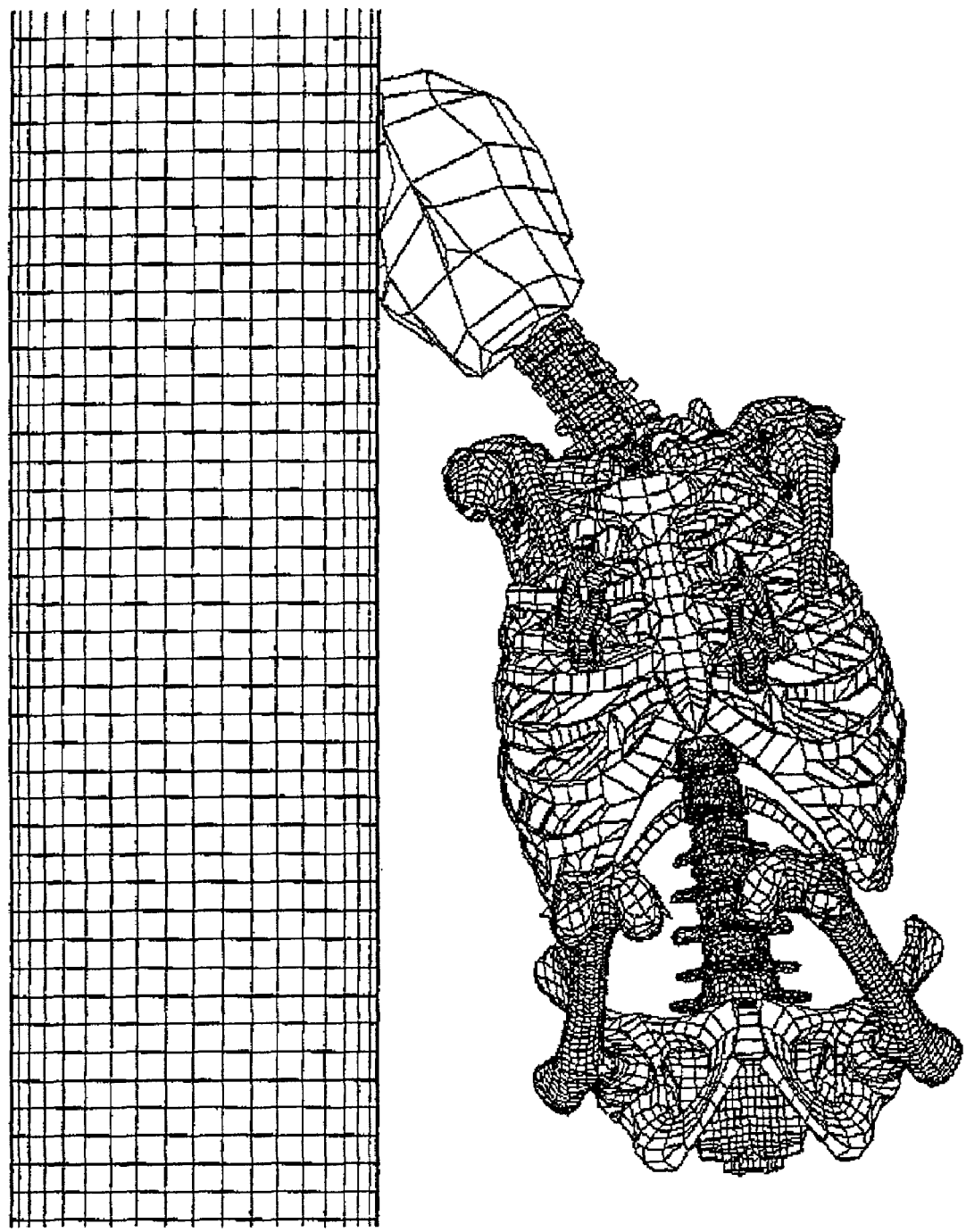
FIG. 28 is a front view illustrating a complex of a head and a thorax of the whole human body model 30, together with an object model, for explaining results obtained by executing a collision-damage analysis program indicated in FIG. 26.

In FIG. 27, there is illustrated by means of the aforementioned mechanistic model, by exemplifying the situation where a goal post installed in a soccer field to be analyzed, a posture of the human prior to the collision with the goal post. In FIG. 28, there is illustrated by means of the whole human body model 30, the level of damage which the human is expected to suffer at the head thereof due to the collision with the goal post. The level of damage of the human head may be expressed depending on whether a bone fracture occurs at the human head, for example.

Figure 29:
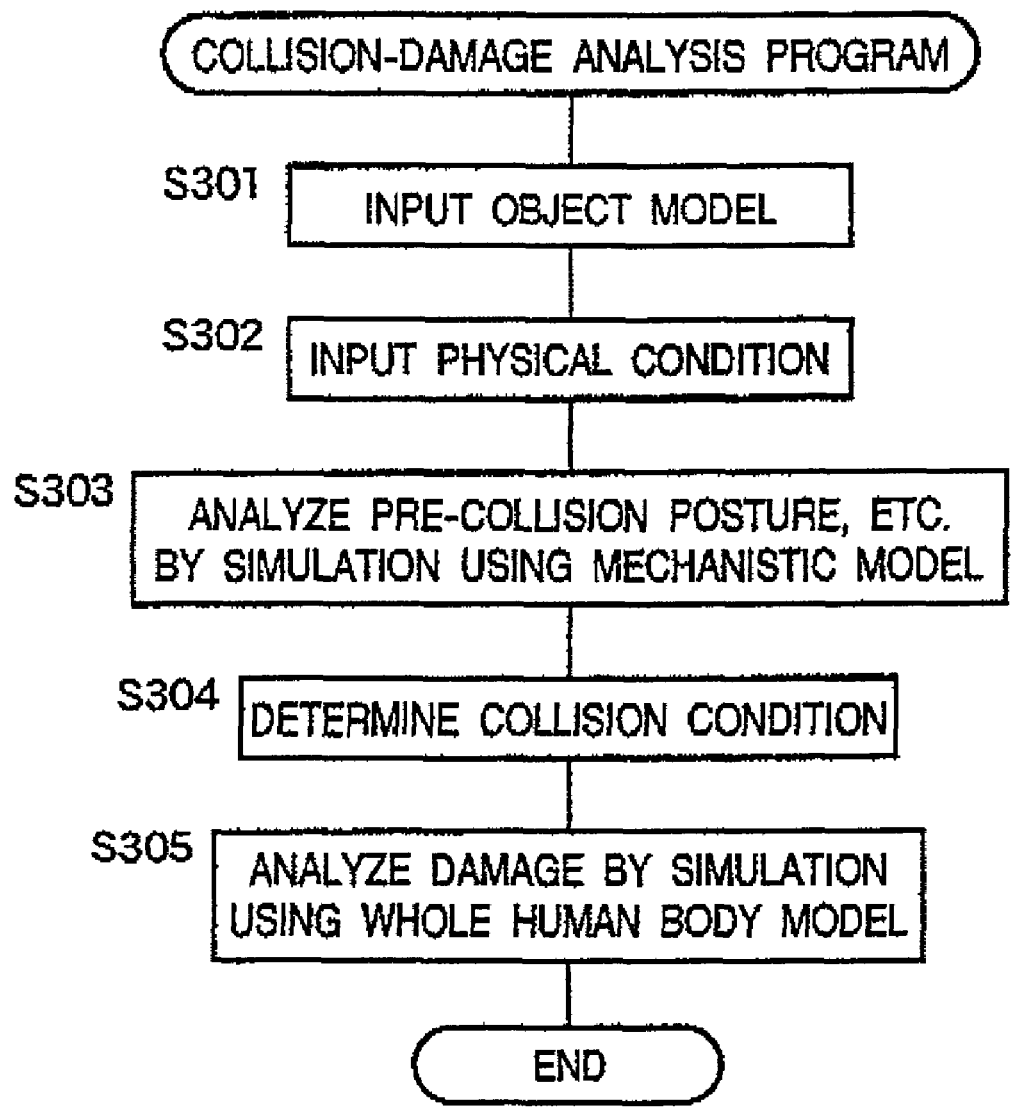
FIG. 29 is a flow chart schematically illustrating the collision-damage analysis program indicated in FIG. 26.

In FIG. 29, there is schematically illustrated the collision-damage analysis program by a flow chart.

The collision-damage analysis program is initiated with step S301 where an object model indicative of an object which the human is assumed to hit is inputted to the computer 152.

Afterward, in step S302, a physical condition for causing the human to hit the object is inputted to computer 152. The physical condition includes a running velocity of the human before the human hits the object, for instance.

Next, in step S303, the mechanistic analysis program is executed for the mechanistic model under the inputted physical condition, for thereby analyzing by simulation, a pre-collision posture, which is to say, a posture of the human prior to the time that the human hits the object, and a physical quantity indicative of a movement of the human. The physical quantity includes one relating to a velocity and an acceleration of each segment of the human, for example.

Afterward, in step S304, the FEM analysis program is executed for the whole human body model 30, based on the analyzed pre-collision posture and physical quantity, for thereby analyzing a posture and a state of movement, of the human at the moment that the human hits the object. This results in the analysis results determined as a collision condition.

Next, in step S305, the FEM analysis program is executed for the whole human body model 30 under the determined collision condition, for thereby analyzing by simulation, the level of damage occurring at each of the human body due to the collision of the human with the object. In FIG. 28, there is illustrated how the fracture of the human head occurs due to the collision of the human head with the object. Whether the head fracture occurs is determined depending on whether a stress of the human head occurring at the collision of the head with the object exceeds a predetermined limit thereof, for example.

Then, one cycle of the execution of the collision-damage analysis program is terminated.

The results obtained by the execution of the collision-damage analysis program is useful in evaluating performance of a damper attached to an object which the human is assumed to hit, in optimizing a position at which the damper is attached to the object, in optimizing the structure of the damper, and so on.

FOURTH EMBODIMENT

There will be in detail described below by reference to drawings, a humanbody-behavior analyzing method constructed according to a fourth embodiment of the present invention.

A human-body-behavior analyzing and applying system in which the above human-body-behavior analyzing method is conducted shares the fundamental structure with the analyzing and applying system 150 in the third embodiment. Therefore, the detailed explanation about the human-body-behavior analyzing and applying system in the present embodiment will be omitted below.

As described above, one example of the environment where a response and a load occur at each segment of the human under the condition where the human is impacted as a result of the collision with an object, is one where the human in motion accidentally hits an object, and, so the third embodiment, a response occurring at each segment of the human upon collision of the human with an object is analyzed by simulation.

On the other hand, in the present embodiment, another environment where the human suddenly falls down or tumble to the ground or a floor is focused on. Although it looks like that the reason why the human suddenly falls down has not been well solved, the accidents in which they suffer fractures at their lumbar portions (including their thigh portions) due to their tumble have been often reported in the case of old people, in particular.

For the prevention of the bone fractures, a concept of attaching a protector to the human can be proposed. In this proposal, the optimization of a position of the human to which the protector is attached, and a structure of the protector, would make it more important to analyze a segment of the human at which the human suffers damage due to the collision with the ground, etc. resulting from the tumble, and to analyze the level of the resulting damage.

In the light of the above findings, in the present embodiment, a storage of a computer which is installed in the aforementioned analyzing and evaluating system has further stored therein a tumble analysis program. The tumble analysis program is of the aforementioned hybrid type and is for analyzing by simulation, a response and a load of each segment of the human under the condition where the human is impacted due to the collision resulting from the tumble.

Figure 30:
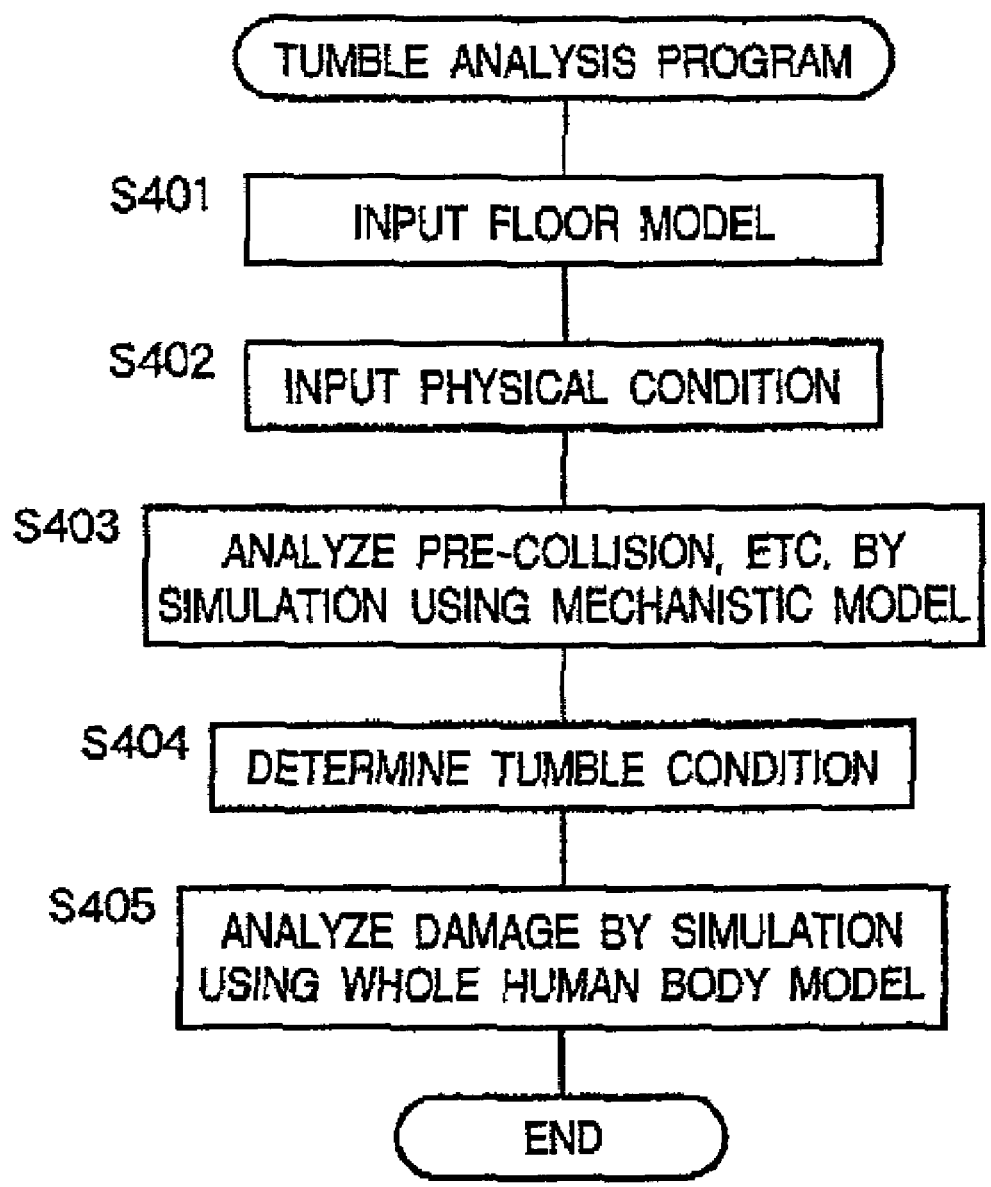
FIG. 30 is a flow chart schematically illustrating a tumble analysis program executed by a computer of a human-body-behavior analyzing and applying system in which a human-body-behavior analyzing method according to a fourth embodiment of the present invention is used.

In FIG. 30, there is schematically illustrated the tumble analysis program by a flow chart.

The tumble analysis program is commenced with step S401 wherein a floor model indicative of a floor to which the human is assumed to fall down is inputted to the above-mentioned computer.

Next, in step S402, a physical condition causing the human to tumble is inputted to the computer. The physical condition includes the indication of at least one of a plurality of segments constituting the human body, the movement of which is preferably blocked for causing the human to tumble, for example.

Figure 31:
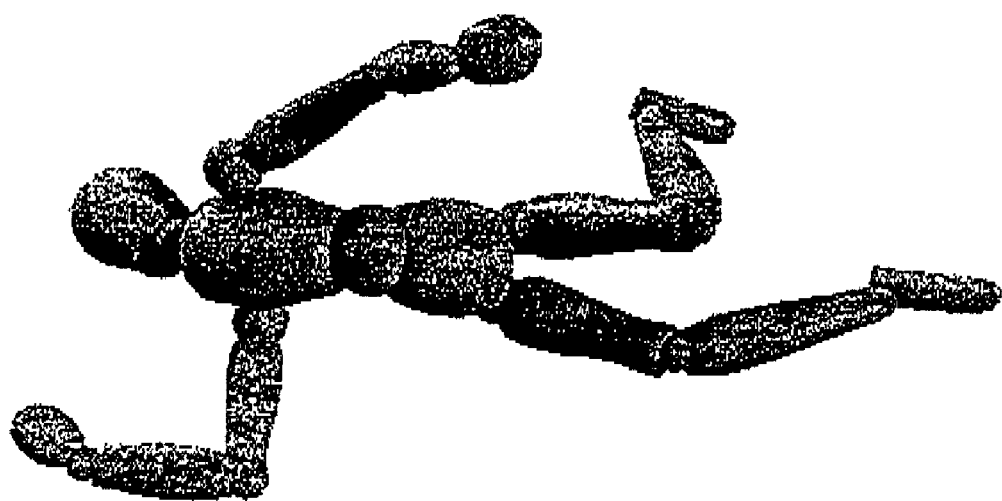
FIG. 31 is a front view illustrating a mechanistic model for explaining results obtained from an execution of a mechanistic analysis program executed by the above computer.

Following that, in step S403, the mechanistic analysis program is executed for the mechanistic model under the inputted physical condition, for thereby analyzing by simulation, a pre-collision posture, which is to say, a posture of the human prior to the time that the human falls down to the floor, and a physical quantity indicative of a movement of the human. The physical quantity includes one relating to a velocity and an acceleration of each segment of the human, for example. FIG. 31 illustrates by the use of the mechanistic model, the posture which the human takes at the time of the tumble.

Afterward, in step S404, the FEM analysis program is executed for the whole human body model 30, based on the analyzed pre-collision posture and physical quantity, for thereby analyzing a posture and a state of movement, of the human, at the moment that the human hits the floor. This results in the analysis results determined as a tumble condition.

Figure 32:
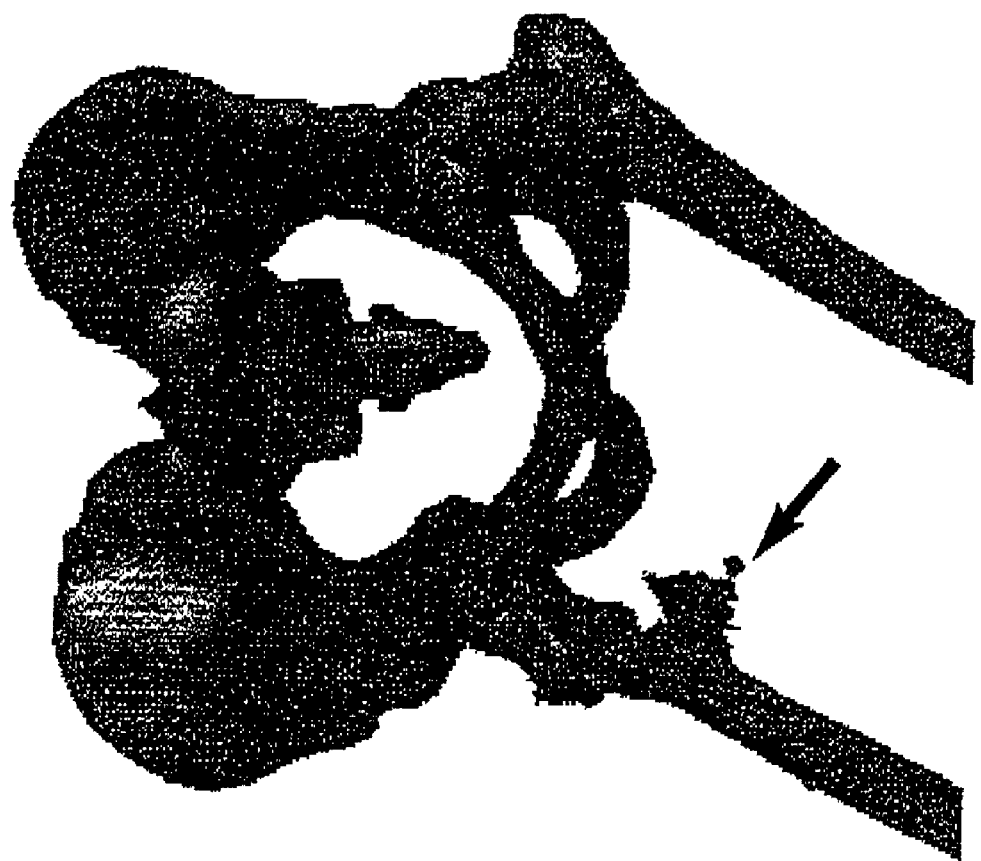
FIG. 32 is a front view illustrating a lumbar portion of the whole human body model 30 for explaining results obtained by executing the tumble analysis program illustrated in FIG. 30.

Next, in step S405, the FEM analysis program is executed for the whole human body model 30 under the determined tumble condition, for thereby analyzing by simulation, the level of damage occurring at each of the human body due to the tumble thereof In FIG. 32, there is illustrated how the fracture of the human femur occurs due to the tumble of the human. Whether or not a bone fracture occurs is determined depending on whether or not a stress of the human head occurring at the collision of each segment of the human with the floor exceeds a predetermined limit thereof, for example.

Then, one cycle of the execution of the tumble analysis program is terminated.

The results obtained by the execution of the tumble analysis program is useful in evaluating performance of a protector attached to the human for prevention of bone fractures due to the tumble, in optimizing a position at which the protector is attached to the human, in optimizing the structure of the protector, and so on.

FIFTH EMBODIMENT

There will be in detail described below by reference to drawings, a human-body-behavior analyzing method constructed according to a fifth embodiment of the present invention.

A human-body-behavior analyzing and applying system in which the above human-body-behavior analyzing method is conducted shares the fundamental structure with the analyzing and applying system 150 in the third embodiment. Therefore, the detailed explanation about the human-body-behavior analyzing and applying system in the present embodiment will be omitted below.

As described above, one example of an environment where a response and a load occur at each segment of the human under the condition where the human is impacted as a result of the collision with an object, is one where the human in motion accidentally hits an object. In the third embodiment, a response occurring at each segment of the human upon collision of the human with an object is analyzed by simulation, as described above.

On the other hand, in the present embodiment, another environment where the human in walking or running lands on the ground or a floor at the foot of the human, resulting in the collision of the foot with the ground or the floor, is focused on. Although the foot is impacted at the landing thereof, wearing a shoe at the foot would reduce the impact with which the human foot is loaded due to the landing, by relaying on the impact absorbing ability of the shoe. For the effective reduction in the impact, it is important to optimize the structure of the shoe, by means of attaching a shock absorber to the sole of the shoe and by means of optimizing the shock absorbing ability of the shock absorber, for example. Further, for the optimization, it is important to analyze a stress of the foot and the shoe upon landing of the human in walking or running.

Based on the above findings, in the present embodiment, a storage of a computer which is installed in the aforementioned analyzing and evaluating system has further stored therein an upon-lading-stress analysis program. The upon-landing-stress analysis program is of the aforementioned hybrid type and is for analyzing by simulation, distribution of stresses occurring at the foot and the shoe due to the impact imposed to them as a result of their collision with the ground or the floor at the time of the landing of the human in walking or running.

Figure 33:
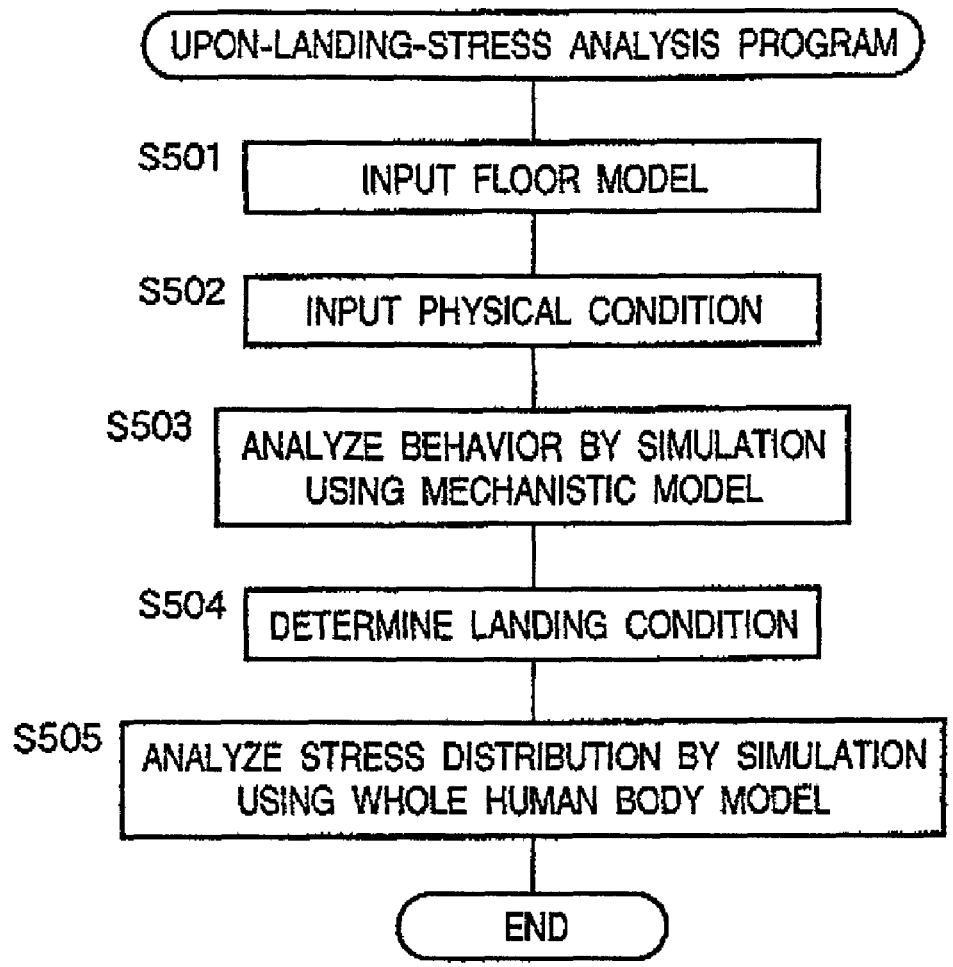
FIG. 33 is a flow chart schematically illustrating an upon-landing-stress analysis program executed by a computer of a human-body-behavior analyzing and applying system in which a human-body-behavior analyzing method according to a fifth embodiment of the present invention is used.

In FIG. 33, there is schematically illustrated the upon-landing-stress analysis program by a flow chart.

The upon-landing-stress analysis program begins with step S501 wherein a floor model indicative of a floor on which the human is assumed to land at its foot is inputted to the above-mentioned computer.

Next, in step S502, a physical condition causing the human to walk or run is inputted to the computer. The physical condition includes a moving velocity of the gravity center of the human in walking or running, for example.

Next, in step S503, the mechanistic analysis program is executed for the mechanistic model under the inputted physical condition, for thereby analyzing by simulation, a behavior of the whole human body during walking or running.

Afterward, in step S504, the FEM analysis program is executed for the whole human body model 30, based on the analyzed behavior of the whole human body, for thereby analyzing a posture and a state of movement, of the human, at the moment that the human lands at its foot and shoe. This results in the analysis results determined as a landing condition The landing condition includes a posture, a velocity, or an acceleration of a leg of the whole human body model 30 at the moment that the whole human body model 30 lands at its foot and shoe, for example.

Next, in step S505, the FEM analysis program is executed for the whole human body model 30 under the determined landing condition, for thereby analyzing by simulation, the distribution of stresses of the foot and the shoe occurring at the moment that the whole human body model 30 lands at its foot and shoe.

Then, one cycle of the execution of the upon-landing-stress analysis program is terminated.

Figure 34:
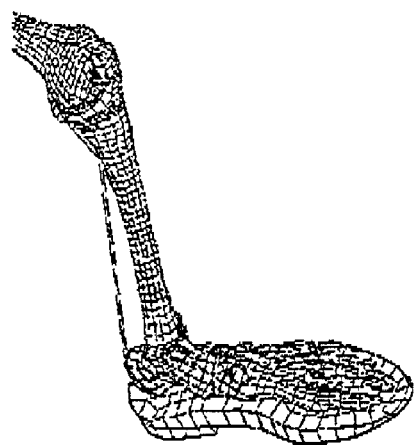
FIG. 34 is a perspective view illustrating a lower extremity of the whole human body model 30 used in the upon-landing-stress analysis program illustrated in FIG. 33.

In FIG. 34, there is illustrated the whole human body model 30 in a state before its landing, locally with respect to its lower extremity portion including the foot and the shoe worn thereat.

Figure 35:
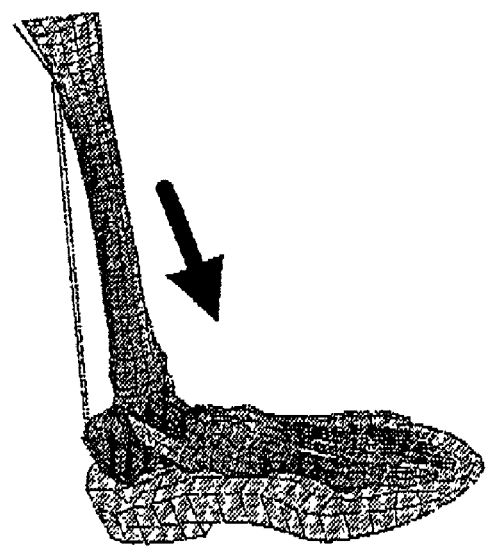
FIG. 35 is a perspective view illustrating bones in the lower extremity of the whole human body model 30, together with a shoe thereof, for explaining results obtained by executing the upon-landing-stress analysis program illustrated in FIG. 33.

In FIG. 35, there is illustrated the analysis results of the stress distribution of bones of the lower extremity of the whole human body model 30 in running. In FIG. 35, the arrow denotes the direction of the acceleration imposing to the lower extremity. In FIG. 35, it is illustrated that the higher the local density of dots drawn in FIG. 35, the larger the local stress.

Figure 36:
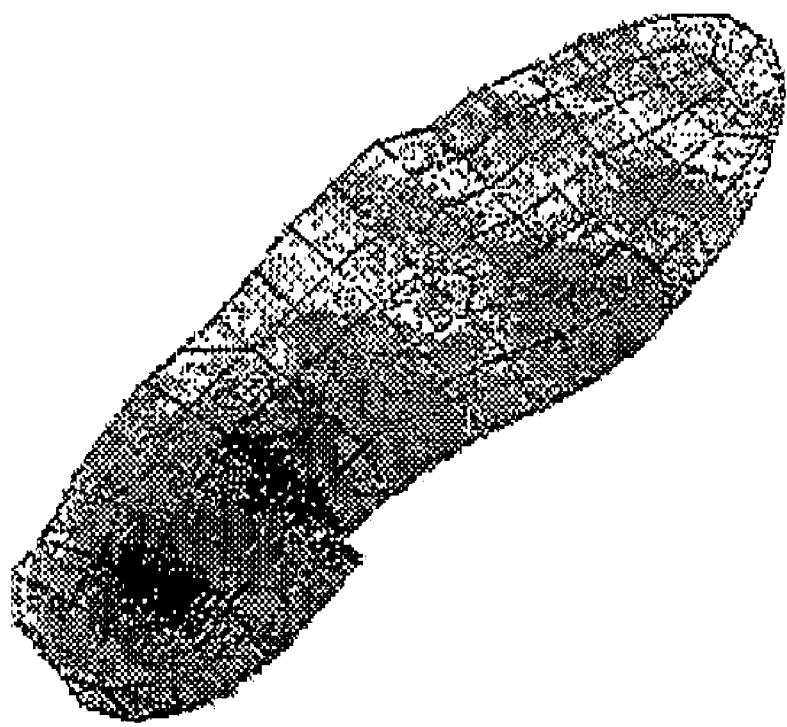
FIG. 36 is a perspective view illustrating a sole of the above shoe of the whole human body model 30 for explaining results obtained by executing the upon-landing-stress analysis program illustrated in FIG. 33.

In FIG. 36, there is illustrated the analysis results of the stress distribution of the sole of the shoe worn at the foot of the whole human body model 30 in running. In FIG. 36, like in FIG. 35, it is illustrated that the higher the local density of dots drawn in FIG. 36, the larger the local stress.

The results obtained by the execution of the upon-landing-stress analysis program is useful in optimizing the geometry a shock absorber which is attached to the sole of a shoe, in optimizing the structure of the shock absorber, and so on.

As described above, in any embodiment of the present invention explained above, the whole human body model 30 is adapted to represent or reproduce in detail the whole human body with respect to its bones, skin, ligaments, and tendons. There will be described below in more detail the representation or reproduction of bones in the whole human body model 30.

A joint portion of the whole human body model 30 is designed to reproduce primary ligaments and contact between bones in the real human body, for thereby accurately representing the joint movement in the real human body in an anatomically accurate manner.

Figure 37:
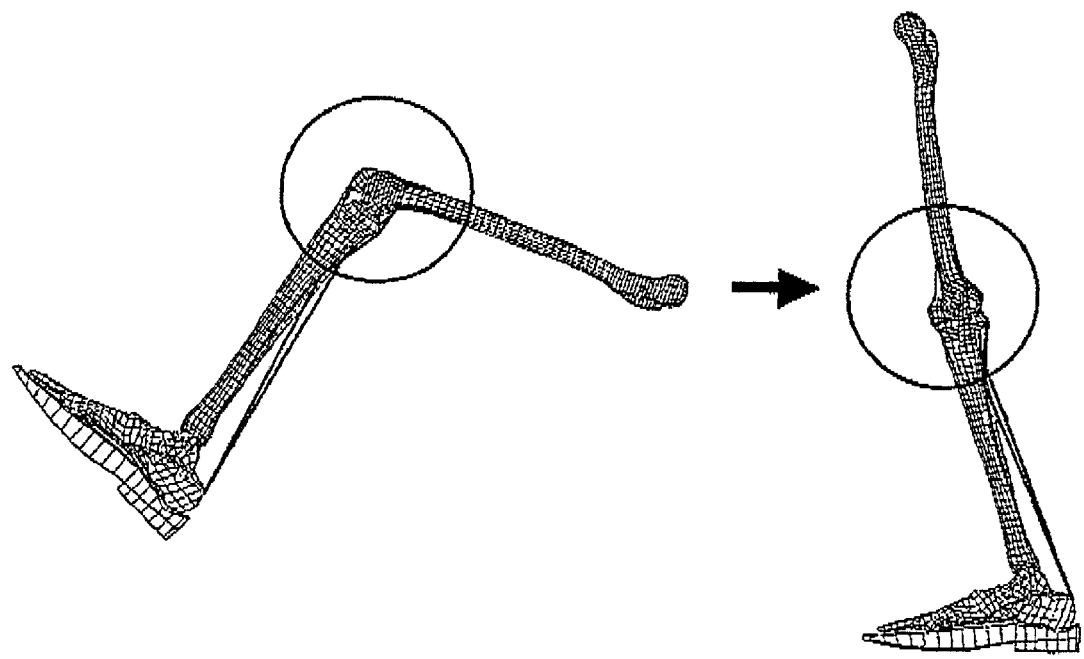
FIG. 37 is a side view for explaining a change in posture of the lower extremity of the whole human body model 30.

In FIG. 37, there is illustrated how the lower extremity of the whole human body model 30 is changed in posture from a bending state of its knee joint portion is bended, to a stretching state thereof FIG. 37 demonstrates that the relative positional relationship between a plurality of bones in the knee joint portion is kept anatomically true, either in the bending state or in the stretching state.

Figure 38:
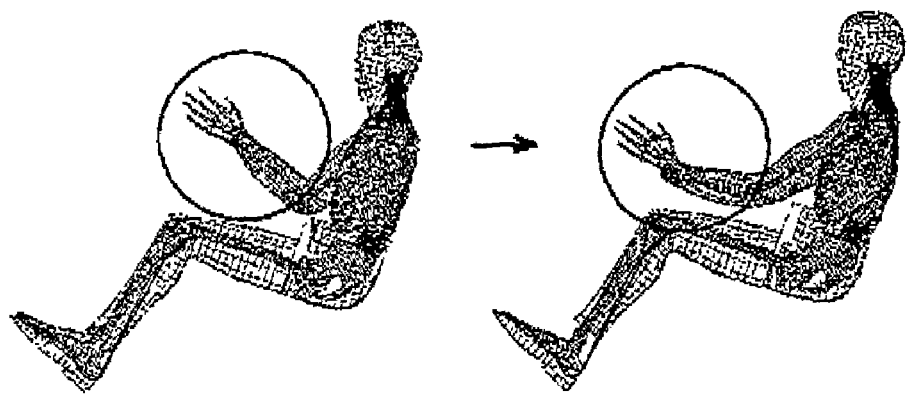
FIG. 38 is a side view for explaining a change in posture of the upper extremity of the whole human body model 30 in a seated state thereof

In addition, the whole human body model 30, when subjected to an external force or a compulsory displacement in a given posture, is changed to a different posture. As shown in FIG. 38, giving a specific condition to the whole human body model 30 would change the whole human body model 30 from a posture where an elbow of the whole human body model 30 is largely bended, to a posture where the elbow is slightly bended, with a sitting state of the whole human body model 30 maintained, for example. In this example, the amount of the change in the posture of the whole human body model 30 between those two postures is small. Accordingly, as far as the whole human body model 30 is concerned, such a small change in posture would make it possible to omit another partitioning of the whole human body model 30 into a plurality of elements, namely, remake of mesh for the whole human body model 30. The reason is that the joint portion of the whole human body model 30 represents the real joint movement in the real human body anatomically accurately, as described above.

Figure 39:
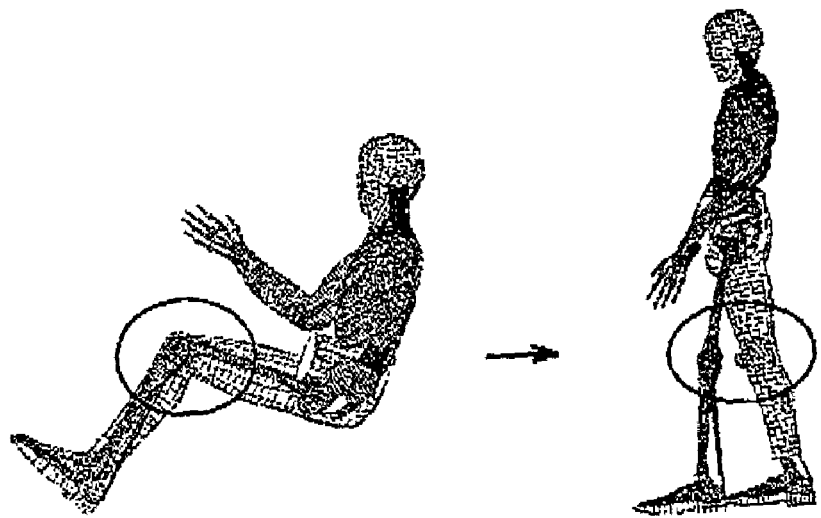
FIG. 39 is a side view for explaining a change in posture of the whole human body model 30 from a seated state to a standing state thereof.

In FIG. 39, there is illustrated by way of example, how the whole human body model is largely changed in posture. In this example, the whole human body model 30 is changed from a sitting posture to a standing posture. The knee joint portion of the whole human body model 30 is, for example, changed from a bending state to a stretching state, of the knee of the whole human body model 30. In this example, the joint portion of the whole human body model 30 represents the real joint movement in the real human body anatomically accurately, as described above-Therefore, the above change in posture would not require the above-mentioned remake of mesh for bones in the knee joint portion of the whole human body model 30, like in the case of the smaller change in posture described above. For the soft tissues (e.g., the skin, the fat, the fresh, etc.) of the knee joint portion of the whole human body model 30, the above remake of mesh for the soft tissues would be required, in some cases. However, even in these cases, the remake of mesh can be avoided for the entire of the knee joint portion.

It will be evident from the above that, since the joint portion of the whole human body model 30 is configured so as to represent the joint movements in the real human body in an anatomically accurate manner, the use of the whole human body model 30 would permit the accurate representation of a change in posture in the real human without great effort. Further, the whole human body model 30 is capable of accurately representing the relationship between a posture of the real human and, a relative positional relationship between bones constituting the real human. Consequently, the whole human body model 30 would permit the accurate prediction from a posture to be taken by the real human, the relative positional relationship between the bones for realizing the posture. The prediction may be utilized for a model representative of the human body other than the whole human body model 30.

SIXTH EMBODIMENT

There will be in detail described below by reference to drawings, a human-body-behavior analyzing method constructed according to a sixth embodiment of the present invention.

Figure 40:
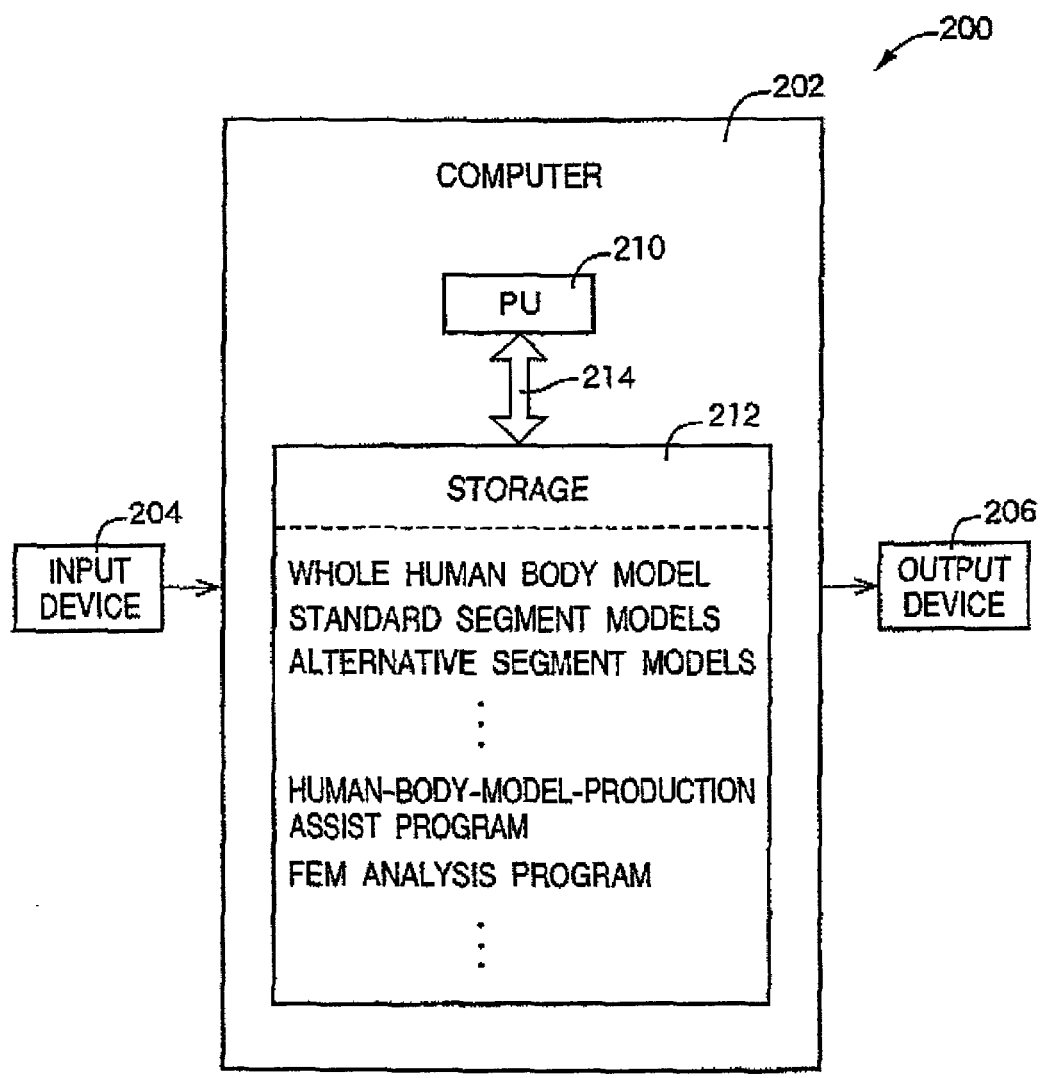
FIG. 40 schematically illustrates a human-body-behavior analyzing and applying system in which a human-body-behavior analyzing method according to a sixth embodiment of the present invention is used.

Referring to FIG. 40, there is illustrated a human-body-behavior analyzing and applying system 200 (hereinafter referred to simply as "analyzing and applying system 200") in which the above human-body-behavior analyzing method is conducted. The analyzing and applying system 200 is constructed, in the same manner as the analyzing and applying system 100 is constructed in the second embodiment, such that a computer 202 is connected with an input device 204 and an output device 206. The computer 202 is, like in the computer 102 the second embodiment, configured such that a PU210 and a storage 212 are connected with each other via a bus 214.

The storage 212 has already stored therein, like in the second embodiment, an FEM analysis program for analyzing a behavior of the whole human body using the whole human body model 30. However, the storage 212 has not already stored therein data for defining the whole human body model 30, unlike in the second embodiment. In the present embodiment, the whole human body model 30 is supposed to be prepared by a user of the above analyzing and applying system. The prepared whole human body model 30 is thereafter stored in the storage 212.

The storage 162 has already further stored therein data for defining each segment of the whole human body, as data for assisting the user in producing the whole human body model 30.

When the user attempts to produce the whole human body model 30, the user first inputs data fox each segment of the whole human body, in general. After the completion of the input for all segments of the whole human body, the user combines data for the all segments, for thereby completing the whole human body model 30.

In this stage, the user can produce the whole human body model 30, by operating a computer to execute a general-model-production assist program intended for a generally use for modeling mechanical devices.

There will be explained the steps for producing the whole human body model 30 by the use of the above general-model-production assist program.

First, the user considers characteristics of each segment of the human body, to thereby to select one of a plurality types for segment models, as the optimum segment model for the each segment of the human body, on the general-model-production assist program.

More specifically, the selection indicated above includes the step of determining whether the segment model for each segment of the human body is desirably chosen as a model based on a plurality of one-dimensional elements, two-dimensional elements, or three-dimensional elements. This step includes determining, when it has been determined that the segment model is desirably chosen as a model based on a plurality of two-dimensional elements, whether each two-dimensional element is desirably chosen as a shell element or a membrane element.

The user, after having specified the type of the segment model for the each segment of the human body, determines a parameter of the segment model of the specified type, More particularly, the user determines the parameter for defining the mechanical properties which the user attempts to make the segment model to represent.

The user, after having determined the parameter of the segment model, edits data for defining the segment model. The data has been stored in the computer The edit is performed for reproducing the shape and the size of the each segment of the human body.

Following that, the user validates the thus defined segment model. More specifically, the user first operates the computer to execute the above FEM analysis program for the segment model to be validated, to thereby obtain the analysis results with respect to the each segment of the human body. The user further compares the obtained analysis results, with the test results, with respect to the each segment of the human body, to thereby validate the segment model. The test results may be obtained from the cadaver or its equivalents, for example.

As a result of the validation, when it has been determined that the analysis results based on the segment model does not accurately coincide with the test results, the user repeats, for the same segment model, the selection of the type, and the defining of the shape and the size. This series of steps described above are repeated until the analysis results based on the segment model have accurately coincided with the test results.

After the completion of the production and the validation of all segment models for the human body, the user unites the all segment models, resulting in the completion of the whole human body model 30. The user afterward operates the computer to execute the above FEM analysis program for the produced whole human body model 30, to thereby investigate whether the analysis results concerning a behavior of the whole human body accurately coincide with the actual behavior of the real human body. The user modifies the segment models where appropriate.

Thus, the use of the above general-model-production assist program would force the user to repeat the selection of the type, the determination of the parameter, and the defining of the shape and the size, if the analysis results based on the segment model have not precisely coincided with the test results.

In contrast, in the present embodiment, at least one segment model for each segment of the human body, which well represents the characteristics of the each segment, has been already prepared, resulting in the capability of the automated selection of the type of the segment model and the automated determination of the parameter of the segment model, merely depending on the user's selection of the suitable segment model from the already prepared at least one segment model.

Figure 41:
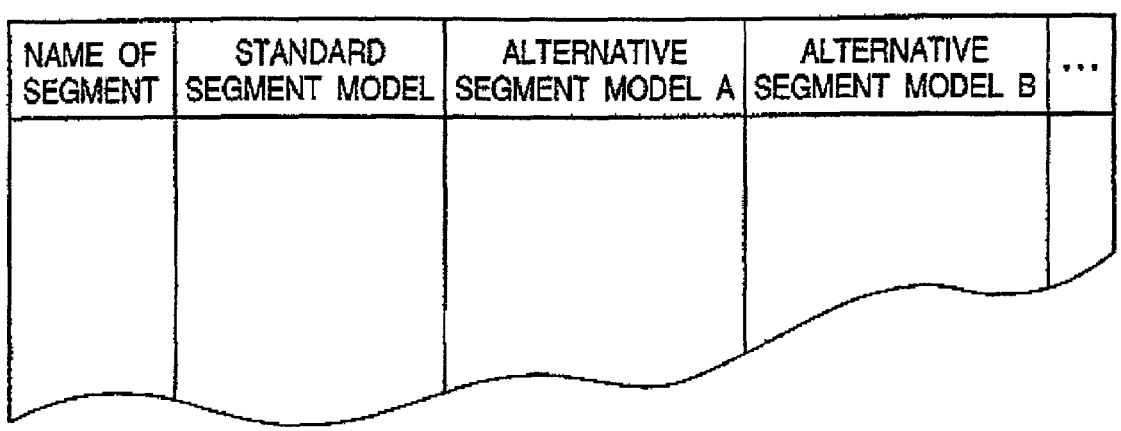
FIG. 41 schematically illustrates by means of a table, how a storage indicated in FIG. 40 has stored therein a standard segment model and at least one alternative segment model, in association with each segment of the whole human body.

Described specifically, in the present embodiment, there have been stored a plurality of segment models for each segment of the whole human body in the storage 219, as shown in FIG. 40. Each segment model represents the characteristics of the each segment of the whole human body. The plurality of segment models for each segment consist of one standard segment model, and at least one alternative segment model as the substitute for the standard one. These standard segment model and at least one alternative model have been stored in association with each segment of the whole human body. The contents of the storage 212 are schematically illustrated in FIG. 41 by a table.

Additionally, there has been further stored in the storage 212 a human-body-model-production assist program for assisting the user in selecting one from the above standard and alternative segment models, and in subsequently editing the selected segment model, as shown in FIG. 40.

Figure 42:
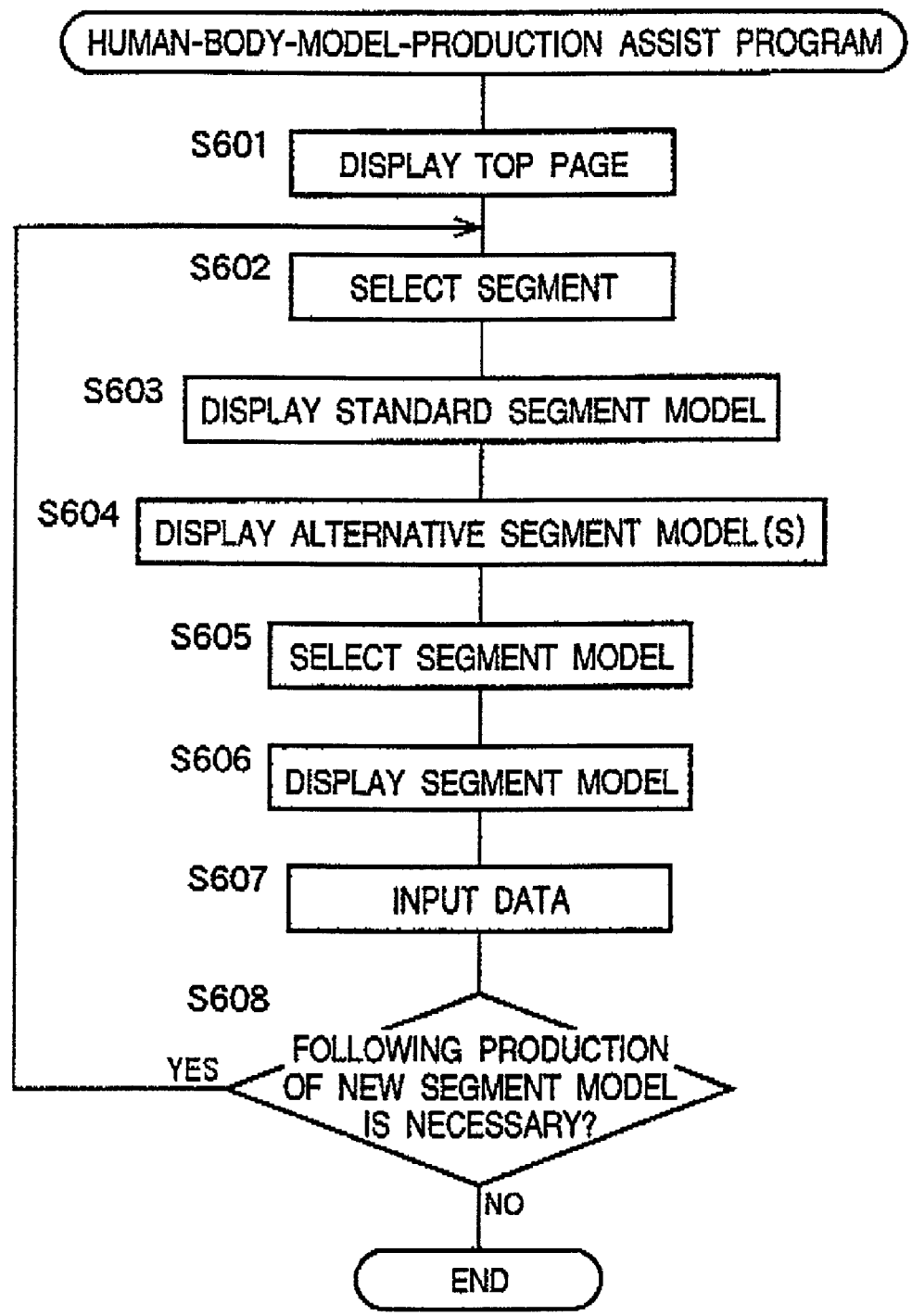
FIG. 42 is a flow chart schematically illustrating a human-body-model-production assist program indicated in FIG. 40.

It will be understood from the above, the present embodiment would enable the user to properly conduct the selection of the segment model and the determination of the parameter of the segment model, permitting a high level of the expertise to be inessential In FIG. 42, there is schematically illustrated the above human-body-model-production assist program by a flow chart.

The human-body-model-production assist program is initiated with step S601 wherein display data for displaying a top page on a screen of the output device 206 is read out from the storage 212. Based on the display data, the top page is displayed on the screen, The top page includes a message for instructing the user to select one of a plurality of segments of the human body for which the user attempts to produce the segment model.

Next, in step S602, according to an inputted command from the user via the input device 204, one of the plurality of segments of the human body is selected.

Following that, in step S603, the standard segment model corresponding to the selected segment is read out from the storage 212. The corresponding standard segment model is displayed on the screen of the output device 206.

Afterward, in step S604, the at least one alternative segment model corresponding to the selected segment is read out from the storage 212. The corresponding at least one alternative segment model is displayed on the screen of the output device 206.

Following that, in step S605, according to a command from the user, one of the standard segment model and the at least one alternative segment model is selected.

Afterward, in step S606, the selected segment model is displayed on the screen of the output device 206.

Following that, in step S607, the user inputs data for editing and defining the displayed segment model. The inputted data includes data for identifying the shape and the size of the displayed segment model, for example.

Afterward, in step S608, the computer 202 questions the user whether the following production of a new segment model is necessary. When the user has answered the computer 202 that the following production is necessary, the determination of this step becomes "YES," and the computer 202 returns to step S602. In contrast, when the user has answered the computer 202 that the following production is not necessary, the determination of step S608 becomes "NO," and then one cycle of the execution of the human-body-model-production assist program is terminated.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A computerized method for producing a human body model by simulating an object of a whole or a part of a human body on a computer including a processing unit and a storage, based on data entered by a user for a plurality of individual segments of the human body, and for storing data indicative of the produced human body model in the storage, wherein the object includes a complex of an Achilles tendon of the human body and a triceps surae extending from the Achilles tendon, the Achilles tendon being connected at one of its both ends with the triceps surae, the Achilles tendon is connected, at a first end of the Achilles tendon which is opposite to a second end of the Achilles tendon at which the Achilles tendon is connected with the triceps surae, with a calcaneus of the human body, the triceps surae is connected, at a first end of the triceps surae which is opposite to a second end of the triceps surae at which the triceps surae is connected with the Achilles tendon, with a femur of the human body, and the triceps surae is connected at its middle with a tibia of the human body, the computerized method comprising the steps of:

(a) simulating the complex via elements including a bendable and stretchable bar element having a length but not having a thickness, such that the bar element has two end attaching points at which the bar element is attached at its both ends to models of the calcaneus and the femur, and such that the bar element has a middle attaching point at which the bar element is attached at its middle to a model of the tibia;

(b) simulating a joining mechanism for joining the bar element at the middle attaching point with the model of the tibia, such that the joining mechanism is represented via a combination of a first sub-model representative of a pulley fixed to the model of the tibia with the pulley having a predetermined resistance to rotation, and a second sub-model representative of the bar element in a form of a rope which is wound around the pulley for changing a direction in which a force is transmitted, such that a path of the bar element extends along the model of the tibia, even when a joint located between the femur and the tibia is bent, and that transmission of a force between the bar element and the model of the tibia is achieved via the model of the pulley, so as to inhibit a separation of the bar element from the model of the tibia;

(c) predicting a physical response of the human body to an application of an actual external force by analyzing a response of the human body model to an application of a simulated external force to the human body model; and (d) outputting a result from said predicting step (c).

2. A computer readable medium including instructions configured to cause a computing device to implement a computerized method for producing a human body model by simulating an object of a whole or a part of a human body on a computer including a processing unit and a storage, based on data entered by a user for a plurality of individual segments of the human body, and for storing data indicative of the produced human body model in the storage, wherein the object includes a complex of an Achilles tendon of the human body and a triceps surae extending from the Achilles tendon, the Achilles tendon being connected at one of its both ends with the triceps surae, the Achilles tendon is connected, at a first end of the Achilles tendon which is opposite to a second end of the Achilles tendon at which the Achilles tendon is connected with the triceps surae, with a calcaneus of the human body, the triceps surae is connected, at a first end of the triceps surae which is opposite to a second end of the triceps surae at which the triceps surae is connected with the Achilles tendon, with a femur of the human body, and the triceps surae is connected at its middle with a tibia of the human body, the computerized method comprising the steps of:

(a) simulating the complex via elements including a bendable and stretchable bar element having a length but not having a thickness, such that the bar element has two end attaching points at which the bar element is attached at its both ends to models of the calcaneus and the femur, and such that the bar element has a middle attaching point at which the bar element is attached at its middle to a model of the tibia;

(b) simulating a joining mechanism for joining the bar element at the middle attaching point with the model of the tibia, such that the joining mechanism is represented via a combination of a first sub-model representative of a pulley fixed to the model of the tibia with the pulley having a predetermined resistance to rotation, and a second sub-model representative of the bar element in the a form of a rope which is wound around the pulley for changing a direction in which a force is transmitted, such that a path of the bar element extends along the mode model of the tibia, even when a joint located between the femur and the tibia is bent, and that transmission of a force between the bar element and the model of the tibia is achieved via the model of the pulley, so as to inhibit a separation of the bar element from the model of the tibia;

(c) predicting a physical response of the human body to an application of an actual external force by analyzing a response of the human body model to an application of a simulated external force to the human body model; and (d) outputting a result from said predicting step (c).

3. A computerized method for producing a human body model including simulating an object of a whole or a part of a human body on a computer having a processing unit and a storage, based on data entered by a user for a plurality of individual segments of the human body, and for storing data indicative of the produced human body model in the storage, the object including a muscle joining two bones of the human body in a bendable and stretchable manner and extending over a joint of the two bones, in the presence or absence of an intermediate bone located between the two bones, the muscle being attached at its both ends to the two bones, and being attached at its middle portion to a subject bone which is selected as one of the two bones in the absence of the intermediate bone, or as the intermediate bone in the presence of the intermediate bone, the computerized method comprising:

(a) simulating the muscle, the two bones, and the subject bone, to create models of the muscle, the two bones, and the subject bone for said human body model;

(b) predicting a physical response of the human body to an application of an actual external force by analyzing a response of the human body model to an application of a simulated external force to the produced human body model, and (c) outputting a result from said predicting step (b), wherein the simulating step (a) includes (i) simulating the muscle as a bendable and stretchable bar element having a length but not having a thickness, so as to represent that the bar element causes a reaction force upon application of said simulated external force, in a longitudinal direction of the bar element, irrespective of whether the bar element is in an expanded state or a contracted state,
(ii) simulating a path of the bar element, so as to represent that the path extends straight along the model of the subject bone, irrespective of variations of an angle between the two bones, and
(iii) simulating joining mechanisms for joining the bar element, the models of the two bones, and the model of the subject bone with one another, the computerized method further comprising:

simulating the object by partitioning the object into a plurality of elements, wherein the plurality of elements are categorized in type into a plurality of one-dimensional elements each not having a thickness but having a length, a plurality of two-dimensional elements each not having a thickness but having an area and a shape, and a plurality of three-dimensional elements each having a volume and a shape, the plurality of two-dimensional elements are categorized into a plurality of shell elements each permitting a tensile response and a compressive response to occur in a direction along each shell element, and a plurality of membrane elements each permitting a tensile response and not permitting a compressive response to occur in a direction along each membrane element, the plurality of individual segments including a ligament, a tendon, or a muscle, of the human body, and the step of simulating the object by partitioning includes:

simulating a first sub-plurality of the plurality of individual segments each of which is moved relative to another segment of the object while forming an area of contact with the another segment, by partitioning the first sub-plurality of individual segments into the plurality of membrane elements, while simulating a second sub-plurality of the plurality of individual segments not forming an area of contact with another segment of the object or a movement relative to another segment of the object, by partitioning the second sub-plurality of individual segments into the plurality of one-dimensional elements.

4. The computerized method according to claim 3, wherein the plurality of individual segments include a bone having a harder and thinner outer layer and a softer inner portion, and the step of simulating the object by partitioning further comprises:

simulating the outer layer by partitioning the outer layer into the plurality of shell elements, while simulating the inner portion by partitioning the inner portion into the plurality of three-dimensional elements.

5. The computerized method according to claim 3, wherein each of the plurality of membrane elements forms a quadrangle approximating a square.

6. The computerized method according to claim 3, wherein each of the plurality of shell elements forms a quadrangle approximating a square.

7. The computerized method according to claim 3, wherein each of the plurality of three-dimensional elements forms a hexahedron approximating a cube.

8. A computer readable medium including instructions configured to cause a computing device to implement the method of claim 3.

* * * * *